(12) United States Patent
Thevoz et al.

(10) Patent No.: US 12,513,003 B2
(45) Date of Patent: Dec. 30, 2025

(54) METHOD AND SYSTEM FOR VALIDATING A DIGITAL CONTENT

(71) Applicant: SICPA HOLDING SA, Prilly (CH)

(72) Inventors: Philippe Thevoz, Penthalaz (CH); Philippe Gillet, Charbonnières-les-Bains (FR)

(73) Assignee: SICPA HOLDING SA, Prilly (CH)

( * ) Notice: Subject to any disclaimer, the term of this patent is extended or adjusted under 35 U.S.C. 154(b) by 188 days.

(21) Appl. No.: 18/688,531

(22) PCT Filed: Aug. 31, 2022

(86) PCT No.: PCT/EP2022/074262
§ 371 (c)(1),
(2) Date: Mar. 1, 2024

(87) PCT Pub. No.: WO2023/031310
PCT Pub. Date: Mar. 9, 2023

(65) Prior Publication Data
US 2024/0396742 A1    Nov. 28, 2024

(30) Foreign Application Priority Data

Sep. 1, 2021  (EP) .................................. 21194289

(51) Int. Cl.
*H04L 9/32*      (2006.01)
*G06F 21/12*    (2013.01)

(52) U.S. Cl.
CPC .......... *H04L 9/3249* (2013.01); *G06F 21/121* (2013.01); *H04L 2209/34* (2013.01); *H04L 2209/60* (2013.01)

(58) Field of Classification Search
CPC .............. H04L 9/3249; H04L 2209/34; H04L 2209/60; H04L 9/50; H04L 63/08; H04L 63/123; H04L 2209/603; H04L 9/32; G06F 21/121; G06F 21/45
See application file for complete search history.

(56) References Cited

U.S. PATENT DOCUMENTS

| | | |
|---|---|---|
| 2017/0316170 A1 | 11/2017 | Shao et al. |
| 2021/0203508 A1* | 7/2021 | Decoux ................... G06F 21/16 |
| 2021/0258168 A1 | 8/2021 | Decoux et al. |
| 2024/0104521 A1* | 3/2024 | Azgad-Tromer ........................... G06Q 20/4016 |

FOREIGN PATENT DOCUMENTS

WO     2020052878     3/2020

OTHER PUBLICATIONS

Benaloh J et al: "One-Way Acumulators: A Decentralized Alternative to Digital Signatures (Extended Abstract)", Springer Verlag, DE, vol. 765, May 23, 1993 (May 23, 1993), pp. 274-285.
International Search Report and Written Opinion issued with respect to application No. PCT/EP2022/074262.

* cited by examiner

Primary Examiner — Quazi Farooqui
(74) Attorney, Agent, or Firm — MUNCY, GEISSLER, OLDS & LOWE, P.C.

(57) ABSTRACT

The present invention relates to the technical field of the validation and the authentication of a digital data, such as, for example, a digital document. Particularly, the invention relates to the technical field of the validation of a digital content of a digital message, such as an operation certified by an entity allowing a controller to execute said operation.

15 Claims, 8 Drawing Sheets

METHOD AND SYSTEM FOR VALIDATING A DIGITAL CONTENT

TECHNICAL FIELD

The present invention relates to the technical field of the validation and the authentication of a digital data, such as, for example, a digital document. Particularly, the invention relates to the technical field of the validation of a digital content of a digital message, such as an operation certified by an entity allowing a controller to execute said operation.

BACKGROUND OF THE INVENTION

The problem of counterfeiting and tampering digital data are well known and are growing every day.

Regarding the industrial field, the digitalization of several processes usually is highly vulnerable to cyber-attacks. When a computer talks with another one, the security protocol in place are barely enough against the hackers' technics. Additionally, there are so many industries, so many protocols for computer to communicate between each other, that the solutions of the prior art regarding these problems are very hard to implement, cost a lot of money and must be adapted depending of each situation. Therefore, there is an urgent need for a solution to ensure the integrity of a process in an untrusted environment, for example where several devices have to exchange data, or perform authorized mission for example.

It is, therefore, now more than ever essential to be able to validate and authenticate with a high degree of security a digital data or an operator presenting such a digital document comprising such digital data. At the same time, it is mandatory to find a low-cost solution that can be easily and quickly implemented.

Indeed, today, how can a computer, a robot or even a citizen identify with certainty that the operator or the official who digitally signed a digital document has the legitimacy to sign and validate such a document on behalf of the authority it represents?

In a more general way, how can a computer or a robot sure that the computer or the robot behind this digital signature is the right one and that this entity is authorized to sign such a document on behalf of its organization?

To sum up, how an entity can trust a digitally signed data and the entity that has signed it?

In the physical world, what gives confidence in a paper document is the signature and especially the stamp or the seal of the authority that issued the document. There is a need to transpose this situation in the digital world.

In the digital world, it is mainly by a digital signature that is certified by a chain of certificates. For example, the person skilled in the art knows solutions to protect digital files against forgery such as the solution described in the document US 2021/258168 A1. However, this solution lacks a lot of security and does not ensure, with a high certainty, that the signatory had the authority and right to sign on that specific date on behalf of the authority it represents the type of document in question.

It is therefore an object of the invention to validate with a higher certainty digital data or a digital document, and therefore allow to authenticate an operator presenting these digital data or this digital document to a recipient.

SUMMARY OF THE INVENTION

According to one aspect, the invention relates to a method of validation of a digital content of a digital message M, preferably in the form of a forgery proof digital file, received by a device DB controlled by a controller B through a communication network CN, wherein:

- a device DA controlled by a controller A comprises a processing unit CPU(A) with a memory storing the digital message M, and a communication module CM(A) adapted to send and receive data via the communication network CN;
- the device DB comprises a processing unit CPU(B) with a memory storing an aggregated digital signature ADS, and a communication module CM(B) adapted to send and receive data via the communication network CN, said aggregated digital signature ADS being preferably calculated by applying a one-way accumulator to a plurality of digital signatures, said plurality of digital signatures including a digital signature x(A) of an authorization data AD(A) calculated via a one way-function;
- the digital message M contains the authorization data AD(A) indicating that the controller A of the device DA is authorized by a controller C to perform an operation Op with a controller of which device receives said digital message M; preferably, the digital message M is certified by the controller C;
- the digital message M also contains a verification key VK(A) attributed by the controller C, wherein said verification key VK(A) together with the authorization data AD(A) allow to retrieve the aggregated digital signature ADS stored in the memory of the processing unit CPU(B) of the device DB, preferably said verification key VK(A) together with the authorization data AD(A) are used to calculate a candidate aggregated digital signature cADS, the processing unit CPU(B) being configured to compare said candidate aggregated digital signature cADS with the aggregated digital signature ADS stored in the memory of the processing unit CPU(B) of the device DB;
- the method comprising the following steps:
- the communication module CM(B) of the device DB receives the digital message M; preferably, the communication module CM(B) of the device DB receives the digital message M from the communication module CM(A) and/or from the controller C and/or from a server comprising a database for example;
- preferably, the processing unit CPU(B) of the device DB verifies that the digital message M is certified by the controller C; and
- the processing unit CPU(B) of the device DB extracts the authorization data AD(A) contained in the digital message M, preferably only in case of positive verification that the digital message M is certified by the controller C;
- the communication module CM(B) of the device DB receives from the communication module CM(A) of the device DA an accreditation SA;
- the processing unit CPU(B) of the device DB verifies the accreditation SA;
- the processing unit CPU(B) of the device DB:
  - extracts the verification key VK(A) contained in the digital message M,
  - calculates, via the one-way function programmed in the processing unit CPU(B), a candidate digital signature cx(A) of the authorization data AD(A), and
  - calculates the candidate aggregated digital signature cADS from the verification key VK(A) and the calculated candidate digital signature cx(A) of the authorization data AD(A); and the processing unit CPU(B) of the device DB checks whether the candidate aggregated digital signature cADS matches with the aggregated digital signature ADS stored in its memory, and only in case of positive verification of the accreditation SA data and positive matching of the candidate aggregated digital signature cADS with the aggregated digital signature ADS, the processing unit CPU(B) of the device DB transmits via the communication module CM(B) to the controller B an indication that the controller A is indeed authorized by the controller C to perform the operation Op.

The invention allows a recipient to validate a given digital content with a higher certainty than the solutions of the prior art. Indeed, the invention allows controller B to validate the digital content of the digital message M with a higher certainty than the solutions of the prior art.

Moreover, the invention allows the device DB to control the credentials linked to this digital content in order to check if this digital content is valid or not.

The invention allows controller B to validate a given digital content based on the public key of the controller A without the need to identify the controller A.

According to this system, the controller A and the controller B do not need to check with controller C or to access to a database of the controller C in order for controller B to validate the digital content of the digital message M, as far as the controller B comprises the aggregated digital signature ADS.

According to an embodiment, the memory of the processing unit CPU(A) of the device DA stores a private key PrK(A), preferably in a secured enclave of the memory of the processing unit CPU(A), the processing unit CPU(A) being adapted to sign data with the private key PrK(A); and the processing unit CPU(B) of the device DB is adapted to verify signed data with a corresponding public key by the communication module CM(B); and the digital message M further comprises a public key PuK(A), corresponding to the private key PrK(A), and being accredited by the controller C as owned by the controller A; and the accreditation SA are accreditation data signed with the private key PrK(A); And before the step of verifying said accreditation SA by the processing unit CPU(B) of the device DB, the processing unit CPU(B) of the device DB extracts the public key PuK(A) from the digital message M; And the step of verifying said accreditation SA comprises the verification of the accreditation SA by the processing unit CPU(B) of the device DB using said public key PuK(A).

This allows the controller B to verify that the controller A that have signed the accreditation data is indeed the same controller A that is mentioned in the digital message M.

According to an embodiment, the digital message M is certified by the controller C, and said method comprises, before the step of extracting by processing unit CPU(B) of the device DB the authorization data AD(A) contained in the digital message M, a step of verifying by the processing unit CPU(B) that the digital message M is certified by the controller C, and only in case of positive verification that the digital message M is certified by the controller C, the processing unit CPU(B) of the device DB extracts the authorization data AD(A) contained in the digital message M.

This allows to verify that the digital message M has been well issued by the controller C. According to an example, the step of verifying by the processing unit CPU(B) that the digital message M is certified by the controller C can be done using a cryptographic process or a cryptographic signature for example.

According to another aspect, the present invention relates to a system of validation of a digital content of a digital message M received by a device DB controlled by a controller B through a communication network CN, the system comprising:

a device DA controlled by a controller A comprising a processing unit CPU(A) with a memory storing the digital message M, and a communication module CM(A) adapted to send and receive data via the communication network CN;

the device DB comprises a processing unit CPU(B) with a memory storing an aggregated digital signature ADS, and a communication module CM(B) adapted to send and receive data via the communication network CN, said aggregated digital signature ADS being calculated by applying a one-way accumulator to a plurality of digital signatures, said plurality of digital signatures including a digital signature x(A) of an authorization data AD(A) calculated via a one way-function;

the digital message M contains the authorization data AD(A) indicating that the controller A of the device DA is authorized by a controller C to perform an operation Op with a controller of which device receives said digital message M, preferably the digital message M being certified by the controller C;

the digital message M also contains a verification key VK(A) attributed by the controller C, wherein said verification key VK(A) together with the authorization data AD(A) allow to retrieve the aggregated digital signature ADS stored in the memory of the processing unit CPU(B) of the device DB, preferably said verification key VK(A) together with the authorization data AD(A) are used to calculate a candidate aggregated digital signature cADS, the processing unit CPU(B) being configured to compare said candidate aggregated digital signature cADS with the aggregated digital signature ADS stored in the memory of the processing unit CPU(B) of the device DB;

and wherein:

the communication module CM(B) of the device DB is configured to receive the digital message M; Preferably, the communication module CM(B) of the device DB is configured to receive the digital message M from the communication module CM(A) and/or from the controller C and/or from a server comprising a database for example;

preferably, the processing unit CPU(B) of the device DB is configured to verify that the digital message M is certified by the controller C; and the processing unit CPU(B) of the device DB is configured to extract the authorization data AD(A) contained in the digital message M, preferably only in case of positive verification that the digital message M is certified by the controller C;

the communication module CM(B) of the device DB is configured to receive from the communication module CM(A) of the device DA an accreditation SA;

the processing unit CPU(B) of the device DB is configured to verify the accreditation SA;

the processing unit CPU(B) of the device DB is configured to:

extract the verification key VK(A) contained in the digital message M, calculate, via the one-way function programmed in the processing unit CPU(B), a candidate digital signature cx(A) of the authorization data AD(A), and calculate the candidate aggregated digital signature cADS from the verification key VK(A) and the calculated candidate digital signature cx(A) of the authorization data AD(A); and the processing unit CPU(B) of the device DB is configured to check whether the candidate aggregated digital signature cADS matches with the aggregated digital signature ADS stored in its memory, and only in case of positive verification of the accreditation SA data and positive matching of the candidate aggregated digital signature cADS with the aggregated digital signature ADS, the processing unit CPU(B) of the device DB is configured to transmit via the communication module CM(B) to the controller B an indication that the controller A is indeed authorized by the controller C to perform the operation Op.

The present invention allows for example controller A, such as a robot for example, to identify itself just with the accreditation SA and its credentials, said credentials being in the digital message M and being certified by a forgery proof digital file issued by the controller C. Advantageously the digital message M comprises or is a the forgery proof digital file issued by the controller C. Controller B, such as another robot, can have complete confidence in the validity of the credentials that are presented.

It must be noted that the invention avoids the use of biometrics data in the case where the controller A is a human for example. His credentials and the accreditation SA are enough to give a complete confidence to the recipient, the controller B here, which can be a robot, a computer or another human for example. Advantageously, the invention avoids any biometrics data, biometric measurement or disclosure of private information.

According to an embodiment of the invention, the controller A can have a private key and can use it regarding said accreditation SA in order to identify itself, for example through a challenge. Said private key is associated to a public key. Advantageously, the controller C, that has issued the forgery proof digital file, has preferably certified said public key, allowing the recipient, therefore controller B, to check the validity of said accreditation SA.

Moreover, the recipient, i.e. controller B, can keep the forgery proof digital file, i.e. the digital message M, and use it to contact and ask its issuer, i.e. controller C, to identify the controller A in case of any problems, such as a complaint about the controller's actions and/or any industrial incident. However, the controller A can remain anonymous for the recipient and it is only the issuer of the forgery proof digital file that can identify it.

According to another aspect, the present invention relates to a use of the system of validation of a digital content of a digital message M according to the present invention for validating, by a device DB, an execution of an operation Op, said operation being executed by a device DA, and wherein:
the device DB is comprised and controlled by a vault B, the device DA is comprised and controlled by a robot A and the operation Op relates to the robot A fetching a specific good located inside the vault B; or
the device DB is comprised and controlled by a computer B, the device DA is comprised and controlled by smartphone A and the operation Op relates to the smartphone A sending a set of data SeD(A) to the computer B; or
the device DB is comprised and controlled by a medical device B, the device DA is comprised and controlled by a nurse A and the operation Op relates to the nurse A injecting a specific drug to a specific patient using said medical device B; or
the device DB is comprised and controlled by a citizen B, the device DA is comprised and controlled by a police officer A and the operation Op relates to the police officer A penetrating in the house of the citizen B to search for evidences; or
the device DB is comprised and controlled by a citizen B, the device DA is comprised and controlled by a civil servant A and the operation Op relates to the civil servant issuing and signing an official digital document.

Before providing below a detailed review of embodiments of the invention, some optional characteristics that may be used in association or alternatively will be listed hereinafter:

According to an example, the memory of the processing unit CPU(A) of the device DA stores a private key PrK(A), preferably in a secured enclave of the memory of the processing unit CPU(A), the processing unit CPU(A) being adapted to sign data with the private key PrK(A).

According to an example, the processing unit CPU(B) of the device DB is adapted to verify signed data with a corresponding public key by the communication module CM(B).

According to an example, the digital message M further comprises a public key PuK(A), corresponding to the private key PrK(A), and being accredited by the controller C as owned by the controller A.

According to an example, the accreditation SA are accreditation data signed with the private key PrK(A).

According to an example, before the step of verifying said accreditation SA by the processing unit CPU(B) of the device DB, the processing unit CPU(B) of the device DB extracts the public key PuK(A) from the digital message M;

According to an example, the step of verifying said accreditation SA comprises the verification of the accreditation SA by the processing unit CPU(B) of the device DB using said public key PuK(A).

According to an example, the communication network CN comprises a near field communication network NFCN.

According to an example, the communication module CM(A) is adapted to send and receive data via the near field communication network NFCN, the communication module CM(B) is adapted to send and receive data via the near field communication network NFCN, preferably this near field communication network NFCN enables a communication between the communication module CM(A) and the communication module CM(B) when the distance between the communication module CM(A) and the communication module CM(B) is lower than 50 cm, preferably than 25 cm and advantageously than 10 cm.

According to an example, the device DA comprises a display module DD(A) and an optical reader module OR(A), the device DB comprises a display module DD(B) and an optical reader module OR(B).

According to an example, the step of receiving the digital message M by the communication module CM(B) of the device DB comprises a step of reading by the optical reader module OR(B) an optical readable representation of a graphical data block GDB displayed by the display module DD(A), said graphical data block GDB comprising a digital mark DM.

According to an example, said digital mark DM comprises an encoded version EAD(A) of said authorization data AD(A) and an encoded version EVK(A) of said verification key VK(A).

According to an example, the extraction of the authorization data AD(A) comprises decoding said encoded authorization data EAD(A).

According to an example, the extraction of the verification key VK(A) comprises decoding said encoded verification key EVK(A).

According to an example, said optical readable representation of the graphical data block GDB comprises a digital representation of graphical symbols from a given finite set of graphical symbols, said digital representation of graphical symbol being configured to encode said digital mark MD and a machine-readable error correction data block.

According to an example, the memory of the device DB stores a private key PrK(B), preferably in a secured enclave of the memory of the processing unite CPU(B), and a corresponding public key PuK(B) accredited by a controller C as owned by the controller B, the processing unit CPU(B) of the device DB being adapted to sign data with said private key PrK(B).

According to an example, the processing unit CPU(A) of the device DA is adapted to verify signed data using a corresponding public key by the communication module CM(A)

According to an example, the method comprises, before the step of receiving by the communication module CM(B) from the communication module CM(A) the accreditation SA, a step of sending from the communication module CM(B) to the communication module CM(A) a secret generated by the device DB, preferably at a given instant, said secret being configured to generate said accreditation SA.

According to an example, said secret is configured to be signed with the private key PrK(A) by the processing unit CPU(A) to generate said accreditation SA.

According to an example, said step of sending said secret comprises a step of displaying by the display module DD(B) an optical readable representation of a graphical element encoding said secret and being configured to be read by the optical reader module OR(A).

According to an example, before or after receiving the digital message M, the controller B receives a digital document.

According to an example, the accreditation SA comprises a signature of a content of said digital document, said signature being generated by the processing unit CPU(A) by signing with the private key PrK(A) said content, preferably the accreditation SA comprises a signature of a hash of at least a part of a content of said digital document, said signature being generated by the processing unit CPU(A) using the private key PrK(A), and said hash being calculated via a one-way function programmed in the processing unit CPU(A).

According to an example, the digital message M is certified by the controller C.

According to an example, the method comprises, before the step of extracting by processing unit CPU(B) of the device DB the authorization data AD(A) contained in the digital message M, a step of verifying by the processing unit CPU(B) that the digital message M is certified by the controller C, and only in case of positive verification that the digital message M is certified by the controller C, the processing unit CPU(B) of the device DB extracts the authorization data AD(A) contained in the digital message M.

According to an example, the memory of the processing unit CPU(A) of the device DA is configured to store a private key PrK(A), preferably in a secured enclave of the memory of the processing unit CPU(A), the processing unit CPU(A) being configured to sign data with the private key PrK(A).

According to an example, the processing unit CPU(B) of the device DB is configured to verify signed data with a corresponding public key by the communication module CM(B).

According to an example, the digital message M further comprises a public key PuK(A), corresponding to the private key PrK(A), and being accredited by the controller C as owned by the controller A.

According to an example, the accreditation SA are accreditation data signed with the private key PrK(A).

According to an example, the processing unit CPU(B) of the device DB is configured to extract the public key PuK(A) from the digital message M.

According to an example, the processing unit CPU(B) of the device DB is configured to verify said accreditation SA using said public key PuK(A).

According to an example, the device DB comprise a secret generator module SGM(B) configured to generate a secret, preferably at a given instant, said secret being adapted to be sent by the communication module CM(B) of the device DB to the communication module CM(A) of the device DA.

According to an example, the processing unit CPU(A) of the device DA is configured to generate said accreditation SA using said secret.

According to an example, the processing unit CPU(A) of the device DA is configured to sign said secret with the private key PrK(A) to generate said accreditation SA.

According to an example, the device DA comprises a display module DD(A) and an optical reader module OR(A), the device DB comprises a display module DD(B) and an optical reader module OR(B).

According to an example, the display module DD(A) of the device DA is configured to display an optical readable representation of a graphical data block GDB.

According to an example, the optical reader module OR(B) of the device DB is configured to read said optical readable representation of a graphical data block GDB, said graphical data block GDB comprising a digital mark DM.

According to an example, said digital mark DM comprises an encoded version EAD(A) of said authorization data AD(A) and an encoded version EVK(A) of said verification key VK(A).

According to an example, the processing unit CPU(B) of the device DB is configured to extract the authorization data AD(A) by decoding said encoded authorization data EAD(A).

According to an example, the processing unit CPU(B) of the device DB is configured to extract the verification key VK(A) by decoding said encoded verification key EVK(A).

According to an example, the device DB is comprised and controlled by a vault B, the device DA is comprised and controlled by a robot A and the operation Op relates to the robot A fetching a specific good located inside the vault B.

According to an example, the device DB is comprised and controlled by a computer B, the device DA is comprised and controlled by smartphone A and the operation Op relates to the smartphone A sending a set of data SeD(A) to the computer B.

According to an example, the device DB is comprised and controlled by a medical device B, the device DA is comprised and controlled by a nurse A and the operation Op relates to the nurse A injecting a specific drug to a specific patient using said medical device B.

According to an example, the device DB is comprised and controlled by a citizen B, the device DA is comprised and controlled by a police officer A and the operation Op relates to the police officer A penetrating in the house of the citizen B to search for evidences.

According to an example, the device DB is comprised and controlled by a citizen B, the device DA is comprised and controlled by a civil servant A and the operation Op relates to the civil servant A issuing and signing an official digital document.

According to an example, the verification key VK is configured to calculate at least one candidate aggregated digital signature cADS using a candidate digital signature cx of the authorization data AD, said candidate digital signature cx of the authorization data AD being calculated using a one-way function programmed in the processing unit CPU (B), said processing unit CPU(B) being configured to compare said candidate aggregated digital signature cADS with the aggregated digital signature ADS stored in the memory of the processing unit CPU(B) of the device DB.

According to an example, the verification key comprises a sequence of digital signature values organized according to a data structure corresponding to a tree, these digital signature values corresponding to node values and leaves values of said tree.

According to an example, a candidate aggregated digital signature cADS can be calculated using a verification key VK, comprising a sequence of node values corresponding to digital signature values, and using a calculated candidate digital signature cx of an authorization data AD, said calculated candidate digital signature cx being calculated using a one-way function programmed in the processing unit CPU(B).

According to an example, the verification key VK comprises a sequence of node values organized according to a tree's structure, said node values corresponding to digital signature values, and the calculated candidate digital signature cx of an authorization data AD is calculated using a one-way function programmed in the processing unit CPU (B), and the calculation of a candidate aggregated digital signature cADS comprises the following steps:

a. extracting from the sequence of node values in the verification key VK, a node value (i.e. a digital signature value) of every other leaf node of the tree having the same parent node than that of a given leaf node corresponding to the calculated candidate digital signature cx of an authorization data AD, and calculating a digital signature of a concatenation of the given node value and, respectively according to the ordering of nodes in the tree and the tree concatenation ordering, the extracted node value of said every other leaf node, thus obtaining a digital signature of said same parent node of the given leaf node;

b. successively at each next level in the tree and up to the penultimate nodes level:

c. extracting from the sequence of node values in the verification key VK, a node value (i.e. a digital signature value) of every other non-leaf node of the tree having the same parent node than that of the previous same parent node considered at the preceding step, and d. calculating a digital signature of a concatenation of the node value of said respective every other non-leaf node and the obtained digital signature of said previous same parent node, according to the ordering of nodes in the tree and the tree concatenation ordering, thus obtaining a node value of said same parent node of said previous same parent node; and e. calculating a digital signature of a concatenation of the obtained node values of the non-leaf nodes corresponding to the penultimate nodes level of the tree according to the ordering of nodes in the tree and the tree concatenation ordering, thus obtaining a root digital signature of the root node of the tree, said root digital signature corresponding to a candidate aggregated digital signature cADS.

BRIEF DESCRIPTION OF THE DRAWINGS

The aims, objects, as well as the technical features and advantages of the invention will emerge better from the detail description of an embodiment of the invention which is illustrated by the following figures in which.

Figure 1:
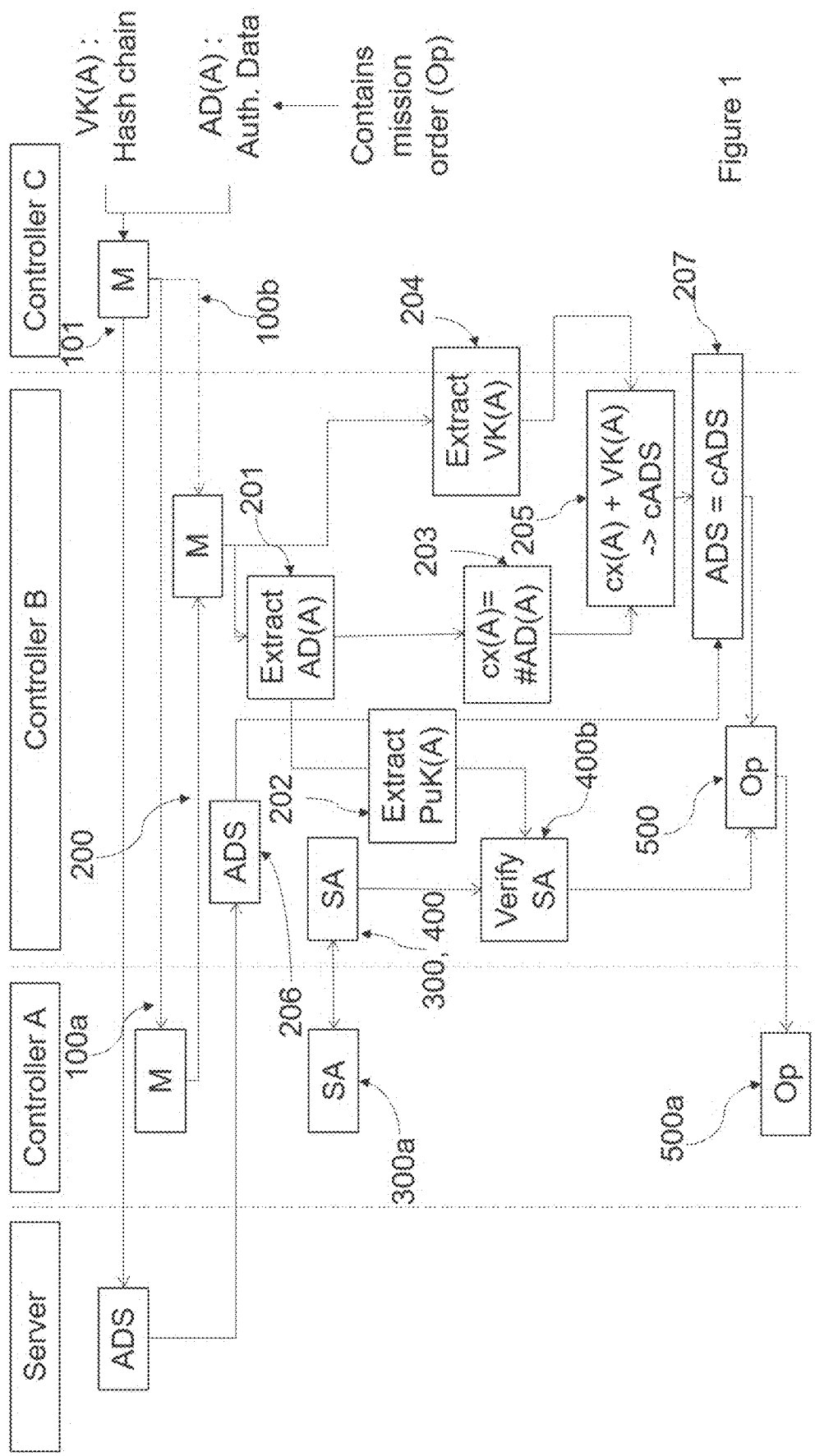
FIG. 1 is a general schematic view of an embodiment of the present invention.

The drawings are given by way of example and do not limit the invention. They constitute representations of principle intended to facilitate understanding of the invention and are not necessarily on the scale of practical applications.

DETAILED DESCRIPTION

The present disclosure is here described in detail with reference to non-limiting embodiments illustrated in the drawings.

The present invention relates to a system and a method of validation of a digital content of a digital message M. As described hereafter, the digital message M is advantageously a forgery proof digital file. In one embodiment, said digital message M can have been generated from a non-digital message for example, such as a handwritten message or a printed message, preferably using a conversion from the handwritten message to a digital message and/or from a printed message to a digital message, using for example a scanner and/or a camera.

According to an embodiment, said digital message M can contain several kinds of data such as credentials of a device or of a controller, order of mission of a controller to perform an operation Op, data regarding the authority having delivered said credentials, and so on . . . .

According to a preferred embodiment, the digital message M contains an authorization data AD. Said authorization data AD is configured to indicate that a controller of a device is authorized by another controller to perform an operation Op, preferably with another controller of which device received said digital message M. Preferably, the digital message M can also comprise a digital mark DM described hereafter. In a more general way, this digital message M can take any kind of form such as a graphical representation, a set of data, an electromagnetic wave, and so on.

For example, the digital message M can contain an authorization data AD(A) indicating that a controller A of a device DA is authorized by a controller C to perform an operation Op with a controller B. Such an operation Op can be for example downloading data, uploading data, accessing to a database, transferring instructions, collecting data, collecting goods, delivering data, delivering goods, and so on, more examples will be described hereafter. Said controller C can be an authority represented by a device, an institution or a human. Said authority has the ability to authorize a controller to execute some operations regarding another controller. Preferably, the controller C is configured to deliver the digital message M in the form of a forgery proof digital file. Advantageously, the digital message M is certified by the controller C.

This digital message M is for example received by a device through a communication network CN. This device is controlled by a controller. Said device is configured to validate the digital content of said digital message M.

According to an embodiment, said communication network CN can comprise a near field communication network NFCN. Said near field communication network NFCN is configured to enable a communication between at least two devices when the distance between them is lower than 50 cm, preferably than 25 cm and advantageously than 10 cm. This communication network can comprise a wired communication and/or a wireless communication. This communication network can comprise an optical communication network.

According to an embodiment of the present invention, a controller can be a computer, a robot, an Internet of Thing (IoT) device, a part of a device, a vehicle, a user and/or a human. Indeed, the device can be a part of a larger device, such a module inside a robot for example, and/or inside a smartphone, or inside any kind of system that can be used by a human. This device is for example one of the following devices: mobile phone, tablet, personal computer, robot, IoT device, etc . . . .

Said device comprises at least a processing unit with a memory. Said processing unit comprises at least one processor configured to execute at least one series of instructions, preferably stored by the memory. Said memory is preferably a non-transitory memory. Said memory comprises advantageously a secured enclave, preferably configured to store at least one private key for example.

According to an embodiment, the digital message M contains a verification key VK(A) attributed by the controller C, said verification key VK(A) together with the authorization data AD(A) allow to retrieve an aggregated digital signature ADS.

According to an embodiment, said verification key VK(A) is a sequence of a plurality of digital signatures x. This plurality of digital signatures x can be generated from several well-known mechanisms such as using a Merkle tree. Using this last mechanism, said verification key VK(A) is a sequence of a plurality of digital signatures x from the leaf nodes level to the penultimate nodes level, of every other leaf node having the same parent node in the tree that the leaf-node corresponding to the digital file signature x(A) of said authorization data AD(A), and successively at each next level in the tree, of every non-leaf node having the same parent node in the tree that the previous same parent node considered at the preceding level. More details will be described hereafter in the section "forgery proof digital file".

According to an embodiment, the aggregated digital signature ADS is advantageously calculated by applying a one-way accumulator to a plurality of digital signatures, said plurality of digital signatures including a digital signature x(A) of the authorization data AD(A). Said digital signature x(A) of the authorization data AD(A) is preferably calculated via a one way-function. As described hereafter, said aggregated digital signature ADS is designed to be stored in the memory of the device receiving said digital message M.

According to an embodiment, the invention can comprise a verification step that the digital message is well certified by the controller C. Preferably this verification step can be carried out by the controller A and/or by the controller B.

According to an embodiment, the invention can comprise a challenge step between the controller B and the controller A. Indeed, in order to validate the controller A, i.e. in order to authenticate that the controller A is indeed the controller mentioned in the digital message M, the controller B can use a challenge. This challenge can be implemented in different ways. Preferably, this challenge comprises the reception by the controller B of accreditation SA from the controller A, then controller B can verify the accreditation SA in order to validate that the controller A is indeed the controller mentioned in the digital message M. More detail regarding this challenge step are given hereafter.

Figure 8:
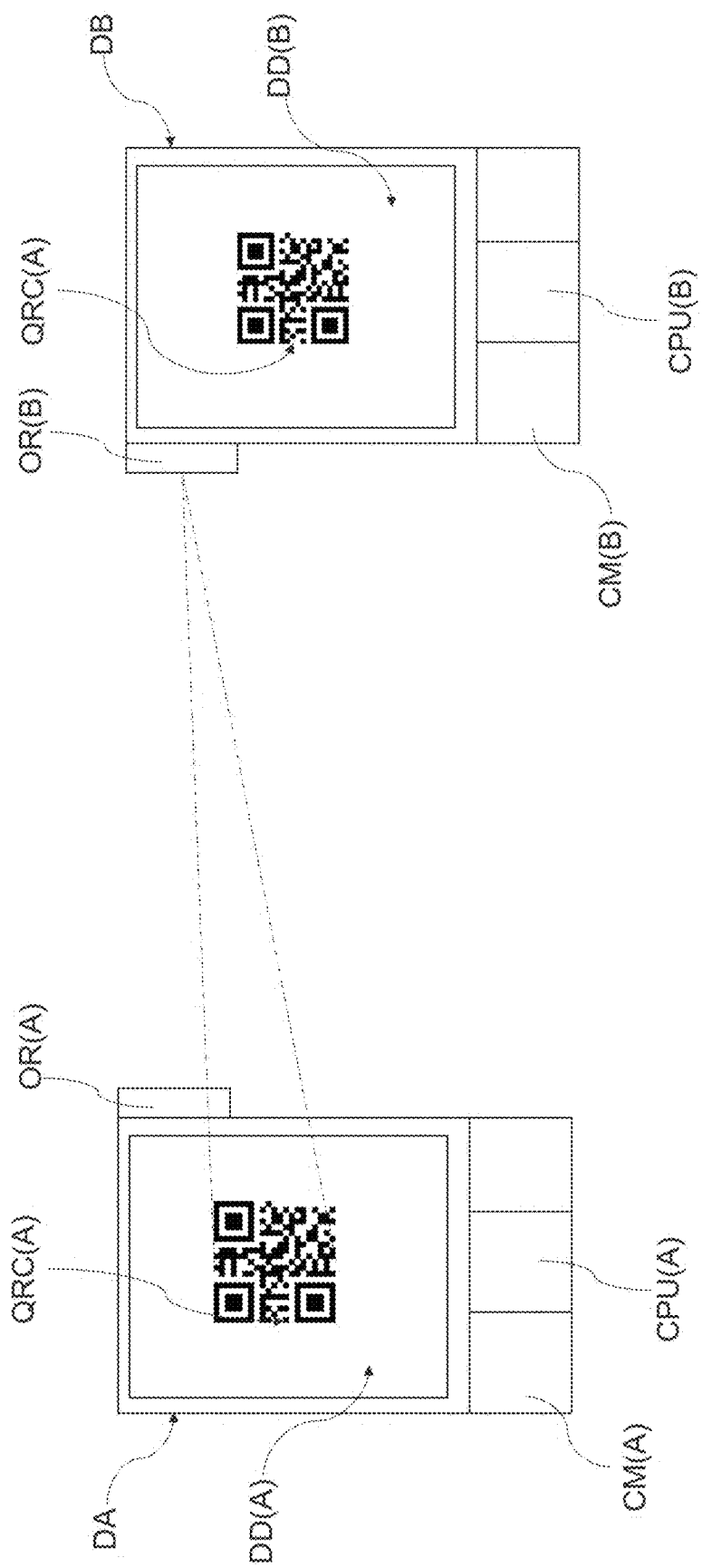
FIG. 8 is a schematic view of a device DA and a device DB according to an embodiment of the present invention.

According to an embodiment illustrated by FIG. 8, the invention comprises the reception by the controller B, preferably by the communication module CM(B) of the device DB, of an accreditation SA from the controller A, preferably from the communication module CM(A) of the device DA. This accreditation SA is designed to be verified by the controller B, advantageously by the processing unit CPU(B) of the device DB. This accreditation SA comprises preferably data signed by the controller A. According to an embodiment, the accreditation SA is generated from a secret. Said secret is preferably generated by the controller B and/or the controller C. Said secret is received by the controller A, preferably by the communication module CM(A) of the device DA, from the controller C and/or from the controller B, preferably from the communication module CM(B) of the device DB.

Furthermore, according to an embodiment, the digital message M can comprise a public key PuK, corresponding to a private key PrK, said public key PuK being accredited by the controller C as owned by the controller A. Therefore, according to an embodiment, the step of challenge can be initiated between the controller B and the controller A for example through data exchange using the device DB and the device DA and these public and private keys, for example a public key PuK(A) and the corresponding private key PrK (A).

According to an embodiment, the controller A comprises a private key PrK(A). As in a conventional Public Key Infrastructure PKI for example, said private key PrK(A) is kept secret by the controller A. Said private key PrK(A) has an associated public key PuK(A) designed to be publicly known; said public key PuK(A) is designed to be sent to another controller, for example to the controller B through the communication module CM(B) of the device DB. Said public key PuK(A) is accredited by the controller C. Indeed, the controller C, the authority, has accredited this public key PuK(A) as owned by the controller A.

Using this private key PrK(A), the device DA can sign data and then send this signed data to, for example, the device DB. With the public key PuK(A), the device DB is able to verify said signed data.

According to an embodiment, the device DB can send a message to the device DA, this message can comprise for example a secret, often called a challenge, preferably a one-time secret, preferably generated on the fly, i.e. at the given moment, and comprising for example a random number. Then, the device DA can sign with its private key PrK(A) this message, or at least said secret for example, and send the signed message to the device DB in the form of the accreditation SA. Advantageously, said accreditation SA comprises said signed secret. The device DB is able to verify said accreditation SA, i.e. said signed message, using the corresponding public key PuK(A) and the message, i.e. the secret, in particular the random number for example. This challenge allows the device DB, therefore the controller B, to verify that this is indeed the device DA owned by the controller A that is in communication with it, preferably at said given moment.

According to an embodiment, the accreditation SA can comprise a signature of a document and said document. Said signature is preferably generated by the processing unit CPU(A) by signing said document with the private key PrK(A).

According to an embodiment, the processing unit CPU(A) of the device DA can be configured to verify signed data received together with a corresponding public key PuK by the communication module CM(A) from, for example, the device DB. Indeed, as the controller A has a private key PrK(A) accredited by an authority as owned by the controller A, for example the controller C, and an associated public key PuK(A), the controller B can also have a private key PrK(B) associated to a public key PuK(B). Said public key PuK(B) is preferably accredited by an authority as owned by the controller B, preferably the same authority such as controller C.

As for the device DA regarding the private key PrK(A), the memory of the device DB stores the private key PrK(B), preferably in a secured enclave of the memory, the processing unit CPU(B) being configured to sign data with said private key PrK(B).

According to a preferred embodiment, each communication module CM comprises a display module DD and an optical reader module OR. Said display module DD is configured to display an optical readable representation of data, preferably an optical readable representation of a graphical data block GDB. Said graphical data block GDB can comprises a part or the totality of the digital message M. For example, the graphical data block GDB can comprise a digital mark DM.

According to an embodiment, said digital mark DM can comprise an encoded version EAD of said authorization data AD. According to another embodiment, the digital mark DM can comprise an encoded version EVK of the verification key VK. According to these embodiments, in order to get an authorization data AD(A) of the controller A for example, the device DB must decode the encoded authorization data EAD(A). In the same way, in order to get a verification key VK(A) of the controller A for example, the device DB has to decode the encoded verification key EVK(A). According to these embodiments, the digital message M can be attached to a digital document and/or can be optically received as an optical readable representation of a graphical data block GDB by the device DB, preferably by the communication module CM(B) of the device DB, advantageously by the optical reader module OR(B) of the communication module CM(B) of the device DB. According to these embodiments, the digital message M can be optically displayed by the display module DD(A) of the communication module CM(A) of the device DA, or the digital message M is sent through the communication network CN, or even printed, preferably in the form of said graphical data block GDB.

According to an example, said optical readable representation of the graphical data block GDB can comprise a digital representation of graphical symbols from a given finite set of graphical symbols, such as a QR CODE for example. Said digital representation of graphical symbol being configured to encode said digital mark MD and preferably a machine-readable error correction data block. These features are described in more detail hereafter.

According to a particular embodiment, the secret sent from the device DB to the device DA can be sent through a step of displaying a graphical representation of said secret by the display module DD(B) of the communication module CM(B) of the device DB and a step of reading said graphical representation by the optical reader module OR(A) of the communication module (CMA) of the device DA. Then, after signing this secret, and therefore generating said accreditation SA, the device DA can display a graphical representation of the accreditation SA using its display module DD(A). Then, the device DB reads the graphical representation of the accreditation SA using its optical reader module OR(B).

According to an embodiment, the present invention relates to a system of validation of the digital content of the digital message M received by the device DB controlled by the controller B through the communication network CN.

According to an embodiment, this system preferably comprises:
  the device DA controlled by the controller A. As previously indicated, the device DA comprises the processing unit CPU(A) with a memory storing the digital message M, and the communication module CM(A) adapted to send and receive data via the communication network CN.
  the device DB controlled by the controller B. As previously indicated, the device DB comprises the processing unit CPU(B) with a memory storing said aggregated digital signature ADS, and the communication module CM(B) adapted to send and receive data via the communication network CN. Advantageously, the processing unit CPU(B) of the device DB is configured to verify signed data with a corresponding public key. Preferably, its memory stores the previously discussed aggregated digital signature ADS.

This system is configured such a way that:
  the communication module CM(B) of the device DB is configured to receive the digital message M;
  Preferably, the digital message M is certified by the controller C, and advantageously, the processing unit CPU(B) of the device DB is configured to verify that the digital message M is certified by the controller C; and
  the processing unit CPU(B) of the device DB is configured to extract the authorization data AD(A) contained in the digital message M, preferably only in case of positive verification that the digital message M is certified by the controller C;
  the communication module CM(B) of the device DB is configured to receive from the communication module CM(A) of the device DA an accreditation SA, preferably signed by the processing unit CPU(A) of the device DA using its private key PrK(A), and/or comprising data, such as a secret, signed by the processing unit CPU(A) of the device DA using its private key PrK(A); preferably, said secret has been received by the communication module CM(A) of the device DA from the device DB and/or from the controller C;

the processing unit CPU(B) of the device DB is configured to verify the accreditation SA, preferably using the public key PuK(A) corresponding to said private key PrK(A), advantageously after extracting said public key PuK(A) from the digital message M;

the processing unit CPU(B) of the device DB is configured to:
  extract the verification key VK(A) contained in the message M,
  calculate, via the one-way function programmed in the processing unit CPU(B), a candidate digital signature cx(A) of the authorization data AD(A), and
  calculate a candidate aggregated digital signature cADS from the verification key VK(A) and the calculated candidate digital signature cx(A) of the authorization data AD(A); and the processing unit CPU(B) of the device DB is configured to check whether the candidate aggregated digital signature cADS matches with the aggregated digital signature ADS stored in its memory, and only in case of positive verification of the accreditation SA and positive matching of the candidate aggregated digital signature cADS with the aggregated digital signature ADS, the processing unit CPU(B) of the device DB is configured to transmit via the communication module CM(B) to the controller B an indication that the controller A is indeed authorized by the controller C to perform the operation Op.

This system allows the controller B to validate the digital content of the digital message M with a higher certainty than the solutions of the prior art. Moreover, this system allows the device DB to control the credentials linked to this digital content in order to check if this digital content is valid or not. This system allows the controller A, such as a robot for example, to identify itself just with the accreditation SA and its credentials that are in the digital message M and that are certified by a forgery proof digital file issued by the controller C. This system allows the controller B, such as another robot, to have complete confidence in the validity of the credentials that are presented.

It must be noted that this system avoids the use of biometrics data in the case where the controller A is a human for example, as it will be discussed hereafter. His credentials and the accreditation SA are enough to give a complete confidence to the recipient, the controller B here, which can be a robot, a computer or another human for example. Advantageously, this system avoids any biometrics data, biometric measurement or disclosure of private information.

According to an embodiment, the memory of the processing unit CPU(A) of the device DA is configured to store said private key PrK(A), preferably in a secured enclave of the memory, the processing unit CPU(A) being configured to sign data with the private key PrK(A).

According to an embodiment, the processing unit CPU(B) of the device DB is configured to verify signed data with a corresponding public key PuK, preferably received by the communication module CM(B).

According to an embodiment, the digital message M further comprises said public key PuK(A), corresponding to said private key PrK(A), said public key PuK(A) being accredited by the controller C.

According to an embodiment, the accreditation SA comprise accreditation data signed with said private key PrK(A).

According to an embodiment, the processing unit CPU(B) of the device DB is configured to extract the public key PuK(A) from the digital message M, and to verify said accreditation SA using said public key PuK(A).

According to an embodiment illustrated by the FIG. 1, this system is configured to execute a method of validation of the digital content of the digital message M received by the device DB controlled by the controller B through the communication network CN. Preferably, this method comprises the following steps:

the communication module CM(B) of the device DB receives 200, 100b the digital message M; Said digital message M can be received by the communication module CM(B) of the device DB from the controller C 100b or from the communication module CM(A) of the device DA 200; Preferably, the controller C sends 100a the digital message M to the communication module CM(A) of the device DA;

preferably, the digital message M is certified 10 by the controller C, and advantageously, the processing unit CPU(B) of the device DB verifies that the digital message M is certified 10 by the controller C; and the processing unit CPU(B) of the device DB extracts 201 the authorization data AD(A) contained in the digital message M, preferably only in case of positive verification that the digital message M is certified 10 by the controller C; As previously indicated, this digital message M can come from a printed message and/or a handwritten message becoming a digital message after conversion, using for example a scanner and/or a camera;

the communication module CM(B) of the device DB receives 400 from the communication module CM(A) of the device DA an accreditation SA, preferably signed with the private key PrK(A);

the processing unit CPU(B) of the device DB verifies 400b the accreditation SA, preferably using the public key PuK(A), advantageously after extracting 202 said public key PuK(A) from the digital message M;

the processing unit CPU(B) of the device DB:
  extracts 204 the verification key VK(A) contained in the digital message M,
  calculates 203, via the one-way function programmed in the processing unit CPU(B), a candidate digital signature cx(A) of the authorization data AD(A), and
  calculates 205 a candidate aggregated digital signature cADS from the verification key VK(A) and the calculated candidate digital signature cx(A) of the authorization data AD(A); and the processing unit CPU(B) of the device DB checks 207 whether the candidate aggregated digital signature cADS matches with the aggregated digital signature ADS stored in its memory, said aggregated digital signature ADS can have been uploaded 101 by the controller C to a server and downloaded 206 from said server by the device DB for example, and only in case of positive verification of the signed accreditation SA data and positive matching of the candidate aggregated digital signature cADS with the aggregated digital signature ADS, the processing unit CPU(B) of the device DB transmits 500 via the communication module CM(B) to the controller B an indication that the controller A is indeed authorized by the controller C to perform 500a the operation Op.

This method allows the controller B to validate the digital content of the digital message M with a higher certainty than the solutions of the prior art. Moreover, this method allows the device DB to control the credentials linked to this digital content in order to check if this digital content is valid or not. This method allows the controller A, such as a robot for example, to identify itself just with the accreditation SA and its credentials that are in the digital message M and that are certified by a forgery proof digital file issued by the controller C. This method allows the controller B, such as another robot, to have complete confidence in the validity of the credentials that are presented.

It must be noted that this method avoids the use of biometrics data in the case where the controller A is a human for example, as it will be discussed hereafter. His credentials and the accreditation SA are enough to give a complete confidence to the recipient, the controller B here, which can be a robot, a computer or another human for example. Advantageously, this method avoids any biometrics data, biometric measurement or disclosure of private information.

According to an embodiment, the device DB, through its communication module CM(B), can receive the digital message M in different ways. For example, the digital message M can be received from the device A through its communication module CM(A), and/or from the controller C, and/or from a server for example.

According to an embodiment, the device DB, through its communication module CM(B), can receive the digital message M directly in a digital format or first in a paper format that is converted into a digital format. For example, the communication module CM(B) can use the optical reader module OR(B) to optically read, i.e. scan, a paper containing a printed content and/or handwritten content in order to convert said printed content and/or handwritten content into the digital message M.

According to an embodiment, the communication network CN can comprise one or several kinds of communication network such as an optical communication network, a wired communication network, a wireless communication network, a radio-frequency communication network, and even a combination of several kinds of communication networks.

According to an embodiment, as for the reception of the digital message M, the public key PuK(A) corresponding to the private key PrK(A) owned by the controller A, can be received by the controller B in different ways. For example, the public key PuK(A) can be received from the controller C and/or from a server for example, and/or advantageously from the digital message M. Indeed, in some embodiments, the controller B can obtain the public key PuK(A) directly from the digital message M using the processing unit CPU(B) to extract it from the digital message M. According to another embodiment, the device DB can receive through its communication module CM(B) the public key PuK(A) from the controller C.

One way to describe the present invention according to an embodiment is as follow: a mission order in the form of a digital message M, to be executed by a controller A for the benefit of a controller B, is issued and certified by a controller C. One of the main goal of the present invention is to give the mean to said controller B to make sure that said mission order is indeed genuine and issued by said controller C and that said controller A is well mandated by said controller C to execute the given mission order.

According to an embodiment, the controller B receives the digital message M corresponding to or comprising said mission order from the controller A and/or from the controller C or through any other source or route. Then, the controller B checks that the digital message M, i.e. the mission order, is indeed valid, genuine, neither tampered nor counterfeited and that it has been well issued by the controller C.

According to an embodiment, the controller B submits a challenge to the controller A, preferably a one-time challenge. Then, the controller A signs the challenge with advantageously its Private Key PrK(A) and sends back the signed challenge to the controller B. Then, the controller B checks that the signature is indeed valid and preferably that it corresponds well to the Public key PuK(A) which is advantageously contained in the digital message M, for example in the mission order.

Then, according to a preferred embodiment, if both verifications are positive, the controller A can well execute the mission order to the benefit of the controller B.

According to an embodiment, the controller A can be taken among a robot, a computer, an internet of things device, a smartphone or a user, etc. . . . .

As it appears clearly, the present invention can find application in many technical areas. In order to illustrate some kinds of technical applications, several examples will now be discussed and illustrated through FIGS. 2 to 7.

Robots in a Secure Warehouse

Figure 2:
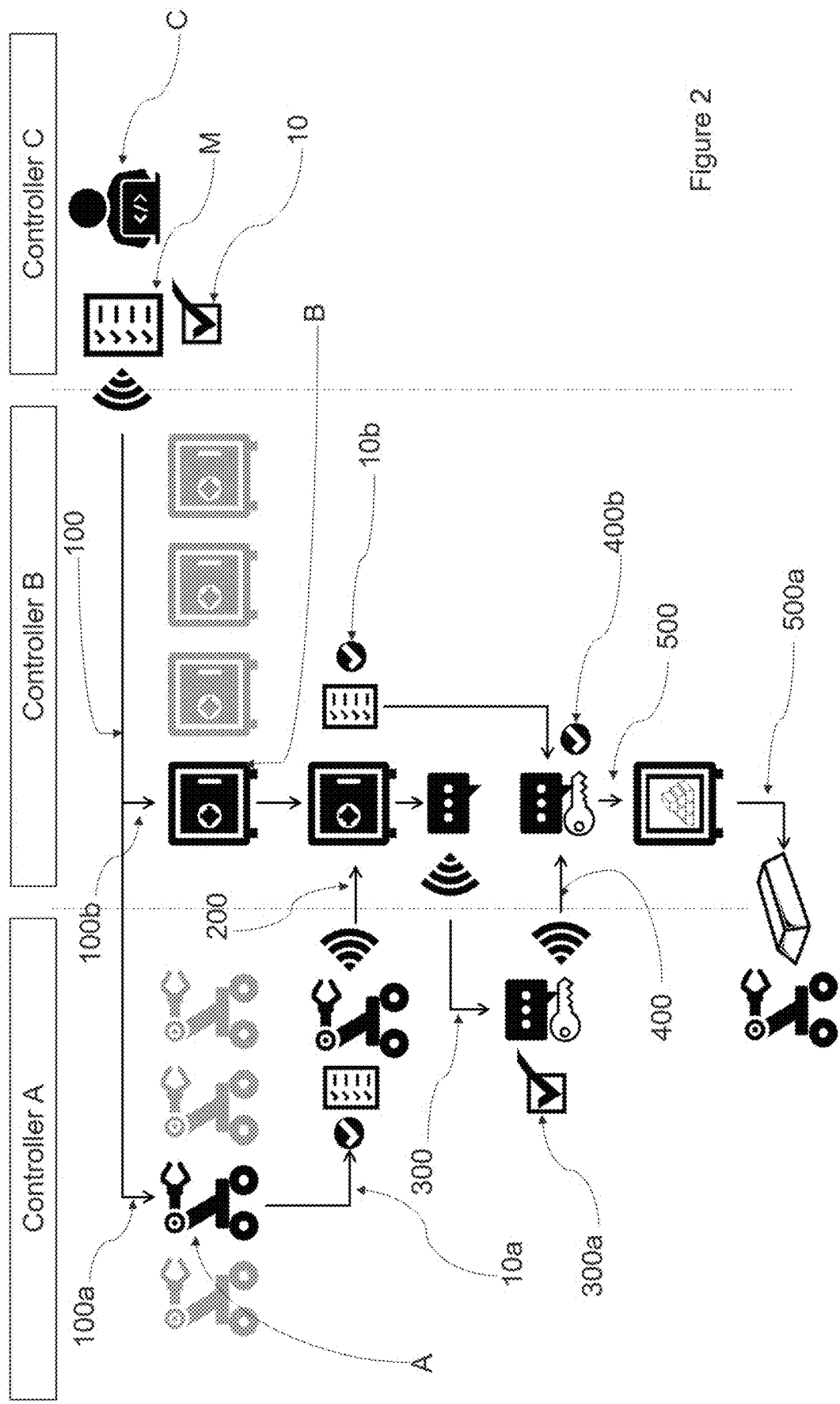
FIG. 2 is a schematic view of an embodiment of the present invention according to a first use case.

According to a first example of application of the present invention illustrated by FIG. 2, the present invention can be implemented in order to securely allow a robot to pick up high value goods, such as gold bar or jewellery for example, inside a secure warehouse.

According to this example, the controller A is a robot A designed to move inside a secure warehouse in order to collect and/or deliver goods. This robot A comprises the device DA. This robot A is preferably equipped with a motorized module configured to allow the displacement of the robot A, at least inside the secure warehouse. Therefore, the controller A can comprised wheels or caterpillar track, or any devices allowing it to move. The controller A can even be a drone, such as, for example a flying drone. This robot A is configured to pick up goods from at least one vault based on a mission order issued by a logistic centre C, being in this use case the controller C. The controller A, i.e. the robot A, comprises a private key PrK(A), preferably issued by the controller A; said private key PrK(A) being associated with a public key PuK(A), said public key PuK(A) being certified by the controller C, i.e. the logistic centre C, as owned by the controller A.

According to this example, the controller B is a vault B, preferably a smart vault, i.e. a vault comprising the device DB. The controller B can also be a motorized door of the vault. Said vault B is configured to deliver goods or let access a robot to get goods from the inside the vault B if said robot has a proper mission order issued by the logistic centre, acting as the controller C in this example.

According to this example, the controller C is a logistic centre C. Said logistic centre C is configured to issue 100 mission order using a digital message M sent 100a to the controller A. According to an embodiment, the digital message M is also sent 100b to the controller B by the controller C. For example, the digital message M can comprise a mission order in the form of a series of data indicating for example what the controller A has to do, when the controller A has to do it and for example where the controller A has to do it. In this example, the mission order can comprise the following data:

The robot A has the public key PuK(A);
A verification key VK(A);
An operation Op: The robot A has to fetch a specific good, for example a gold Bar No 429 which is located inside the vault B;
A time slot: This has to be done between 10.25 and 10.30 AM, for example.

According to an embodiment, when the robot A, i.e. controller A, receives the digital message M, it verifies 10a, using the processing unit CPU(A), that the digital message M is certified 10 by the controller C, and only in case of positive verification that the digital message M is certified 10 by the controller C, the processing unit CPU(A) of the device DA starts the extraction of the authorization data AD(A) contained in the digital message M. These authorization data AD(A) comprises preferably the data of the mission order regarding the robot A.

According to a preferred embodiment, when the vault B, i.e. controller B, receives 200 the digital message M, it verifies 10b, using the processing unit CPU(B), that the digital message M is certified 10 by the controller C, and only in case of positive verification that the digital message M is certified 10 by the controller C, the processing unit CPU(B) of the device DB starts the extraction 201 of the authorization data AD(A) contained in the digital message M. These authorization data AD(A) comprises preferably the data of the mission order.

Then, the controller B, i.e. the vault B, extracts 202, 204 from the digital message M different data such as the public key PuK(A) corresponding to the private key PrK(A) of the controller A, i.e. the robot A, the verification key(A), the data related to the operation Op, and for example the time slot mentioned in the mission order.

According to an embodiment, when the controller A, i.e. the robot A, is in front of the controller B, i.e. the vault B, the controller B sends 300 a challenge to the controller A. For example, this challenge can be a random number generated by a random number generator module GRNM(B) of the device DB. According to an embodiment, when the controller A receives said challenge through its device DA, advantageously through the communication module CM(A) of the device DA, it signs 300a it with its private key PrK(A), more precisely, the processing unit CPU(A) of the device DA signs 300a the challenge using the private key PrK(A) generating said accreditation SA. Then, the controller A sends 400 back to the controller B the accreditation SA.

Then, the controller B, i.e. the vault B in this example, checks 400b the validity of the accreditation SA using the public key PuK(A), which has been extracted 202 by the processing unit CPU(B) from the digital message M, and which is preferably in the mission order, i.e. the authorization data AD(A).

Then, the processing unit CPU(B) of the device DB calculates 203, via a one-way function programmed in the processing unit CPU(B), a candidate digital signature cx(A) of the authorization data AD(A), and calculates 205 a candidate aggregated digital signature cADS from the verification key VK(A) and the calculated candidate digital signature cx(A) of the authorization data AD(A); and the processing unit CPU(B) of the device DB checks 207 whether the candidate aggregated digital signature cADS matches with the aggregated digital signature ADS stored 206 in its memory. According to an embodiment, said aggregated digital signature ADS has been received by the controller B from the controller C and/or from a server. Then said aggregated digital signature ADS have been stored 206 in the memory of the processing unit CPU(B) of the controller B, i.ie the vault B in this example.

According to an embodiment, the vault B extracts other data from the digital message M, such as the time slot when the robot A must operate, such as between 10.25 and 10.30 in this example.

Then, if the time is well between 10.25 and 10.30, if the verification 400b of the accreditation SA is positive and if the candidate aggregated digital signature cADS matches 207 with the aggregated digital signature ADS, the vault B, i.e. controller B, receives 500 from its processing unit CPU(B) an indication that the robot A is indeed authorized by the logistic centre C to perform 500a the operation Op mentioned in the mission order contained in the digital message M. Therefore, the vault B delivers to the robot A the gold bar No 429, or let the robot A pick up the gold bar No 429.

According to this example of use case of the present invention, the system preferably comprises:

The robot A comprising and controlling the device DA, said robot A being configured to move at least inside a secure warehouse, said warehouse comprising a logistic centre;

The vault B comprising and controlling the device DB, said vault B being configured to deliver a good to an authorized robot and/or let a robot pick up a good contained in the vault;

This system is configured such a way that:

the communication module CM(B) of the device DB is configured to receive 100b, 200 the digital message M comprising a mission order, said mission order containing a public key PuK(A) owned by the robot A, an authorization data AD(A) indicating that the robot A is authorized by the logistic centre C to perform an operation Op with the vault B, a verification key VK(A), a time slot when this operation Op has to be executed, etc., Preferably, the processing unit CPU(B) of the device DB is configured to verify 10b that the digital message M is certified by the logistic centre C; and, The processing unit CPU(B) of the device DB is configured to extract 201, 202, 204 the data contained in the digital message M, such as the public key PuK(A), the authorization data AD(A), the operation Op, the verification key VK(A), the time slot when this operation Op has to be executed, etc . . . , preferably, only in case of positive verification that the digital message M is certified by the logistic centre C;

the communication module CM(B) of the device DB is configured to receive 400 from the communication module CM(A) of the device DA an accreditation SA, preferably signed 300a by the processing unit CPU(A) of the device DA using its private key PrK(A), and/or comprising data, such as a secret, signed 300a by the processing unit CPU(A) of the device DA using its private key PrK(A); preferably, said secret has been sent 300 from the communication module CM(B) of the device DB to the communication module CM(A) of the device DA;

the processing unit CPU(B) of the device DB is configured to verify 400b the accreditation SA, preferably using the public key PuK(A) corresponding to said private key PrK(A), advantageously after extracting 202 said public key PuK(A) from the digital message M;

the processing unit CPU(B) of the device DB is configured to:

calculate 203, via the one-way function programmed in the processing unit CPU(B), a candidate digital signature cx(A) of the authorization data AD(A), and calculate 205 a candidate aggregated digital signature cADS from the verification key VK(A) and the calculated candidate digital signature cx(A) of the authorization data AD(A); and the processing unit CPU(B) of the device DB is configured to check 207 whether the candidate aggregated digital signature cADS matches with the aggregated digital signature ADS stored 206 in its memory, and only in case of positive verification of the accreditation SA and positive matching of the candidate aggregated digital signature cADS with the aggregated digital signature ADS, the processing unit CPU(B) of the device DB is configured to transmit 500 to the vault an indication that the robot is indeed authorized by the logistic centre to perform 500a the operation Op.

This system allows the device DB to validate the digital content of the digital message M with a higher certainty than the solutions of the prior art. Moreover, this system allows the device DB to control the mission order, i.e. the credentials, linked to this digital content in order to check if this digital content is valid or not. This system allows the robot A to identify itself just with the accreditation SA and the digital message M which is certified preferably by a forgery proof digital file issued by the controller C. This system allows the vault B to have complete confidence in the validity of the mission order that is presented.

According to this example of use case of the present invention, the invention relates, according to an embodiment, to a method wherein:

The robot A comprises and controls the device DA, said robot A being configured to move at least inside a secure warehouse, said warehouse comprising a logistic centre;

The vault B comprises and controls the device DB, said vault B being configured to deliver a good to an authorized robot and/or let a robot pick up a good contained in the vault;

This method comprises the following steps:

the communication module CM(B) of the device DB receives 100b, 200 the digital message M comprising a mission order, said mission order containing a public key PuK(A) owned by the robot, an authorization data AD(A) indicating that the robot is authorized by the logistic centre to perform an operation Op with the vault, a verification key VK(A), a time slot when this operation Op has to be executed, etc., Preferably, the processing unit CPU(B) of the device DB verifies 10b that the digital message M is certified by the logistic centre of the warehouse; and, The processing unit CPU(B) of the device DB extracts 201, 202, 204 the data contained in the digital message M, such as the public key PuK(A), the authorization data AD(A), the operation Op, the verification key VK(A), the time slot when this operation Op has to be executed, etc . . . , preferably only in case of positive verification that the digital message M is certified by the logistic centre;

the communication module CM(B) of the device DB receives 400 from the communication module CM(A) of the device DA an accreditation SA, preferably signed 300a by the processing unit CPU(A) of the device DA using its private key PrK(A), and/or comprising data, such as a secret, signed 300a by the processing unit CPU(A) of the device DA using its private key PrK(A); preferably, said secret has been sent 300 from the communication module CM(B) of the device DB to the communication module CM(A) of the device DA;

the processing unit CPU(B) of the device DB verifies 400b the accreditation SA, preferably using the public key PuK(A) corresponding to said private key PrK(A), advantageously after extracting 202 said public key PuK(A) from the digital message M;

the processing unit CPU(B) of the device DB:
extracts 204 the verification key VK(A) contained in the digital message M,
calculates 203, via the one-way function programmed in the processing unit CPU(B), a candidate digital signature cx(A) of the authorization data AD(A), and
calculates 205 a candidate aggregated digital signature cADS from the verification key VK(A) and the calculated candidate digital signature cx(A) of the authorization data AD(A); and the processing unit CPU(B) of the device DB checks 207 whether the candidate aggregated digital signature cADS matches with the aggregated digital signature ADS stored 206 in its memory, and only in case of positive verification of the accreditation SA and positive matching of the candidate aggregated digital signature cADS with the aggregated digital signature ADS, the processing unit CPU(B) of the device DB transmits 500 to the vault an indication that the robot is indeed authorized by the logistic centre to perform 500a the operation Op.

This system allows the device DB to validate the digital content of the digital message M with a higher certainty than the solutions of the prior art. Moreover, this system allows the device DB to control the credentials linked to this digital content in order to check if this digital content is valid or not. This system allows the robot A to identify itself just with the accreditation SA and the digital message M which is certified by a forgery proof digital file issued by the controller C. This system allows the vault B to have complete confidence in the validity of the mission order that is presented.

According to an embodiment, the present invention allows that the operation Op be done by the controller A without the need to contact a central database or server containing the mission order. Indeed, the vault B as well as the robot A can be in an offline environment as far as they can communicate with each other during the implementation of the method according to an embodiment of the present invention, and preferably as far as the controller B comprised the aggregated digital signature ADS, for example previously downloaded from the controller C or from a server. Advantageously, the sending of the digital message M to the robot A and to the vault B can be realized through non-secured channels.

According to an embodiment, the present invention relates to the implementation of the method according to the present invention in a secure warehouse comprising the previous system according to the present invention.

According to an embodiment, the present invention can be used to transfer tokens from one controller to another controller, i.e. from one device to another device.

According to an embodiment, the controller B can deliver a certain quantity of tokens to the controller A according to a mission order of controller B and/or to a mission order of the controller A, i.e. the gold bar No 429 can be replaced by at least one digital asset.

In this embodiment, the device DA can be a smartphone, a smartcard, a server or a computer, and the device DB can be a smartphone, a smartcard, a server or a computer, and the controller C can be a financial institution or a bank.

Internet of Thing (IoT) Secure Communication

Figure 3:
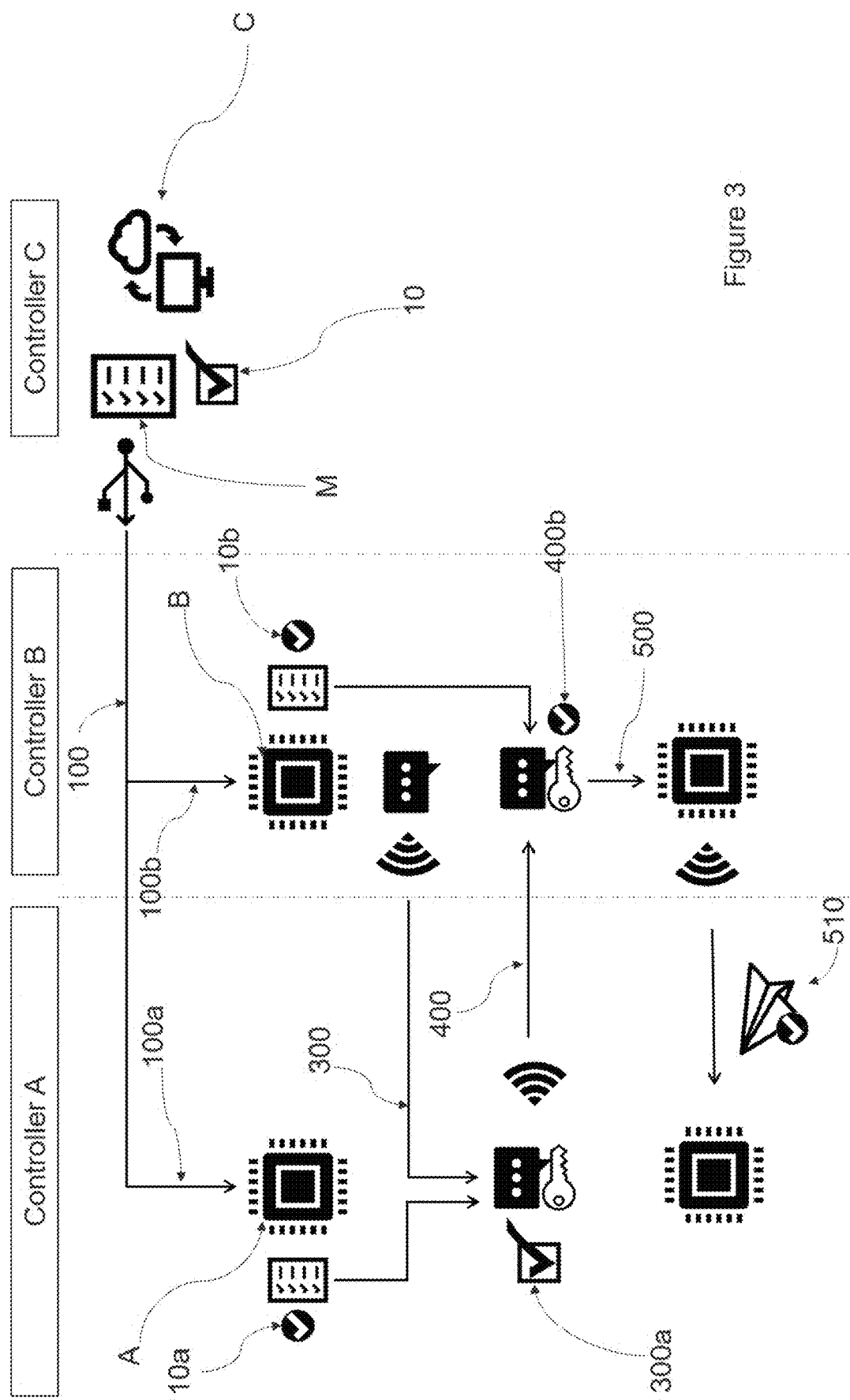
FIG. 3 is a schematic view of an embodiment of the present invention according to a second use case.

According to a second example of application of the present invention illustrated by the FIG. 3, the present invention can be implemented in an internet of thing environment, commonly named an IoT network, in order to secure the communication between several devices, such as internet of things devices, named IoT devices. In this example, and according to an embodiment of the present invention, the system comprises a controller A, a controller B and a controller C, such as previously described. The controller C is, for example, a command centre C. Controllers A and B are, for examples, computers, servers, robots, and/or smartphones. Each one of the controllers A and B can be a kind of IoT different from the other. For example, the controller A can be a smartphone A and controller B can be a computer B.

Preferably, the controller A, B and C form togethers an IoT network using the communication network CN to communicate.

Advantageously, the controller A is configured to send data to at least one other controller, such for example controller B. For example, the device DA controlled by the controller A is configured to send data through its communication module CM(A) to the device DB controlled by the controller B. In this example, the device DB is configured to received data through its communication module CM(B) from the communication module CM(A) of the device DA.

According to a preferred embodiment, the controller A comprises a private key PrK(A), preferably issued by the controller A, and being associated with a public key PuK(A); said public key PuK(A) is accredited by the controller C, i.e. the command centre C for example. Said private key PrK(A) is preferably stored in the memory of the processing unit CPU(A) of the device DA controlled by the controller A, preferably in a secured enclave of the memory.

According to an embodiment, the controller B is configured to collect data sent from another controller as far as controller B has received and verified an order of mission issued by the controller C indicating that said another controller is allowed to send data to the controller B, and for example during a precise time slot. This order of mission, as described hereafter, can comprises several other data that are considered by the controller B to allow the reception of data sent by said another controller.

According to an embodiment, the controller B is configured to send data to at least one other controller, such for example controller A. For example, the device DB controlled by the controller B is configured to send data through its communication module CM(B) to the device DA controlled by the controller A. In this example, the device DA is configured to received data through its communication module CM(A) from the communication module CM(B) of the device DB.

According to an embodiment, the controller B comprises a private key PrK(B), preferably issued by the controller B, and being associated with a public key PuK(B); said public key PuK(B) is accredited by the controller C, i.e. the command centre C for example. Said private key PrK(B) is preferably stored in the memory of the processing unit CPU(B) of the device DB controlled by the controller B, preferably in a secured enclave of the memory.

According to an embodiment, the controller A is configured to collect data sent from another controller as far as controller A has received and verified an order of mission issued by the controller C indicating that said another controller is allowed to send data to the controller A, and for example during a precise time slot. This order of mission, as described hereafter, can comprises several other data that are considered by the controller A to allow the reception of data sent by said another controller.

According to an embodiment, each of the controllers A and B comprises the same technical functionalities. In this example each of these controllers can have a mission order issued by the controller C allowing it to execute an operation Op in relation with the other controller among controller A and controller B.

According to an example, the controller C is a command centre C. Said command centre C is configured to issue mission order using a digital message M sent to the controller A and/or B. For example, the digital message M can comprise a mission order in the form of a plurality of data indicating for example what a given controller has to do, and for example when this given controller has to do it. In this example, the controller C issues two mission orders through two digital messages M, one named M(A) regarding controller A, and another named M(B) regarding controller B.

According to an embodiment, the controller A is designed to execute operation Op(A) related to the controller B only if controller A has a mission order issued by the controller C in the form of the digital message M(A) and that controller B has verified several parameters regarding said digital message M(A) and said controller A before accepting that controller A executes the operation Op(A).

According to an embodiment, the controller B is designed to execute operation Op(B) related to the controller A only if controller B has a mission order issued by the controller C in the form of the digital message M(B) and that controller A has verified several parameters regarding said digital message M(B) and said controller B before accepting that controller B executes the operation Op(B).

For example, the digital message M(A) can comprise a mission order comprising the following data:
Controller A has the public key PuK(A);
A verification key VK(A);
An operation Op(A): Controller A is allowed to send a set of data SeD(A) to the controller B, and is allowed to receive a set of data SeD(B) from the controller B;
A time slot: This can only be done on Jun. 10, 2021, for example.

For example, the digital message M(B) can comprise a mission order comprising the following data:
Controller B has the public key PuK(B);
A verification key VK(B);
An operation Op(B): Controller B is allowed to send a set of data SeD(B) to the controller A, and is allowed to receive a set of data SeD(A) from the controller A;
A time slot: This can only be done on Jun. 10, 2021, for example.

According to a preferred embodiment, when controller A, such as a smartphone in this example, receives the digital message M(B), it verifies, using its processing unit CPU(A), that the digital message M(B) is certified by the controller C, and only in case of positive verification that the digital message M(B) is certified by the controller C, the processing unit CPU(A) of the device DA, controlled by the controller A, starts the extraction of the authorization data AD(B) contained in the digital message M(B). These authorization data AD(B) comprises preferably the data of the mission order regarding the controller B.

Then, the controller A, i.e. the smartphone, extracts from the digital message M(B) different data such as the public key PuK(B) corresponding to the private key PrK(B) of the controller B, i.e. the computer in this example, the verification key VK(B), the data related to the operation Op(B), and for example the time slot mentioned in the mission order.

According to a preferred embodiment, when controller B, such as a computer in this example, receives the digital message M(A), it verifies, using its processing unit CPU(B), that the digital message M(A) is certified by the controller C, and only in case of positive verification that the digital message M(A) is certified by the controller C, the processing unit CPU(B) of the device DB, controlled by the controller B, starts the extraction of the authorization data AD(A) contained in the digital message M(A). These authorization data AD(A) comprises preferably the data of the mission order regarding the controller A.

Then, the controller B, i.e. the computer, extracts from the digital message M(A) different data such as the public key PuK(A) corresponding to the private key PrK(A) of the controller A, i.e. the smartphone in this example, the verification key VK(A), the data related to the operation Op(A), and for example the time slot mentioned in the mission order.

According to an embodiment, the controller A comprises the digital message M(A) stored in the memory of the processing unit CPU(A) of its device DA, and preferably received from the controller C. In this example controller A is a smartphone that has to upload a set of data to the computer, i.e. controller B.

In this example the device DA is a part of the smartphone.

According to an embodiment, the controller B comprises the digital message M(B) stored in the memory of the processing unit CPU(A) of its device DA, and preferably received from the controller C. In this example controller B is a computer that has to upload a set of data to the smartphone, i.e. controller A.

In this example the device DB is a part of the computer.

According to an embodiment, to execute the operations Op(A) and Op(B):

Controller B receives 100b the digital message M(A), preferably from the controller C;

Controller A receives 100a the digital message M(B), preferably from the controller C;

Preferably, the controller B verifies 10b, using its processing unit CPU(B), that the digital message M(A) is certified by the controller C;

Preferably, the controller A verifies 10a, using its processing unit CPU(A), that the digital message M(B) is certified by the controller C;

Controller B, i.e. the computer, extracts 201, 202, 204 from the digital message M(A) different data such as the public key PuK(A) corresponding to the private key PrK(A) of the controller A, i.e. the smartphone, the verification key(A), the data related to the operation Op(A), and for example the time slot mentioned in the mission order of the controller A, preferably only in case of positive verification that the digital message M(A) is certified by the controller C. These authorization data AD(A) comprises preferably the data of the mission order of the controller A;

Controller A, i.e. the smartphone, extracts from the digital message M(B) different data such as the public key PuK(B) corresponding to the private key PrK(B) of the controller B, i.e. the computer, the verification key(B), the data related to the operation Op(B), and for example the time slot mentioned in the mission order of the controller B, preferably, only in case of positive verification that the digital message M(B) is certified by the controller C. These authorization data AD(B) comprises preferably the data of the mission order of the controller B;

Controller B sends 300 a challenge Ch(B) to the controller A; preferably, the communication module CM(B) of the device DB sends 300 a challenge Ch(B) to the communication module CM(A) of the device DA through the communication network CN; the challenge Ch(B) is configured to allow the device DB to verify that controller B is indeed communicating with the controller A mentioned in the digital message M(A); said challenge can comprise a secret, preferably a one-time secret, such as a random number, advantageously generated by the random number generator module GRNM(B) of the device DB;

Controller A sends a challenge Ch(A) to the controller B; preferably, the communication module CM(A) of the device DA sends a challenge Ch(A) to the communication module CM(B) of the device DB through the communication network CN; the challenge Ch(A) is configured to allow the device DA to verify that controller A is indeed communicating with the controller B mentioned in the digital message M(B); said challenge can comprise a secret, preferably a one-time secret, such as a random number, advantageously generated by the random number generator module GRNM(A) of the device DA;

The processing unit CPU(A) of the device DA signs 300a the challenge Ch(B) using the private key PrK(A) generating an accreditation SA(A);

The processing unit CPU(B) of the device DB signs the challenge Ch(A) using the private key PrK(B) generating an accreditation SA(B);

Controller A sends 400 the accreditation SA(A) to the controller B; preferably, the communication module CM(A) of the device DA sends 400 the accreditation SA(A) to the communication module CM(B) of the device DB through the communication network CN;

Controller B sends the accreditation SA(B) to the controller A; preferably, the communication module CM(B) of the device DB sends the accreditation SA(B) to the communication module CM(A) of the device DA through the communication network CN;

Controller B checks 400b the validity of the accreditation SA(A) using the public key PuK(A), which has been extracted 202 by the processing unit CPU(B) from the digital message M(A), and which is preferably in the mission order of the controller A;

Controller A checks the validity of the accreditation SA(B) using the public key PuK(B), which has been extracted by the processing unit CPU(A) from the digital message M(B), and which is preferably in the mission order of the controller B;

The processing unit CPU(B) of the device DB calculates 203, via a one-way function programmed in the processing unit CPU(B), a candidate digital signature cx(A) of the authorization data AD(A), and calculates 205 a candidate aggregated digital signature cADS(A) from the verification key VK(A) and the calculated candidate digital signature cx(A) of the authorization data AD(A);

The processing unit CPU(A) of the device DA calculates, via a one-way function programmed in the processing unit CPU(A), a candidate digital signature cx(B) of the authorization data AD(B), and calculates a candidate aggregated digital signature cADS(B) from the verification key VK(B) and the calculated candidate digital signature cx(B) of the authorization data AD(B);

The processing unit CPU(B) of the device DB checks 207 whether the candidate aggregated digital signature cADS(A) matches with the aggregated digital signature ADS(A), preferably stored in its memory; according to an embodiment, said aggregated digital signature ADS(A) has been received by the controller B from the controller C and/or from a server; then said aggregated digital signature ADS(A) have been stored 206 in the memory of the processing unit CPU(B) of the controller B, i.ie the computer in this example;

The processing unit CPU(A) of the device DA checks whether the candidate aggregated digital signature cADS(B) matches with the aggregated digital signature ADS(B), preferably stored in its memory; according to an embodiment, said aggregated digital signature ADS (B) has been received by the controller A from the controller C and/or from a server; then said aggregated digital signature ADS(B) have been stored in the memory of the processing unit CPU(A) of the controller A, i.ie the smartphone in this example;

If the date is well the date mentioned in the digital message M(A), for example Jun. 10, 2021, if the verification of the accreditation SA(A) is positive and if the candidate aggregated digital signature cADS(A) matches 207 with the aggregated digital signature ADS (A), the computer, i.e. controller B, receives 500 from its processing unit CPU(B) an indication that the controller A is indeed authorized by the controller C to perform the operation Op(A) mentioned in the mission order contained in the digital message M(A);

If the date is well the date mentioned in the digital message M(B), for example Jun. 10, 2021, if the verification of the accreditation SA(B) is positive and if the candidate aggregated digital signature cADS(B) matches with the aggregated digital signature ADS(B), the smartphone, i.e. controller A, receives from its processing unit CPU(A) an indication that the controller B is indeed authorized by the controller C to perform the operation Op(B) mentioned in the mission order contained in the digital message M(B);

Controller B accepts the set of data SeD(A) sent by the controller A; preferably the processing unit CPU(B) of the device DB sends an instruction to the communication module CM(B) of the device DB indicating that the communication module CM(B) can accept the set of data SeD(A) sent by the communication module CM(A) of the device DA;

Controller A accepts the set of data SeD(B) sent 510 by the controller B; preferably the processing unit CPU(A) of the device DA sends an instruction to the communication module CM(A) of the device DA indicating that the communication module CM(A) can accept the set of data SeD(B) sent by the communication module CM(B) of the device DB;

Controller A and controller B can therefore exchange data with a complete trust in each other.

According to an embodiment, the present invention can be used to transfer tokens from one controller to another controller, i.e. from one device to another device.

According to an embodiment, the set of data SeD(A) and/or SeD(B) can comprise tokens; the present invention can therefore be used to transfer tokens from one controller to another controller.

According to an embodiment, the controller B can deliver a certain quantity of tokens to the controller A according to the mission order of controller B and/or to the mission order of the controller A.

In another embodiment, controller A can be configured to deliver a certain quantity of tokens to controller B according to the mission order of controller B and/or to the mission order of the controller A.

In these embodiments, the device DA can be a smartphone, a smartcard, a server or a computer, and the device DB can be a smartphone, a smartcard, a server or a computer, and the controller C can be a financial institution or a bank.

According to this example of use case of the present invention, the system preferably comprises:

The controller A comprising and controlling the device DA, said device DA being configured to send and receive data; Said device DA can be a smartphone for example or a part of a smartphone in the case where the controller A is a smartphone;

The controller B comprising and controlling the device DB, said device DB being configured to send and receive data; Said device DB can be a computer for example or a part of a computer in the case where the controller B is a computer;

This system is configured such a way that:

the communication module CM(B) of the device DB is configured to receive 100b the digital message M(A) comprising a mission order related to the controller A, said mission order containing a public key PuK(A) owned by the controller A, an authorization data AD(A) indicating that the controller A is authorized by the controller C to perform an operation Op(A) with the controller B, a verification key VK(A), a time slot when this operation Op(A) can be executed, etc., the communication module CM(A) of the device DA is configured to receive 100a the digital message M(B) comprising a mission order related to the controller B, said mission order containing a public key PuK(B) owned by the controller B, an authorization data AD(B) indicating that the controller B is authorized by the controller C to perform an operation Op(B) with the controller A, a verification key VK(B), a time slot when this operation Op(B) can be executed, etc., Preferably, the processing unit CPU(B) of the device DB is configured to verify 10b that the digital message M(A) is certified by the controller C;

Preferably, the processing unit CPU(A) of the device DA is configured to verify 10a that the digital message M(B) is certified by the controller C;

The processing unit CPU(B) of the device DB is configured to extract 201, 202, 204 the data contained in the digital message M(A), such as the public key PuK(A), the authorization data AD(A), the operation Op(A), the verification key VK(A), the time slot when this operation Op(A) can be executed, etc . . . , preferably, only in case of positive verification that the digital message M(A) is certified by the controller C;

The processing unit CPU(A) of the device DA is configured to extract the data contained in the digital message M(B), such as the public key PuK(B), the authorization data AD(B), the operation Op(B), the verification key VK(B), the time slot when this operation Op(B) can be executed, etc . . . , preferably, only in case of positive verification that the digital message M(B) is certified by the controller C the communication module CM(B) of the device DB is configured to receive 400 from the communication module CM(A) of the device DA an accreditation SA(A), preferably signed 300a by the processing unit CPU(A) of the device DA using its private key PrK(A), and/or comprising data, such as a secret, signed 300a by the processing unit CPU(A) of the device DA using its private key PrK(A); preferably, said secret has been sent 300 from the communication module CM(B) of the device DB to the communication module CM(A) of the device DA;

the communication module CM(A) of the device DA is configured to receive from the communication module CM(B) of the device DB an accreditation SA(B), preferably signed by the processing unit CPU(B) of the device DB using its private key PrK(B), and/or comprising data, such as an another secret, signed by the processing unit CPU(B) of the device DB using its private key PrK(B); preferably, said another secret has been sent from the communication module CM(A) of the device DA to the communication module CM(B) of the device DB;

the processing unit CPU(B) of the device DB is configured to verify 400b the accreditation SA(A), preferably using the public key PuK(A) corresponding to said private key PrK(A), advantageously after extracting 202 said public key PuK(A) from the digital message M(A);

the processing unit CPU(A) of the device DA is configured to verify the accreditation SA(B), preferably using the public key PuK(B) corresponding to said private key PrK(B), advantageously after extracting said public key PuK(B) from the digital message M(B);

the processing unit CPU(B) of the device DB is configured to:
calculate 203, via the one-way function programmed in the processing unit CPU(B), a candidate digital signature cx(A) of the authorization data AD(A), and
calculate 205 a candidate aggregated digital signature cADS(A) from the verification key VK(A) and the calculated candidate digital signature cx(A) of the authorization data AD(A);

the processing unit CPU(A) of the device DA is configured to:
calculate, via the one-way function programmed in the processing unit CPU(A), a candidate digital signature cx(B) of the authorization data AD(B), and
calculate a candidate aggregated digital signature cADS(B) from the verification key VK(B) and the calculated candidate digital signature cx(B) of the authorization data AD(B);

the processing unit CPU(B) of the device DB is configured to check 207 whether the candidate aggregated digital signature cADS(A) matches with the aggregated digital signature ADS(A) stored 206 in its memory, and only in case of positive verification of the accreditation SA(A) and positive matching of the candidate aggregated digital signature cADS(A) with the aggregated digital signature ADS(A), the processing unit CPU(B) of the device DB is configured to transmit 500 to the controller B an indication that the controller A is indeed authorized by the controller C to perform 500a the operation Op(A).

the processing unit CPU(A) of the device DA is configured to check whether the candidate aggregated digital signature cADS(B) matches with the aggregated digital signature ADS(B) stored in its memory, and only in case of positive verification of the accreditation SA(B) and positive matching of the candidate aggregated digital signature cADS(B) with the aggregated digital signature ADS(B), the processing unit CPU(A) of the device DA is configured to transmit to the controller A an indication that the controller B is indeed authorized by the controller C to perform 510 the operation Op(B).

This system allows the controller B to validate the digital content of the digital message M(A) and the controller A to validate the digital content of the digital message M(B), with a higher certainty than the solutions of the prior art. Moreover, this system allows the controller B to control the credentials linked to this digital content in order to check if the digital content of the digital message M(A) is valid or not, and the controller A to control the credentials linked to this digital content in order to check if the digital content of the digital message M(B) is valid or not. This system allows the controller A to identify itself just with the accreditation SA(A) and the digital message M(A) which is certified preferably by a forgery proof digital file issued by the controller C, and the controller B to identify itself just with the accreditation SA(B) and the digital message M(B) which is certified preferably by a forgery proof digital file issued by the controller C. This system allows the controller B to have complete confidence in the validity of the mission order that is presented, and the controller A to have complete confidence in the validity of the mission order that is presented.

According to this example of use case of the present invention, the invention relates, according to an embodiment, to a method wherein:

The controller A comprises and controls the device DA, said device DA being configured to send and receive data;

The controller B comprises and controls the device DB, said device DB being configured to send and receive data;

This method comprises the following steps:

the communication module CM(B) of the device DB receives 100b the digital message M(A) comprising a mission order related to the controller A, said mission order containing a public key PuK(A) owned by the controller A, an authorization data AD(A) indicating that the controller A is authorized by the controller C to perform an operation Op(A) with the controller B, a verification key VK(A), a time slot when this operation Op(A) can be executed, etc., the communication module CM(A) of the device DA receives 100a the digital message M(B) comprising a mission order related to the controller B, said mission order containing a public key PuK(B) owned by the controller B, an authorization data AD(B) indicating that the controller B is authorized by the controller C to perform an operation Op(B) with the controller A, a verification key VK(B), a time slot when this operation Op(B) can be executed, etc., Preferably, the processing unit CPU(B) of the device DB verifies 10b that the digital message M(A) is certified by the controller C;

Preferably, the processing unit CPU(A) of the device DA verifies 10a that the digital message M(B) is certified by the controller C;

The processing unit CPU(B) of the device DB extracts 201, 202, 204 the data contained in the digital message M(A), such as the public key PuK(A), the authorization data AD(A), the operation Op(A), the verification key VK(A), the time slot when this operation Op(A) can be executed, etc . . . , preferably, only in case of positive verification that the digital message M(A) is certified by the controller C;

The processing unit CPU(A) of the device DA extracts the data contained in the digital message M(B), such as the public key PuK(B), the authorization data AD(B), the operation Op(B), the verification key VK(B), the time slot when this operation Op(B) can be executed, etc . . . , preferably, only in case of positive verification that the digital message M(B) is certified by the controller C;

the communication module CM(B) of the device DB receives 400 from the communication module CM(A) of the device DA an accreditation SA(A), preferably signed 300a by the processing unit CPU(A) of the device DA using its private key PrK(A), and/or comprising data, such as a secret, signed 300a by the processing unit CPU(A) of the device DA using its private key PrK(A); preferably, said secret has been sent 300 from the communication module CM(B) of the device DB to the communication module CM(A) of the device DA;

the communication module CM(A) of the device DA receives from the communication module CM(B) of the device DB an accreditation SA(B), preferably signed by the processing unit CPU(B) of the device DB using its private key PrK(B), and/or comprising data, such as an another secret, signed by the processing unit CPU(B) of the device DB using its private key PrK(B); preferably, said another secret has been sent from the communication module CM(A) of the device DA to the communication module CM(B) of the device DB;

the processing unit CPU(B) of the device DB verifies 400b the accreditation SA(A), preferably using the public key PuK(A) corresponding to said private key PrK(A), advantageously after extracting said public key PuK(A) from the digital message M(A);

the processing unit CPU(A) of the device DA verifies the accreditation SA(B), preferably using the public key PuK(B) corresponding to said private key PrK(B), advantageously after extracting said public key PuK(B) from the digital message M(B);

the processing unit CPU(B) of the device DB:
  extracts 204 the verification key VK(A) contained in the digital message M(A),
  calculates 203, via the one-way function programmed in the processing unit CPU(B), a candidate 205 digital signature cx(A) of the authorization data AD(A), and
  calculates a candidate aggregated digital signature cADS(A) from the verification key VK(A) and the calculated candidate digital signature cx(A) of the authorization data AD(A);

the processing unit CPU(A) of the device DA:
  extracts the verification key VK(B) contained in the digital message M(B),
  calculates, via the one-way function programmed in the processing unit CPU(A), a candidate digital signature cx(B) of the authorization data AD(B), and
  calculates a candidate aggregated digital signature cADS(B) from the verification key VK(B) and the calculated candidate digital signature cx(B) of the authorization data AD(B);

the processing unit CPU(B) of the device DB checks 207 whether the candidate aggregated digital signature cADS(A) matches with the aggregated digital signature ADS(A) stored 206 in its memory, and only in case of positive verification of the accreditation SA(A) and positive matching of the candidate aggregated digital signature cADS(A) with the aggregated digital signature ADS(A), the processing unit CPU(B) of the device DB transmits 500 to the controller B an indication that the controller A is indeed authorized by the controller C to perform 500a the operation Op(A).

the processing unit CPU(A) of the device DA checks whether the candidate aggregated digital signature cADS(B) matches with the aggregated digital signature ADS(B) stored in its memory, and only in case of positive verification of the accreditation SA(B) and positive matching of the candidate aggregated digital signature cADS(B) with the aggregated digital signature ADS(B), the processing unit CPU(A) of the device DA transmits to the controller A an indication that the controller B is indeed authorized by the controller C to perform 510 the operation Op(B).

This system allows the controller B to validate the digital content of the digital message M(A) and the controller A to validate the digital content of the digital message M(B) with a higher certainty than the solutions of the prior art. Moreover, this system allows the controller B to control the credentials linked to the digital content of the digital message M(A) in order to check if this digital content is valid or not, and allows the controller A to control the credentials linked to the digital content of the digital message M(B) in order to check if this digital content is valid or not. This system allows the controller A to identify itself just with the accreditation SA(A) and the digital message M(A) which is certified by a forgery proof digital file issued by the controller C, and allows the controller B to identify itself just with the accreditation SA(B) and the digital message M(B) which is certified by a forgery proof digital file issued by the controller C. This system allows the controller B to have complete confidence in the validity of the mission order that is presented, and the controller A to have complete confidence in the validity of the mission order that is presented.

According to an embodiment, the present invention allows that the operation Op(A) be done by the controller A and the operation Op(B) be done by the controller B without the need to contact a central database or server containing the mission order. Indeed, the controller B as well as the controller A can be in an offline environment as far as they can communicate with each other during the implementation of the method according to an embodiment of the present invention, and preferably as far as the controller A comprised the aggregated digital signature ADS(B), for example previously downloaded from the controller C or from a server, and preferably as far as the controller B comprised the aggregated digital signature ADS(A), for example previously downloaded from the controller C or from a server. Advantageously, the sending of the digital messages M(A) and M(B) to the controller A and to the controller B can be realized through non-secured channels.

According to an embodiment, the present invention relates to the implementation of the method according to the present invention in a communication network CN comprising the previous system according to the present invention.

Nurse Interacting with a Medical Device

Figure 4:
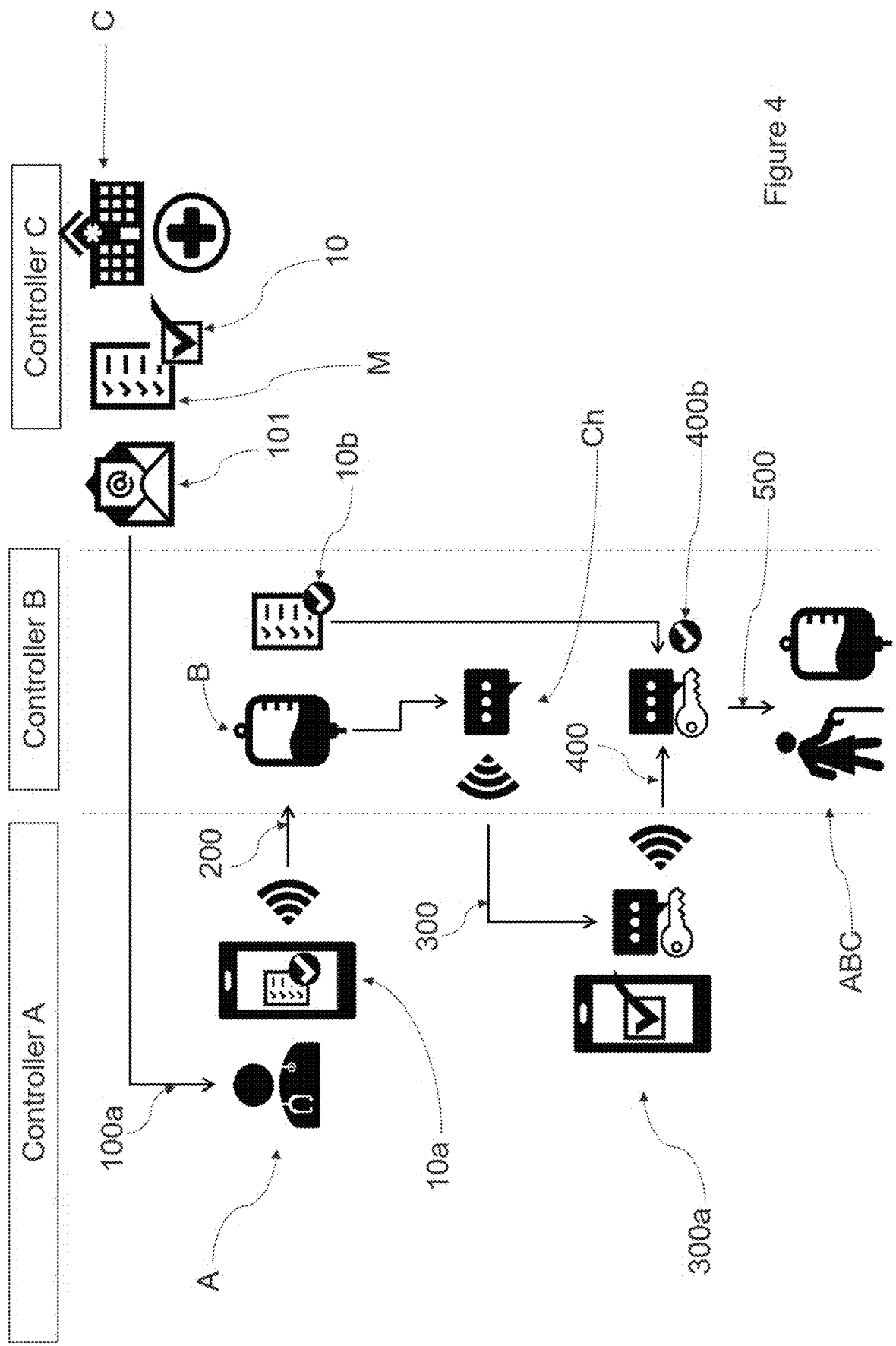
FIG. 4 is a schematic view of an embodiment of the present invention according to a third use case.

According to a third example of application of the present invention illustrated by the FIG. 4, the present invention can be implemented in order to securely allow a nurse to inject a given drug to a given patient using a medical device.

According to this example, the controller A is a nurse A. The nurse A comprises the device DA, which can be for example a smartphone. The nurse A has to take care a several patients, and therefore has to inject various drugs according to different mission order issued by at least one doctor and/or an hospital for example, being in this use case the controller C. Controller A, i.e. the nurse A, comprises a private key PrK(A), preferably issued by the controller A, and being associated with a public key PuK(A); said public key PuK(A) being accredited by the controller C, i.e. the doctor C and/or the hospital. This private key PrK(A) is stored in the memory of the processing unit CPU(A) of the device DA, i.e. the smartphone of the nurse A for example, preferably in a secured enclave of the memory.

According to this example, the controller B is a medical device B, preferably a smart medical device, i.e. a medical device comprising the device DB. Said medical device B is configured to deliver or inject a certain given quantity of a given drug if said medical device receives a proper mission order indicating that a given nurse can execute a given operation Op, such as injecting a drug to a patient; Said mission order being issued by a doctor C and/or an hospital, acting as the controller C in this example.

According to this example, the controller C is a doctor C and/or a medical institution and/or an hospital. Said doctor C issues a mission order using a digital message M sent to the nurse A, for example through a communication network CN, such as the Internet. According to an embodiment, the digital message M is also sent to the medical device B by the doctor C. For example, the digital message M can comprise a mission order in the form of a series of data indicating for example what the nurse A has to do, and when the nurse A has to do it. In this example, the mission order can comprise the following data:

The nurse A has the public key PuK(A);
A verification key VK(A);
An operation Op: the nurse A has to inject Y ml of drug X to Patient ABC;
A time slot: This has to be done from 9.30 to 9.45 on Jun. 10, 2021, for example.
A location corresponding to the patient's address.

According to an embodiment, when the nurse, i.e. controller A, receives the digital message M, she verifies, using the processing unit CPU(A), that the digital message M is certified by the doctor C, and preferably only in case of positive verification that the digital message M is certified by the doctor C, the processing unit CPU(A) of the device DA of the nurse A starts the extraction of the authorization data AD(A) contained in the digital message M. These authorization data AD(A) comprises preferably the data of the mission order of the nurse A.

Then, the processing unit CPU(A) of the device DA of the nurse A, i.e. her smartphone DA for example, extracts from the digital message M different data such as the data related to the operation Op, and for example the time slot mentioned in the mission order and/or the location mentioned in the mission order.

According to a preferred embodiment, when the medical device, i.e. controller B, receives the digital message M, it verifies, using the processing unit CPU(B), that the digital message M is certified by the doctor C, and preferably only in case of positive verification that the digital message M is certified by the doctor C, the processing unit CPU(B) of the device DB of the medical device starts the extraction of the authorization data AD(A) contained in the digital message M. These authorization data AD(A) comprises preferably the data of the mission order.

Then, the controller B, i.e. the medical device B, extracts from the digital message M different data such as the public key PuK(A) corresponding to the private key PrK(A) of the nurse A, i.e. the controller A, the verification key(A), the data related to the operation Op, and for example the time slot mentioned in the mission order and/or the location mentioned in the mission order.

According to an embodiment, for example when the nurse A arrives in front of the medical device B or when the nurse A activates the medical device B, the medical device B sends a challenge to the nurse A; preferably the communication module CM(B) of the device DB sends a challenge to the communication module CM(A) of the device DA which in this case is the smartphone of the nurse A for example.

According to an embodiment, the communication module CM(B) of the device DB controlled by the medical device B comprises a display module DD(B), and preferably an optical reader module OR(B). Said display module DD(B) is configured to display an optical readable representation of data, preferably an optical readable representation of a graphical data block GDB(B). A graphical data block GDB(B) can comprise different kind of data such as said challenge for example. Advantageously, this digital data block GDB(B) can comprise a 2D barcode, also called "QR CODE".

According to an embodiment, the communication module CM(A) of the smartphone of the nurse A comprises an optical reader module OR(A), and preferably a display module DD(A). Said optical reader module OR(A) is configured to read and decode an optical readable representation of data, preferably an optical readable representation of a graphical data block GDB. Preferably, the communication module CM(A) is able to extract data from a graphical data block GDB, such as for example said challenge.

In this example, the medical device B displays a QR code QRC(B) using its display module, said QR code QRC(B) encoding a challenge. Then, the nurse A uses her smartphone to decode said QR code QRC(B) and extract said challenge, using the optical reader module OR(A) of the smartphone.

Advantageously, this challenge can be a random number generated by a random number generator module GRNM(B) of the device DB. According to an embodiment, when the nurse A receives said challenge through her smartphone, advantageously through the communication module CM(A) of her smartphone, the smartphone signs the challenge with her private key PrK(A), more precisely, the processing unit CPU(A) of the smartphone signs the challenge using the private key PrK(A) generating said accreditation SA. Then, the smartphone sends back to the medical device B the accreditation SA, preferably the communication module CM(A) of the smartphone sends said accreditation SA to the communication module CM(B) of the device DB controlled by the medical device B.

According to an embodiment, the communication module CM(A) of the smartphone displays an optical readable representation of data, preferably an optical readable representation of a graphical data block GDB(A), using its display module DD(A); Said graphical data block GDB(A) comprises preferably an encoded version of the accreditation SA, for example in the form of a or several QR code QRC(A).

According to this embodiment, the communication module CM(B) of the device DB controlled by the medical device B reads and decode this QR code QRC(B) using its optical reader module OR(B) in order to extract said accreditation SA.

Then, the medical device B checks the validity of the accreditation SA using the public key PuK(A), which has been extracted by the processing unit CPU(B) from the digital message M, and which is preferably in the mission order, i.e. contained in the digital message M.

Then, the processing unit CPU(B) of the device DB of the medical device B calculates, via a one-way function programmed in the processing unit CPU(B), a candidate digital signature cx(A) of the authorization data AD(A), and calculates a candidate aggregated digital signature cADS from the verification key VK(A) and the calculated candidate digital signature cx(A) of the authorization data AD(A); and the processing unit CPU(B) of the device DB checks whether the candidate aggregated digital signature cADS matches with the aggregated digital signature ADS stored in its memory. According to an embodiment, said aggregated digital signature ADS has been received by the medical device B from said doctor C and/or from a server. Then said aggregated digital signature ADS have been stored in the memory of the processing unit CPU(B) of the device DB controlled by the medical device B.

According to an embodiment, the medical device B extracts other data from the digital message M, such as the time slot when the nurse A must operate, such as from 9.30 to 9.45 on Jun. 10, 2021 in this example, and/or the location of the patient.

Then, if the nurse is located to the address of the patient, if the time corresponds to the time slot contained in the mission order, for example from 9.30 to 9.45 on Jun. 10, 2021, if the verification of the accreditation SA is positive and if the candidate aggregated digital signature cADS matches with the aggregated digital signature ADS, the medical device B, receives from the processing unit CPU(B) of the device DB an indication that the nurse A is indeed authorized by the doctor C to perform the operation Op mentioned in the mission order contained in the digital message M. Therefore, the medical device B authorizes the nurse A to inject Y ml of drug X to Patient ABC, and/or the medical device B injects Y ml of drug X to Patient ABC under the survey of the nurse A, and/or the medical device B delivers Y ml of drug X to the nurse A to be injected to Patient ABC.

According to this example of use case of the present invention, the system preferably comprises:

The smartphone DA of the nurse A, said smartphone DA being configured to allow the authentication of the nurse A by the medical device B in order to the nurse A to be able to execute an operation Op, preferably said smartphone comprises a communication module CM(A) comprising a display module DD(A) configured to display an optical readable representation of data, advantageously an optical readable representation of a graphical data block GDB(A); Said graphical data block GDB(A) comprising encoded data, for example in the form of a QR code;

The medical device B comprising and controlling the device DB, said medical device B being configured to check the authorization of a given nurse to inject a given quantity of a given drug to a given patient, preferably on a given time slot, and/or to deliver a given quantity of a given drug to a given patient under the survey of a given nurse, preferably on a given time slot; the device DB comprises a communication module CM(B) comprising an optical reader module OR(B) configured to read and decode an optical readable representation of data, preferably an optical readable representation of a graphical data block GDB, and advantageously to extract data from a graphical data block GDB;

This system is configured such a way that:

the communication module CM(B) of the device DB of the medical device B is configured to receive 200 the digital message M comprising a mission order, said mission order containing a public key PuK(A) owned by the nurse A, an authorization data AD(A) indicating that the nurse A is authorized by the doctor C to perform an operation Op, a verification key VK(A), a time slot when this operation Op has to be executed, etc., Preferably, the processing unit CPU(B) of the device DB is configured to verify 10b that the digital message M is certified by the doctor C;

The processing unit CPU(B) of the device DB is configured to extract 201, 202, 204 the data contained in the digital message M, such as the public key PuK(A), the authorization data AD(A), the operation Op, the verification key VK(A), the time slot when this operation Op has to be executed, etc . . . , preferably only in case of positive verification that the digital message M is certified by the doctor C;

the communication module CM(B) of the device DB is configured to receive 400 an accreditation SA from the communication module CM(A) of the smartphone DA, preferably, the optical reader module OR(B) of the communication module CM(B) of the device DB is configured to read and decode an optical readable representation of a graphical data block GDB(A) displayed by the display module DD(A) of the smartphone DA; said graphical data block GDB(A) comprising preferably an encoded version of an accreditation SA, advantageously in the form of a 2d barcode, said optical reader module OR(B) is configured to decode said encoded version of an accreditation SA in order to extract said accreditation SA; said accreditation SA is preferably signed 300a by the processing unit CPU(A) of the device DA using its private key PrK(A), and/or comprising data, such as a secret, signed 300a by the processing unit CPU(A) of the device DA using its private key PrK(A);

the processing unit CPU(B) of the device DB is configured to verify 400b the accreditation SA, preferably using the public key PuK(A) corresponding to said private key PrK(A), advantageously after extracting 202 said public key PuK(A) from the digital message M;

the processing unit CPU(B) of the device DB is configured to:
calculate 203, via the one-way function programmed in the processing unit CPU(B), a candidate 205 digital signature cx(A) of the authorization data AD(A), and
calculate a candidate aggregated digital signature cADS from the verification key VK(A) and the calculated candidate digital signature cx(A) of the authorization data AD(A); and the processing unit CPU(B) of the device DB is configured to check 207 whether the candidate aggregated digital signature cADS matches with the aggregated digital signature ADS stored 206 in its memory, and only in case of positive verification of the accreditation SA and positive matching of the candidate aggregated digital signature cADS with the aggregated digital signature ADS, the processing unit CPU(B) of the device DB is configured to transmit 500 to the medical device B an indication that the nurse A is indeed authorized by the doctor C to perform 500a the operation Op.

This system allows the medical device B to validate the digital content of the digital message M with a higher certainty than the solutions of the prior art. Moreover, this system allows the medical device B to control the credentials, i.e. the mission order, linked to this digital content in order to check if this digital content is valid or not. This system allows the nurse A to identify herself just with the accreditation SA and her credentials that are in the digital message M and that are certified preferably by a forgery proof digital file issued by the controller C. This system allows the medical device B to have complete confidence in the validity of the mission order that is presented.

It must be noted that this system avoids the use of biometrics data of the nurse A. The mission order and the accreditation SA are enough to give a complete confidence to the medical device B. Advantageously, this system avoids any biometrics data, biometric measurement or disclosure of private information regarding the nurse A.

According to this example of use case of the present invention, the invention relates, according to an embodiment, to a method wherein:

- The smartphone DA of the nurse A is configured to allow the authentication of the nurse A by the medical device B in order to the nurse A to be able to execute an operation Op, preferably said smartphone DA comprises a communication module CM(A) comprising a display module DD(A) configured to display an optical readable representation of data, advantageously an optical readable representation of a graphical data block GDB(A); Said graphical data block GDB(B) comprising encoded data, for example in the form of a QR code;
- The medical device B comprises and controls the device DB, said medical device B is configured to check authorization of a given nurse to inject a given quantity of a given drug to a given patient, preferably on a given time slot, and/or to deliver a given quantity of a given drug to a given patient under the survey of a given nurse, preferably on a given time slot; the device DB comprises a communication module CM(B) comprising an optical reader module OR(B) configured to read and decode an optical readable representation of data, preferably an optical readable representation of a graphical data block GDB, and advantageously to extract data from a graphical data block GDB;
- This method comprises the following steps:
- the communication module CM(B) of the device DB of the medical device B receives 200 the digital message M comprising a mission order, said mission order containing a public key PuK(A) owned by the nurse A, an authorization data AD(A) indicating that the nurse A is authorized by the doctor C to perform an operation Op, a verification key VK(A), a time slot when this operation Op has to be executed, etc.,
- Preferably, the processing unit CPU(B) of the device DB verifies 10*b* that the digital message M is certified by the doctor C;
- The processing unit CPU(B) of the device DB extracts 201, 202, 204 the data contained in the digital message M, such as the public key PuK(A), the authorization data AD(A), the operation Op, the verification key VK(A), the time slot when this operation Op has to be executed, etc . . . , preferably only in case of positive verification that the digital message M is certified by the doctor C;
- the communication module CM(B) of the device DB receives 400 an accreditation SA from the communication module CM(A) of the smartphone DA, preferably, the optical reader module OR(B) of the communication module CM(B) of the device DB reads and decodes an optical readable representation of a graphical data block GDB(A) displayed by the display module DD(A) of the smartphone DA; said graphical data block GDB(A) comprising preferably an encoded version of an accreditation SA, advantageously in the form of a 2d barcode, said optical reader module OR(B) decodes said encoded version of an accreditation SA in order to extract said accreditation SA; said accreditation SA is preferably signed 300*a* by the processing unit CPU(A) of the device DA using its private key PrK(A), and/or comprising data, such as a secret, signed 300*a* by the processing unit CPU(A) of the device DA using its private key PrK(A);
- the processing unit CPU(B) of the device DB verifies 400*b* the accreditation SA, preferably using the public key PuK(A) corresponding to said private key PrK(A), advantageously after extracting 202 said public key PuK(A) from the digital message M;
- the processing unit CPU(B) of the device DB:
    - extracts 204 the verification key VK(A) contained in the digital message M,
    - calculates 203, via the one-way function programmed in the processing unit CPU(B), a candidate digital signature cx(A) of the authorization data AD(A), and
    - calculates 205 a candidate aggregated digital signature cADS from the verification key VK(A) and the calculated candidate digital signature cx(A) of the authorization data AD(A); and
- the processing unit CPU(B) of the device DB checks 207 whether the candidate aggregated digital signature cADS matches with the aggregated digital signature ADS stored in its memory, and only in case of positive verification of the accreditation SA and positive matching of the candidate aggregated digital signature cADS with the aggregated digital signature ADS, the processing unit CPU(B) of the device DB transmits 500 to the medical device B an indication that the nurse A is indeed authorized by the doctor C to perform 500*a* the operation Op.

This method allows the medical device B to validate the digital content of the digital message M with a higher certainty than the solutions of the prior art. Moreover, this method allows the medical device B to control the credentials, i.e. the mission order, linked to this digital content in order to check if this digital content is valid or not. This method allows the nurse A to identify herself just with the accreditation SA and her credentials that are in the digital message M and that are certified preferably by a forgery proof digital file issued by the controller C. This method allows the medical device B to have complete confidence in the validity of the mission order that is presented.

It must be noted that this method avoids the use of biometrics data of the nurse A. This digital message M and the accreditation SA are enough to give a complete confidence to the medical device B. Advantageously, this method avoids any biometrics data, biometric measurement or disclosure of private information of the nurse A.

According to an embodiment, the present invention allows that the operation Op be done by the nurse A and the medical device B without the need to contact a central database or server containing the mission order. Indeed, the medical device B as well as the nurse A can be in an offline environment as far as they can communicate with each other during the implementation of the method according to an embodiment of the present invention, and preferably as far as the controller B comprised the aggregated digital signature ADS, for example previously downloaded from the controller C or from a server. Advantageously, the sending of the digital message M to the nurse A and to the medical device B can be realized through non-secured channels.

According to an embodiment, the present invention relates to the implementation of the method according to the present invention in a medical environment comprising the previous system according to the present invention.

Search Warrant

Figure 5:
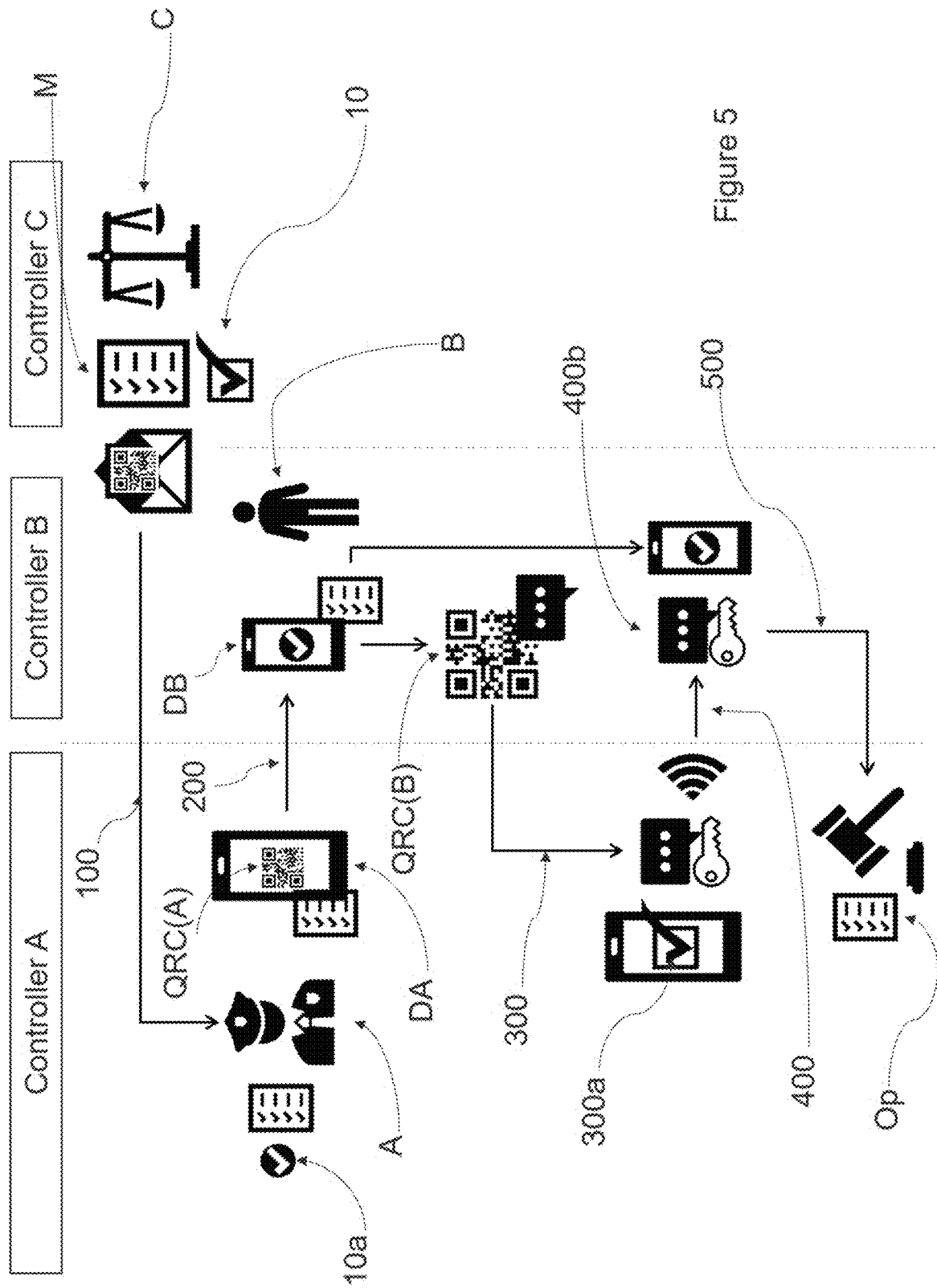
FIG. 5 is a schematic view of an embodiment of the present invention according to a fourth use case.

According to a fourth example of application of the present invention illustrated by the FIG. 5, the present invention can be implemented in order to securely allow a police officer to execute a search warrant regarding a given citizen.

According to this example, the controller A is a police officer A. The police officer A comprises the device DA, which can be for example a smartphone DA. The police officer A has to execute the mission contained in a warrant, such as for example penetrate into the house of a citizen to search for evidence of a crime; in this case the warrant is for example a search warrant. Preferably, this warrant has been issued by a judge or a judicial institution; Said judge or judicial institution plays the role of the controller C in this use case. The police officer A, i.e. controller A, comprises a private key PrK(A), preferably issued by the controller A, and being associated with a public key PuK(A); said public key PuK(A) being certified by the controller C, i.e. a judge C for example. This private key PrK(A) is stored in the memory of the processing unit CPU(A) of the device DA, i.e. the smartphone DA of the police officer A for example, preferably in a secured enclave of the memory.

According to this example, the controller B is a citizen mentioned in said warrant: in this example, the device DB can be the smartphone DB of the citizen B.

According to this example, the controller C is therefore a judge C and/or a judicial institution. Said judge C issues a warrant, i.e. a mission order, using a digital message M sent to the police officer A, for example through a communication network CN, such as the Internet. For example, this digital message M can comprise and/or be in the form of an optical readable representation of a graphical data block GDB(A); Said graphical data block GDB(A) can advantageously comprise a 2D barcode such as a, for example, a QR code QRC(A). According to an embodiment, such a graphical data block GDB(A) can also be referred as a digital mark DM(A).

According to a preferred embodiment, the digital message M containing the warrant is in a machine-readable form, such as a QR code QRC(A) for example.

For example, the digital message M can comprise a mission order in the form of a set of data indicating for example what the police officer A is allowed to do, and when the police officer A is allowed to do it. In this example, the mission order, i.e. the warrant, can comprise the following data:

The police officer A has the public key PuK(A);
A verification key VK(A);
An operation Op: the police officer A is authorized to penetrate in the house of the citizen B, at the address Y, to search for evidences;
A time slot: This has to be done between 15.00 and 18.30 PM on Jun. 11, 2021, for example.

According to a preferred embodiment, when the police officer A, i.e. controller A, receives the digital message M from the judge C, it verifies, using its processing unit CPU(A), that the digital message M is certified by the judge C, i.e. controller C.

For example, once at the door of the house of the citizen B, the police officer A shows the digital message M, i.e. said QR code QRC(A) to the citizen B. According to an embodiment, the smartphone DA, i.e. the device DA, comprises a communication module CM(A) comprising a display module DD(A), and preferably an optical reader module OR(B); said display module DD(A) is configured to display an optical readable representation of data, preferably an optical readable representation of a graphical data block GDB(A), such as the graphical data block GDB(A) that comprise an encoded version of the digital message M, i.e. of the warrant. Thus, according to an embodiment, once at the door of the house of the citizen B, the police officer A uses his smartphone DA to display a QR code QRC(A) encoding said digital message M, using said display module DD(A).

Then the citizen B uses his smartphone DB to optically read said QR code QRC(A) displayed by the display module DD(A) of the smartphone DA of the police officer A. then, the citizen B uses his smartphone DB to extract the digital message M from said QR code QRC(A). According to an embodiment, the smartphone DB of the citizen B comprises a communication module CM(B) comprising an optical reader module OR(B), and preferably a display module DD(B). Said optical reader module OR(B) is configured to read and decode an optical readable representation of data, preferably an optical readable representation of a graphical data block GDB. Preferably, the communication module CM(B) is able to extract data from a graphical data block GDB, such as for example said digital message M from said QR code QRC(A).

According to an embodiment, the smartphone DB of the citizen B can comprise a specific software configured to read, decode and extract such digital message M, preferably using its processing unit CPU(B). When the digital message is received by the communication module CM(B) of the smartphone DB of the citizen B, then the processing unit CPU(B) checks the validity of the digital message M as well as its content, i.e. the warrant in this example.

According to a preferred embodiment, when the citizen B, i.e. controller B, receives the digital message M, it verifies, using its smartphone DB, i.e. its processing unit CPU(B), that the digital message M is certified by the judge C, i.e. controller C, and only in case of positive verification that the digital message M is certified by the judge C, the processing unit CPU(B) of the smartphone DB, i.e. of the device DB, starts the extraction of the authorization data AD(A) contained in the digital message M. These authorization data AD(A) comprises preferably the data of the mission order.

According to an embodiment, after the verification that the digital message M is certified by the judge C, the processing unit CPU(B), extracts from the digital message M different data such as the public key PuK(A) corresponding to the private key PrK(A) of the police officer A, the verification key(A), the data related to the operation Op, and for example the time slot mentioned in the mission order.

The citizen B then sends a challenge to the police officer A. According to an embodiment, this challenge can be a random number, such as a random number invented on the fly by the citizen B. Preferably, the communication module CM(B) of the smartphone DB of the citizen B send a challenge to the communication module CM(A) of the smartphone DA of the police officer A.

Advantageously, this challenge can be a random number generated by a random number generator module GRNM(B) of the smartphone DB of the citizen B.

According to an embodiment, the communication module CM(B) of the smartphone DB of the citizen B send said challenge to the communication module CM(A) of the smartphone DA of the police officer A using the communication network CN, preferably using a near field communication network, such as for example a Bluetooth communication network.

According to an embodiment, the challenge is sent through electromagnetic waves from the communication module CM(B) of the smartphone DB of the citizen B to the communication module CM(A) of the smartphone DA of the police officer A.

According to an embodiment, the challenge is in a data string form.

According to an example, this challenge can be encoded in the form of an optical readable representation of a graphical data block GDB(B); Said graphical data block GDB(B) can advantageously comprise a 2D barcode such as a, for example, a QR code QRC(B). According to an embodiment, such a graphical data block GDB(B) can also be referred as a digital mark DM(B).

According to an embodiment, the challenge is in a machine-readable form, such as a QR code QRC(B) for example.

According to an embodiment, the citizen B shows said QR code QRC(B) to the police officer A.

According to an embodiment, the communication module CM(B) of the smartphone DB of the citizen B, i.e. the device DB, comprises a display module DD(B), and preferably an optical reader module OR(B); said display module DD(B) is configured to display an optical readable representation of data, preferably an optical readable representation of a graphical data block GDB(B), such as the graphical data block GDB(B) that comprises an encoded version of the challenge, i.e. of a random number for example, or more generally of a secret. Thus, according to an embodiment, the citizen B uses his smartphone to display a QR code QRC(B) encoding said challenge, using said display module DD(B).

Then the police officer A uses his smartphone DA to optically read said QR code QRC(B) displayed by the display module DD(B) of the smartphone DB of the citizen B. Then, the police officer A uses his smartphone DA to extract the challenge, i.e. the secret or for example the random number, from said QR code QRC(B). According to an embodiment, the communication module CM(A) of the smartphone DA of the police officer A comprises an optical reader module OR(A), and preferably a display module DD(A). Said optical reader module OR(A) is configured to read and decode an optical readable representation of data, preferably an optical readable representation of a graphical data block GDB. Preferably, the communication module CM(A) is able to extract data from a graphical data block GDB, such as for example said challenge from said QR code QRC(B).

According to an embodiment, the smartphone DA of the police officer A can comprise a specific software configured to read, decode, extract and preferably sign said challenge, preferably using its processing unit CPU(A). When the challenge is received by the communication module CM(A) of the smartphone DA of the police officer A, then the processing unit CPU(A) signs said challenge using the private key PrK(A) of the police officer A. Then, the communication module CM(A) of the smartphone DA of the police officer A sending the signed challenge in the form of an accreditation SA to the citizen, i.e. to the communication module CM(B) of the smartphone of the citizen B.

According to an embodiment, the communication module CM(A) of the smartphone DA of the police officer A sends said accreditation SA to the communication module CM(B) of the smartphone DB of the citizen B using the communication network CN, preferably using a near field communication network, such as for example a Bluetooth communication network.

According to an embodiment, the accreditation SA is sent through electromagnetic waves from the communication module CM(A) of the smartphone DA of the police officer A to the communication module CM(B) of the smartphone DB of the citizen B.

According to an embodiment, the accreditation SA is in a data string form.

According to an example, this accreditation SA can be encoded in the form of an optical readable representation of a graphical data block GDB(A2); Said graphical data block GDB(A2) can advantageously comprise a 2D barcode such as a, for example, a QR code QRC(A2). According to an embodiment, such a graphical data block GDB(A2) can also be referred as a digital mark DM(A2).

According to a preferred embodiment, the accreditation SA is in a machine-readable form, such as a QR code QRC(A2) for example.

According to an embodiment, the police officer A shows said QR code QRC(A2) to the citizen B. According to an embodiment, the police officer A uses his smartphone DA to display a QR code QRC(A2) encoding said accreditation SA, using said display module DD(A).

Then the citizen B uses his smartphone DB to optically read said QR code QRC(A2) displayed by the display module DD(A) of the smartphone DB of the police officer A. Then, the citizen B uses his smartphone DB to extract the accreditation SA, i.e. the signed challenge, from said QR code QRC(A2) using its optical reader module OR(B). Preferably, the communication module CM(B) is able to extract data from a graphical data block GDB, such as for example said accreditation SA from said QR code QRC (A2).

According to an embodiment, the communication module CM(B) of the smartphone DB of the citizen B reads and decode this QR code QRC(A2) using its optical reader module OR(B) in order to extract said accreditation SA.

According to an embodiment, the smartphone of the citizen B can comprise a specific software configured to read, decode and/or extract said accreditation SA, preferably using its processing unit CPU(A). When the accreditation SA is received by the communication module CM(B) of the smartphone DB of the citizen B, then the processing unit CPU(B) checks the accreditation SA, i.e. the signed challenge, and in particular that it has been signed with the private key PrK(A) corresponding to the public key PuK(A), extracted from the digital message M, i.e. which is in the warrant.

Then, the processing unit CPU(B) of smartphone DB of the citizen B calculates, via a one-way function programmed in the processing unit CPU(B), a candidate digital signature cx(A) of the authorization data AD(A), and calculates a candidate aggregated digital signature cADS from the verification key VK(A) and the calculated candidate digital signature cx(A) of the authorization data AD(A); and the processing unit CPU(B) checks whether the candidate aggregated digital signature cADS matches with the aggregated digital signature ADS stored in its memory. According to an embodiment, said aggregated digital signature ADS has been received by the citizen B from said judge C and/or from a server. According to an embodiment, when the citizen B reads said QR code QRC(A) using his smartphone DB, preferably through a dedicated application, then the smartphone DB of the citizen B contacts a server using its communication module CM(B) to download said aggregated digital signature ADS. Then said aggregated digital signature ADS have been stored in the memory of the processing unit CPU(B) of the smartphone DB of the citizen B.

According to an embodiment, the smartphone DB of the citizen B extracts other data from the digital message M, such as the time slot when the police officer A must operate, such as between 15.00 and 18.30 PM on Jun. 11, 2021 in this example.

Then, if the time is well the time mentioned in the mission order, for example between 15.00 and 18.30 PM on Jun. 11, 2021, if the verification of the accreditation SA is positive and if the candidate aggregated digital signature cADS matches with the aggregated digital signature ADS, the citizen B receives from his smartphone, preferably from the processing unit CPU(B) of his smartphone DB, an indication that the police officer A is indeed authorized by the judge C to perform the operation Op mentioned in the warrant contained in the digital message M. Therefore, the citizen B can authorize the police officer A to penetrate in his house, at the address Y, to search for evidences.

According to this example of use case of the present invention, the system preferably comprises:

- The smartphone DA of the police officer A, said smartphone DA being configured to allow the authentication of the police officer A by the citizen B in order to the police officer A to be able to execute an operation Op; said smartphone DA comprises a processing unit CPU(A) and a communication module CM(A) comprising a display module DD(A) and an optical reader module OR(A), said display module DD(A) being configured to display an optical readable representation of data, advantageously an optical readable representation of a graphical data block GDB(A); Said graphical data block GDB(A) comprising encoded data, for example in the form of a QR code; said optical reader module OR(A) being configured to read and decode an optical readable representation of data, preferably an optical readable representation of a graphical data block GDB, and advantageously to extract data from a graphical data block GDB;
- The smartphone DB of the citizen B, said smartphone being configured to check the authorization a given police officer to execute an operation Op, preferably on a given time slot; said smartphone DB comprises a processing unit CPU(B) and a communication module CM(B) comprising a display module DD(B) and an optical reader module OR(B), said display module DD(B) being configured to display an optical readable representation of data, advantageously an optical readable representation of a graphical data block GDB(B); Said graphical data block GDB(B) comprising encoded data, for example in the form of a QR code; said optical reader module OR(B) being configured to read and decode an optical readable representation of data, preferably an optical readable representation of a graphical data block GDB, and advantageously to extract data from a graphical data block GDB;

This system is configured such a way that:
- the communication module CM(B) is configured to receive 200 the digital message M comprising a mission order, said mission order containing a public key PuK(A) owned by the police officer A, an authorization data AD(A) indicating that the police officer A is authorized by the judge C to perform an operation Op, a verification key VK(A), a time slot when this operation Op has to be executed, etc.,
- Preferably, the processing unit CPU(B) is configured to verify 10*b* that the digital message M is certified by the judge C;
- The processing unit CPU(B) is configured to extract 201, 202, 204 the data contained in the digital message M, such as the public key PuK(A), the authorization data AD(A), the operation Op, the verification key VK(A), the time slot when this operation Op has to be executed, etc . . . , preferably only in case of positive verification that the digital message M is certified by the judge C;
- the communication module CM(B) is configured to receive 400 an accreditation SA from the communication module CM(A), preferably the optical reader module OR(B) of the communication module CM(B) is configured to read and decode an optical readable representation of a graphical data block GDB(A) displayed by the display module DD(A); said graphical data block GDB(A) comprising preferably an encoded version of an accreditation SA, advantageously in the form of a 2d barcode, said optical reader module OR(B) is configured to decode said encoded version of an accreditation SA in order to extract said accreditation SA; said accreditation SA is preferably signed 300*a* by the processing unit CPU(A) using its private key PrK(A), and/or comprising data, such as a secret, signed 300*a* by the processing unit CPU(A) using its private key PrK(A);
- the processing unit CPU(B) is configured to verify 400*b* the accreditation SA, preferably using the public key PuK(A) corresponding to said private key PrK(A), advantageously after extracting 202 said public key PuK(A) from the digital message M;
- the processing unit CPU(B) is configured to:
  - calculate 203, via the one-way function programmed in the processing unit CPU(B), a candidate digital signature cx(A) of the authorization data AD(A), and
  - calculate 205 a candidate aggregated digital signature cADS from the verification key VK(A) and the calculated candidate digital signature cx(A) of the authorization data AD(A); and
- the processing unit CPU(B) is configured to check 207 whether the candidate aggregated digital signature cADS matches with the aggregated digital signature ADS stored 206 in its memory, and only in case of positive verification of the accreditation SA and positive matching of the candidate aggregated digital signature cADS with the aggregated digital signature ADS, the processing unit CPU(B) is configured to transmit 500 to the citizen B an indication that the police officer A is indeed authorized by the judge C to perform 500*a* the operation Op.

This system allows the citizen B to validate the digital content of the digital message M with a higher certainty than the solutions of the prior art. Moreover, this system allows the citizen B to control the credentials, i.e. the mission order, linked to this digital content in order to check if this digital content is valid or not. This system allows the police officer A to identify himself just with the accreditation SA and his credentials that are in the digital message M and that are certified preferably by a forgery proof digital file issued by the controller C. This system allows the citizen B to have complete confidence in the validity of the mission order that is presented.

It must be noted that this system avoids the use of biometrics data of the police officer A. The mission order and the accreditation SA are enough to give a complete confidence to the citizen B. Advantageously, this system avoids any biometrics data, biometric measurement or disclosure of private information regarding the police officer A.

According to this example of use case of the present invention, the invention relates, according to an embodiment, to a method wherein:

The smartphone DA of the police officer A is configured to allow the authentication of the police officer A by the citizen B in order to the police officer A to be able to execute an operation Op, preferably said smartphone DA comprises a processing unit CPU(A) and a communication module CM(A) comprising a display module DD(A) and preferably an optical reader module OR(A); said display module DD(A) being configured to display an optical readable representation of data, advantageously an optical readable representation of a graphical data block GDB(A); Said graphical data block GDB(A) comprising encoded data, for example in the form of a QR code; said optical reader module OR(B) being configured to read and decode an optical readable representation of data, preferably an optical readable representation of a graphical data block GDB, and advantageously to extract data from a graphical data block GDB;

The smartphone DB of the citizen B, said smartphone is configured to check the authorization of a given police officer to execute an operation Op, preferably on a given time slot; the smartphone DB of the citizen B comprises a processing unit CPU(B) and a communication module CM(B) comprising an optical reader module OR(B) and preferably a display module DD(B); said optical reader module OR(B) being configured to read and decode an optical readable representation of data, preferably an optical readable representation of a graphical data block GDB, and advantageously to extract data from a graphical data block GDB; said display module DD(B) being configured to display an optical readable representation of data, advantageously an optical readable representation of a graphical data block GDB(B); Said graphical data block GDB(B) comprising encoded data, for example in the form of a QR code This method comprises the following steps:
the communication module CM(B) receives 200 the digital message M comprising a mission order, said mission order containing a public key PuK(A) owned by the police officer A, an authorization data AD(A) indicating that the police officer A is authorized by the judge C to perform an operation Op, a verification key VK(A), a time slot when this operation Op has to be executed, etc., Preferably, the processing unit CPU(B) verifies 10*b* that the digital message M is certified by the judge C;

The processing unit CPU(B) of the device DB extracts 201, 202, 204 the data contained in the digital message M, such as the public key PuK(A), the authorization data AD(A), the operation Op, the verification key VK(A), the time slot when this operation Op has to be executed, etc . . . , preferably only in case of positive verification that the digital message M is certified by the judge C;

the communication module CM(B) receives 400 an accreditation SA from the communication module CM(A), preferably, the optical reader module OR(B) of the communication module CM(B) of the device DB reads and decodes an optical readable representation of a graphical data block GDB(A) displayed by the display module DD(A); said graphical data block GDB(A) comprising preferably an encoded version of an accreditation SA, advantageously in the form of a 2d barcode, said optical reader module OR(B) decodes said encoded version of an accreditation SA in order to extract said accreditation SA; said accreditation SA is preferably signed 300*a* by the processing unit CPU(A) of the device DA using its private key PrK(A), and/or comprising data, such as a secret, signed 300*a* by the processing unit CPU(A) of the device DA using its private key PrK(A);

the processing unit CPU(B) verifies 400*b* the accreditation SA, preferably using the public key PuK(A) corresponding to said private key PrK(A), advantageously after extracting 202 said public key PuK(A) from the digital message M;

the processing unit CPU(B):
extracts 204 the verification key VK(A) contained in the digital message M,
calculates 203, via the one-way function programmed in the processing unit CPU(B), a candidate digital signature cx(A) of the authorization data AD(A), and
calculates 205 a candidate aggregated digital signature cADS from the verification key VK(A) and the calculated candidate digital signature cx(A) of the authorization data AD(A); and the processing unit CPU(B) checks 207 whether the candidate aggregated digital signature cADS matches with the aggregated digital signature ADS stored 206 in its memory, and only in case of positive verification of the accreditation SA and positive matching of the candidate aggregated digital signature cADS with the aggregated digital signature ADS, the processing unit CPU(B) transmits 500 to the smartphone DB of the citizen B an indication that the police officer A is indeed authorized by the judge C to perform 500*a* the operation Op.

This method allows the citizen B to validate the digital content of the digital message M with a higher certainty than the solutions of the prior art. Moreover, this method allows the citizen B to control the credentials, i.e. the mission order, linked to this digital content in order to check if this digital content is valid or not. This method allows the police officer A to identify himself just with the accreditation SA and his credentials that are in the digital message M and that are certified preferably by a forgery proof digital file issued by the controller C. This method allows the citizen B to have complete confidence in the validity of the mission order that is presented.

It must be noted that this method avoids the use of biometrics data of the police officer A. This digital message M and the accreditation SA are enough to give a complete confidence to the citizen B. Advantageously, this method avoids any biometrics data, biometric measurement or disclosure of private information of the police officer A.

According to an embodiment, the present invention allows that the operation Op be done by the police officer A and the citizen B without the need to contact a central database or server containing the mission order. Indeed, the citizen B as well as the police officer A can be in an offline environment as far as they can communicate with each other during the implementation of the method according to an embodiment of the present invention, and preferably as far as the controller B comprised the aggregated digital signature ADS, for example previously downloaded from the controller C or from a server. Advantageously, the sending of the digital message M to the police officer A and to the citizen B can be realized through non-secured channels.

According to an embodiment, the present invention relates to the implementation of the method according to the present invention in a judicial environment comprising the previous system according to the present invention.

Emission of an Official Digital Document by a Civil Servant

Figure 6:
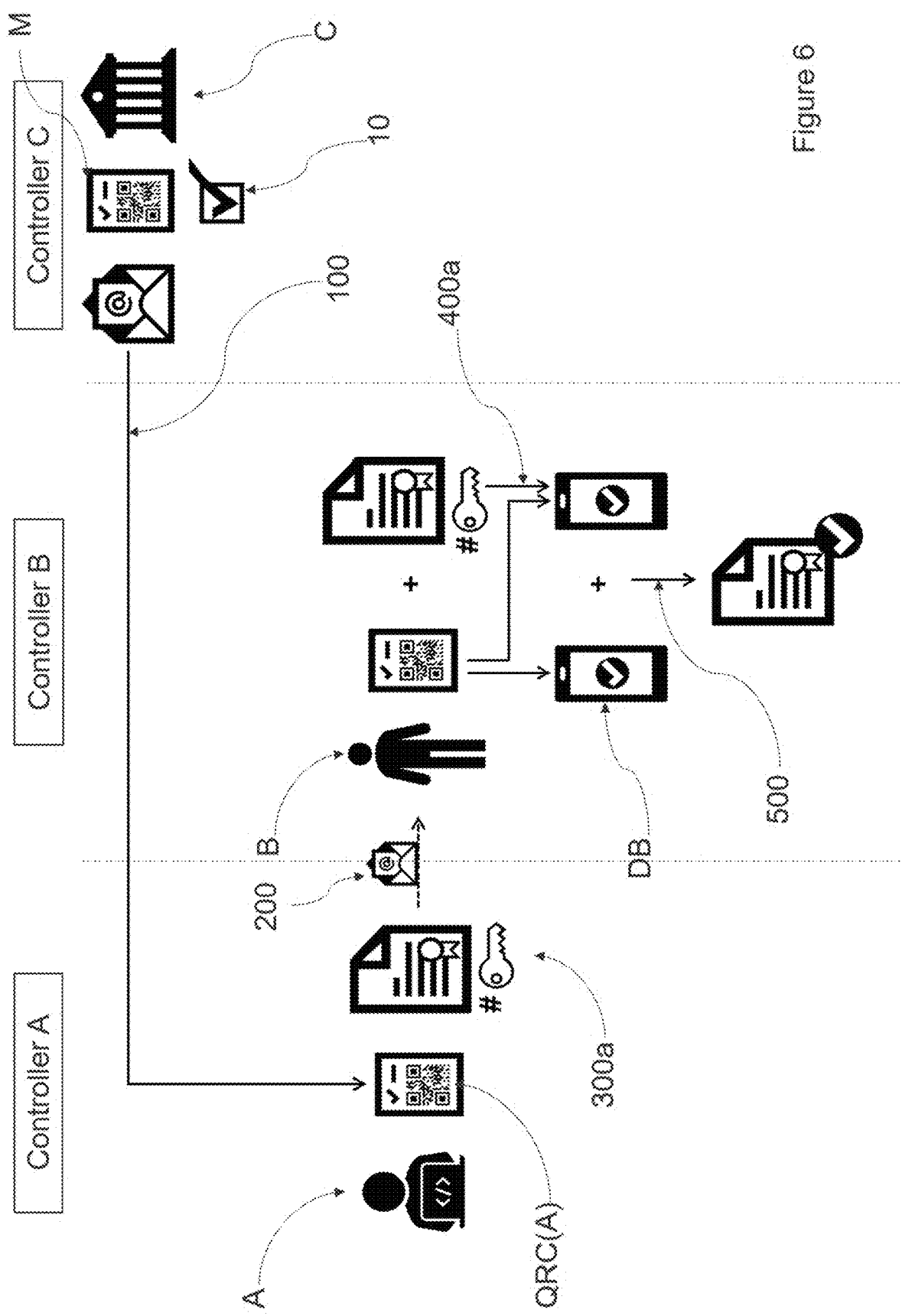
FIG. 6 is a schematic view of an embodiment of the present invention according to a fifth use case.

According to a fifth example of application of the present invention illustrated by the FIG. 6, the present invention can be implemented in order to securely authorize a civil servant to issue an official document, preferably an official digital document, such as for example a digital birth certificate. This invention allows a person, such as the recipient of this official document, to verify, preferably in an undisputable way, that this official document has been signed by an authorized civil servant, under an official mandate from an authority.

According to this example, the controller A is a civil servant A. The civil servant A controls and comprises the device DA, which can be for example a computer DA. The civil servant A has to issue an official digital document, such as a diploma or a birth certificate for example. This official document is preferably in a digital form, such as a PDF document for example. This official digital document can comprise various information such as names, dates, locations, signatures, etc . . . .

Preferably, this official digital document is signed by the civil servant A under an official mandate from an authority, for example the Population Registry office of a city. Said authority plays the role of the controller C in this use case. The civil servant A, i.e. controller A, comprises a private key PrK(A), preferably issued by the controller A, and associated with a public key PuK(A); said public key PuK(A) being certified by the controller C, i.e. an authority for example. This private key PrK(A) is stored in the memory of the processing unit CPU(A) of the device DA, i.e. the computer DA of the civil servant A for example, preferably in a secured enclave of the memory.

According to this example, the controller B is a citizen B and/or another authority and/or another civil servant that wants to check the validity of this official digital document, i.e. that wants to verify that this official digital document has been issued by an authorized civil servant. In this example, the device DB can be a smartphone of a citizen B.

According to this example, the controller C is an authority C. Said authority C delegates the right to sign an official digital document to a given civil servant. The authority C issues a mission order, using a digital message M sent to the civil servant A, for example through a communication network CN, such as the Internet. For example, this digital message M can comprise and/or be in the form of an optical readable representation of a graphical data block GDB(A); Said graphical data block GDB(A) can advantageously comprise a 2D barcode such as a, for example, a QR code. According to an embodiment, such a graphical data block GDB(A) can also be referred as a digital mark DM(A).

According to a preferred embodiment, the digital message M containing the mission order is in a machine-readable form, such as a QR code for example.

For example, the digital message M can comprise a mission order in the form of a set of data indicating for example what the civil servant A is allowed to do, and when the civil servant A is allowed to do it. In this example, the mission order can comprise the following data:

The civil servant A has the public key PuK(A);
A verification key VK(A);
An operation Op: This civil servant A is authorized to issue and sign official digital documents, such as a digital birth certificates for example, under an official mandate from the Authority C, for example on behalf of the Population Registry office of the city of Utopia;
A time slot: This can be done from Date 1 to Date 2, within business hours, for example.

According to an embodiment, when the civil servant A, i.e. the controller A, receives the digital message M from the authority C, it verifies, using its computer DA, i.e. the processing unit CPU(A) of his computer DA, that the digital message M is certified by the authority C, i.e. the controller C.

For example, when the civil servant A issues an official digital document, such as a birth certificate, for example in the form of a PDF document, the civil servant A attaches the digital message M with the official digital document, preferably in the form of a QR code QRC(A).

For example, a digital birth certificate is issued by the civil servant A including a QR code QRC(A), said QR code QRC(A) encoding said digital message M.

Preferably, the civil servant A signs the official digital document using his private key PrK(A). This digital signature is also attached to the official digital document, and preferably served as an accreditation SA. According to an embodiment, the civil servant A signs a hash of the official digital document using his private key PrK(A), said hash of the official digital document being calculated via a one-way function programmed in the processing unit CPU(A) and applied to at least a part of the content of said official digital document.

When a recipient of said official digital document, let's name it the citizen B, wants to check the validity of said official digital document, the citizen B uses his smartphone DB for example which acts as the device DB in this example.

According to an embodiment, the citizen B uses his smartphone DB to read and/or decode said digital message M attached and/or joined to said official digital document.

According to an embodiment, the citizen B uses his smartphone DB to read the QR code QRC(A) attached and/or joined to said official digital document. According to an embodiment, the citizen B uses his smartphone DB to optically read said QR code QRC(A) displayed by a display module for example.

Preferably, the citizen B uses his smartphone DB to extract the digital message M, for example from said QR code QRC(A). According to an embodiment, the smartphone of the citizen B comprises a communication module CM(B) designed to receive, read and/or decode said digital message M.

According to an embodiment, the smartphone of the citizen B comprises a communication module CM(B) comprising an optical reader module OR(B), and preferably a display module DD(B). Said optical reader module OR(B) is configured to read and decode an optical readable representation of data, preferably an optical readable representation of a graphical data block GDB. Preferably, the communication module CM(B) is able to extract data from a graphical data block GDB, such as for example said digital message M from said QR code QRC(A).

According to an embodiment, the civil servant A sends the official digital document to the citizen B. Said official digital document is preferably sent with the digital message M and/or can comprise said digital message M. According to another embodiment, the official digital document and the digital message M are sent separately by the civil servant A to the citizen B.

According to an embodiment, the computer DA, i.e. the device DA, comprises a communication module CM(A) configured to send said official digital document and said digital message M.

According to an embodiment, the smartphone DB of the citizen B can comprise a specific software configured to read, decode and extract such digital message M, preferably using its processing unit CPU(B), for example from the QR code QRC(A). When the digital message M is received and/or decoded by the communication module CM(B) of the smartphone DB of the citizen B, then the processing unit CPU(B) checks the validity of the digital message M as well as its content, i.e. the mission order in this example.

According to a preferred embodiment, when the citizen B, i.e. controller B, receives the official digital document comprising the digital message M, the citizen B verifies, using his smartphone DB, i.e. the processing unit CPU(B) of his smartphone DB, that the digital message M is certified by the authority C, i.e. controller C, and preferably only in case of positive verification that the digital message M is certified by the authority C, the processing unit CPU(B) of the smartphone DB, i.e. of the device DB, starts the extraction of the authorization data AD(A) contained in the digital message M. These authorization data AD(A) comprises preferably the data of the mission order.

According to an embodiment, after the verification that the digital message M is certified by the authority C, the processing unit CPU(B), extracts from the digital message M different data such as the public key PuK(A) corresponding to the private key PrK(A) of the civil servant A, the verification key(A), the data related to the operation Op, and for example the time slot mentioned in the mission order.

According to an embodiment, when the citizen B receives the official digital document comprising the digital message M, he receives also an accreditation SA. This accreditation SA can be included or not in the official digital document. This accreditation SA comprises the signature of the official document by the civil servant A using his private key PrK(A). According to a preferred embodiment; the accreditation SA comprises a signature of an encoded version of at least a part of the content of the official digital document. Preferably, said encoded version of at least a part of the content of the official digital document comprises a hash of the official digital document being calculated via a one-way function programmed in the processing unit CPU(A) and applied to said at least a part of the content of said official digital document.

According to an embodiment, after the verification that the digital message M is certified by the authority C, the citizen B uses his smartphone DB to verify, using the processing unit CPU(B), the accreditation SA, preferably to check if the accreditation SA, i.e. the hash of at least a part of the content of the official digital document, has been signed with the private key PrK(A) corresponding to the public key PuK(A), extracted from the digital message M, and preferably that said hash corresponds to the hash of the official digital document, or at least a part of the official digital document, calculated by the same one-way function, said one-way function being programmed in the processing unit CPU(B).

According to an embodiment, the smartphone DB checks the accreditation SA using its processing unit CPU(B) by checking that the hash of the official digital document has been signed with the private key PrK(A) corresponding to the public key PuK(A), extracted from the digital message M and by checking that said hash corresponds to the hash of the official digital document calculated by a one-way function, said one-way function being programmed in the processing unit CPU(B) and being identical to the one-way function programmed in the processing unit CPU(A).

According to an embodiment, said one-way function has been sent to the device DA and to the device DB by the controller C.

According to an embodiment, the communication module CM(A) sends said accreditation SA to the communication module CM(B) using the communication network CN, preferably using an Internet communication network.

According to an embodiment, the accreditation SA is sent through the Internet from the communication module CM(A) to the communication module CM(B).

According to an embodiment, the accreditation SA is in a data string form.

According to an example, this accreditation SA can be encoded in the form of an optical readable representation of a graphical data block GDB(A2); Said graphical data block GDB(A2) can advantageously comprise a 2D barcode such as a, for example, a QR code QRC(A2). According to an embodiment, such a graphical data block GDB(A2) can also be referred as a digital mark DM(A2).

According to a preferred embodiment, the accreditation SA is in a machine-readable form, such as a QR code for example.

According to an embodiment, the citizen B can use its smartphone DB to optically read said QR code QRC(A2) associated to the official digital document. Then, the citizen B uses its smartphone DB to extract the accreditation SA from said QR code QRC(A2) using its optical reader module OR(B). Preferably, the communication module CM(B) is able to extract data from a graphical data block GDB, such as for example said accreditation SA from said QR code QRC(A2).

According to an embodiment, the communication module CM(B) of the smartphone DB of the citizen B reads and decode this QR code QRC(A2) using its optical reader module OR(B) in order to extract said accreditation SA.

According to an embodiment, the smartphone DB of the citizen B can comprise a specific software configured to read, decode and extract such accreditation SA, preferably using its processing unit CPU(A). When the accreditation SA is received by the communication module CM(B) of the smartphone DB of the citizen B, then the processing unit CPU(B) checks the accreditation SA, and in particular that it has been signed with the private key PrK(A) corresponding to the public key PuK(A), extracted from the digital message M, and that the signed hash comprised by the accreditation SA corresponds to the hash of the official digital document calculated by a one-way function.

Then, the processing unit CPU(B) of smartphone DB of the citizen B calculates, via a one-way function programmed in the processing unit CPU(B), a candidate digital signature cx(A) of the authorization data AD(A), and calculates a candidate aggregated digital signature cADS from the verification key VK(A) and the calculated candidate digital signature cx(A) of the authorization data AD(A); and the processing unit CPU(B) checks whether the candidate aggregated digital signature cADS matches with the aggregated digital signature ADS stored in its memory. According to an embodiment, said aggregated digital signature ADS has been received by the citizen B from said authority C and/or from a server.

According to an embodiment, when the citizen B receives said digital message M, then the smartphone DB of the citizen B contacts a server using its communication module CM(B) to download said aggregated digital signature ADS.

According to an embodiment, when the citizen B reads said QR code QRC(A) using his smartphone DB, preferably through a dedicated application, then the smartphone DB of the citizen B contacts a server using its communication module CM(B) to download said aggregated digital signature ADS.

Preferably, said aggregated digital signature ADS is stored in the memory of the processing unit CPU(B) of the smartphone of the citizen B.

According to an embodiment, the smartphone DB of the citizen B extracts other data from the digital message M, such as the time slot when the civil servant A has the right to operate, such as from Date 1 to Date 2, within business hours, in this example.

Then, if the time corresponds to the time slot mentioned in the mission order, for example it is well from Date 1 to Date 2, within business hours, if the verification of the accreditation SA is positive and if the candidate aggregated digital signature cADS matches with the aggregated digital signature ADS, the citizen B receives from his smartphone, preferably from the processing unit CPU(B) of his smartphone, an indication that the civil servant A is indeed authorized by the authority C to perform the operation Op mentioned in the mission order contained in the digital message M. Therefore, it means that the official document has been well issued by a civil servant having the mandate to do so, delivered by the Authority C.

According to this example of use case of the present invention, the system preferably comprises:

- The computer DA of the civil servant A, said computer DA being configured to issue an official digital document, such as a birth certificate, for example in the form of a PDF document, and to attach the digital message M with the official digital document, optionally in the form of a QR code QRC(A), and to generate accreditation SA by signing the official digital document using the private key PrK(A) of the civil servant A, and preferably by signing using the private key PrK(A) the fingerprint/the hash of the official digital document calculated by a dedicated one-way function programmed in the processing unit CPU(A); said computer DA comprises a communication module CM(A);
- The smartphone DB of the citizen B, said smartphone being configured to verify that a given official digital document has been well issued by a civil servant having the mandate to do so, delivered by the Authority C, preferably on a given time slot; said smartphone DB comprises a processing unit CPU(B) and a communication module CM(B), preferably said communication module CM(B) can comprise an optical reader module OR(B), and preferably a display module DD(B); said optical reader module OR(B) being configured to read and decode an optical readable representation of data, preferably an optical readable representation of a graphical data block GDB, and advantageously to extract data from a graphical data block GDB;

This system is configured such a way that:
- The smartphone DB of the citizen B is configured to receives the official digital document comprising the digital message M, said digital message M comprising a mission order, said mission order containing a public key PuK(A) owned by the civil servant A, an authorization data AD(A) indicating that the civil servant A is authorized by the authority C to perform an operation Op, a verification key VK(A), a time slot when this operation Op can be executed, etc . . . ;
- Preferably, the processing unit CPU(B) is configured to verify 10b that the digital message M is certified by the authority C;
- The processing unit CPU(B) is configured to extract 201, 202, 204 the data contained in the digital message M, such as the public key PuK(A), the authorization data AD(A), the operation Op, the verification key VK(A), the time slot when this operation Op can be executed, etc . . . , preferably only in case of positive verification that the digital message M is certified by the authority C;
- the communication module CM(B) is configured to receive an accreditation SA from the civil servant A, preferably attached to the official digital document, said accreditation SA corresponding to the signature 300a of the official digital document, preferably to the signature of a hash of at least a part of the content of the official digital document calculated using a one-way function programmed in the processing unit CPU(A), by the processing unit CPU(A) using its private key PrK(A);
- the processing unit CPU(B) is configured to verify 400a the accreditation SA, preferably using the public key PuK(A) corresponding to said private key PrK(A), advantageously after extracting 202 said public key PuK(A) from the digital message M, and preferably using said one-way function programmed in the processing unit CPU(B) to verify said hash;
- the processing unit CPU(B) is configured to:
  calculate 203, via a one-way function programmed in the processing unit CPU(B), a candidate digital signature cx(A) of the authorization data AD(A), and
  calculate 205 a candidate aggregated digital signature cADS from the verification key VK(A) and the calculated candidate digital signature cx(A) of the authorization data AD(A); and
- the processing unit CPU(B) is configured to check 207 whether the candidate aggregated digital signature cADS matches with the aggregated digital signature ADS stored 206 in its memory, and only in case of positive verification of the accreditation SA and positive matching of the candidate aggregated digital signature cADS with the aggregated digital signature ADS, the processing unit CPU(B) is configured to transmit 500 to the citizen B an indication that the civil servant A was indeed authorized by the authority C to perform 500a the operation Op.

This system allows the citizen B to validate the digital content of the digital message M with a higher certainty than the solutions of the prior art. Moreover, this system allows the citizen B to control the credentials, i.e. the mission order, linked to this digital content in order to check if this digital content is valid or not, even if the civil servant A is far from the citizen B. This system allows the civil servant A to identify himself just with the accreditation SA and his credentials that are in the digital message M and that are certified preferably by a forgery proof digital file issued by the controller C. This system allows the citizen B to have complete confidence in the validity of the official document that has been issued.

According to this example of use case of the present invention, the invention relates, according to an embodiment, to a method wherein:
- The computer DA of the civil servant A, said computer DA being configured to issue an official digital document, such as a birth certificate, for example in the form of a PDF document, and to attach the digital message M with the official digital document, optionally in the form of a QR code QRC(A), and to generate accreditation SA by signing the official digital document using the private key PrK(A) of the civil servant A, and preferably by signing using the private key PrK(A) the fingerprint/the hash of the official digital document calculated by a dedicated one-way function programmed in the processing unit CPU(A); said computer DA comprises a communication module CM(A);

The smartphone DB of the citizen B, said smartphone being configured to verify that a given official digital document has been well issued by a civil servant having the mandate to do so, delivered by the Authority C, preferably on a given time slot; said smartphone DB comprises a processing unit CPU(B) and a communication module CM(B), preferably said communication module CM(B) can comprise an optical reader module OR(B), and preferably a display module DD(B); said optical reader module OR(B) being configured to read and decode an optical readable representation of data, preferably an optical readable representation of a graphical data block GDB, and advantageously to extract data from a graphical data block GDB;

This method comprises the following steps:

The smartphone DB of the citizen B receives 200 the official digital document comprising the digital message M, said digital message M comprising a mission order, said mission order containing a public key PuK(A) owned by the civil servant A, an authorization data AD(A) indicating that the civil servant A is authorized by the authority C to perform an operation Op, a verification key VK(A), a time slot when this operation Op can be executed, etc . . . ;

Preferably, the processing unit CPU(B) verifies 10b that the digital message M is certified by the authority C;

The processing unit CPU(B) extracts 201, 202, 204 the data contained in the digital message M, such as the public key PuK(A), the authorization data AD(A), the operation Op, the verification key VK(A), the time slot when this operation Op can be executed, etc . . . , preferably only in case of positive verification that the digital message M is certified by the authority C;

the communication module CM(B) receives an accreditation SA from the civil servant A, preferably attached to the official digital document, said accreditation SA corresponding to the signature 300a of the official digital document, preferably to the signature of a hash of at least a part of the content of the official digital document calculated using a one-way function programmed in the processing unit CPU(A), by the processing unit CPU(A) using its private key PrK(A);

the processing unit CPU(B) verifies 400a the accreditation SA, preferably using the public key PuK(A) corresponding to said private key PrK(A), advantageously after extracting 202 said public key PuK(A) from the digital message M, and preferably using said one-way function programmed in the processing unit CPU(B) to verify said hash;

the processing unit CPU(B):

extracts 204 the verification key VK(A) contained in the digital message M, calculates 203, via a one-way function programmed in the processing unit CPU(B), a candidate digital signature cx(A) of the authorization data AD(A), and calculates 205 a candidate aggregated digital signature cADS from the verification key VK(A) and the calculated candidate digital signature cx(A) of the authorization data AD(A); and the processing unit CPU(B) checks 207 whether the candidate aggregated digital signature cADS matches with the aggregated digital signature ADS stored 206 in its memory, and only in case of positive verification of the accreditation SA and positive matching of the candidate aggregated digital signature cADS with the aggregated digital signature ADS, the processing unit CPU(B) transmits 500 to the citizen B an indication that the civil servant A was indeed authorized by the authority C to perform 500a the operation Op.

This method allows the citizen B to validate the digital content of the digital message M with a higher certainty than the solutions of the prior art. Moreover, this method allows the citizen B to control the credentials, i.e. the mission order, linked to this digital content in order to check if this digital content is valid or not, even if the civil servant A is far from the citizen B. This method allows the civil servant A to identify himself just with the accreditation SA and his credentials that are in the digital message M and that are certified preferably by a forgery proof digital file issued by the controller C. This method allows the citizen B to have complete confidence in the validity of the official document that has been issued.

According to an embodiment, the present invention allows that the operation Op be done by the civil servant A and the citizen B without the need to contact a central database or server containing the mission order. Indeed, the citizen B as well as the civil servant A can be in an offline environment as far as they can communicate with each other during the implementation of the method according to an embodiment of the present invention, and preferably as far as the controller B comprised the aggregated digital signature ADS, for example previously downloaded from the controller C or from a server. Advantageously, the sending of the digital message M to the civil servant A and the sending of the official document to the citizen B can be realized through non-secured channels.

According to an embodiment, the present invention relates to the implementation of the method according to the present invention in an administrative environment comprising the previous system according to the present invention.

Forgery Proof Digital File

As previously described, according to a preferred embodiment, the controller C can issue the digital message M in the form of a forgery proof digital file, allowing the controller B to have complete confidence in the validity of the digital message M that is presented.

Several ways can be used to generate said digital message M in the form of a forgery proof digital file.

According to a preferred embodiment, the present invention uses a method of securing several elements and their respective associated digital data using a tree of element digital signatures. These elements can be of several kinds such as authorization data AD, i.e. mission orders for example. Their respective associated digital data can comprise several kinds of data, such as for example the details of a mission order, identifier of controllers, public key PuK, Operation details, etc . . . . Preferably, at least one of the elements is a mission order.

Figure 7:
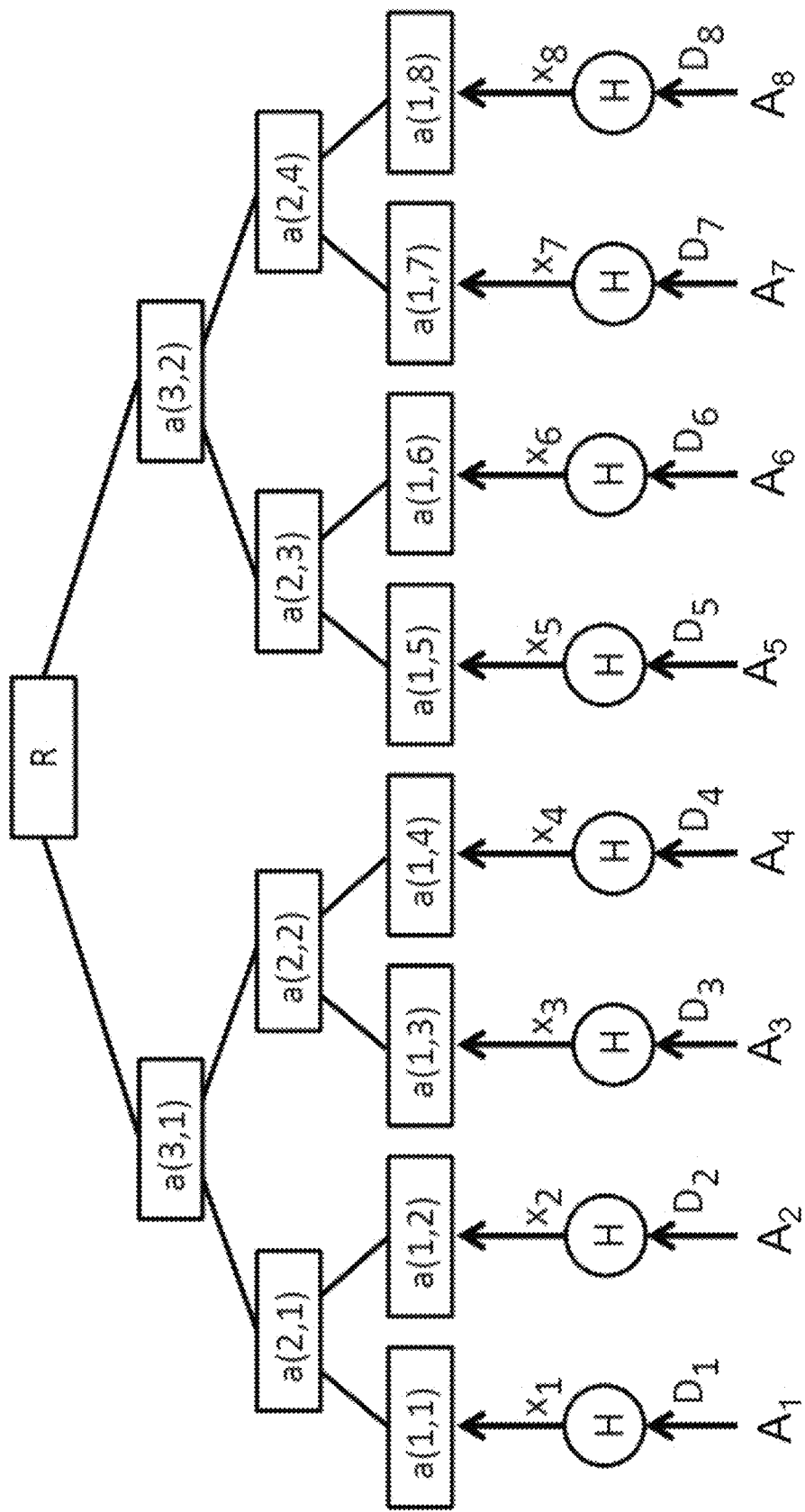
FIG. 7 is a schematic view of a method for securing the content of a digital message according to an embodiment of the present invention.

FIG. 7 shows a batch of eight elements $A_1, \ldots, A_8$ and illustrates said method of generating a digital message M in the form of a forgery proof digital file by securing the elements $A_1, \ldots, A_8$ and their respective associated digital data $D_1, \ldots D_8$ by means of a tree of element digital signatures. A secured element can constitute the digital message M. These elements can comprise for example one or several authorization data AD, i.e. mission orders. According to an embodiment, one of these elements can comprise a mission order, said element when it has been secured can form at least a part of said digital message M.

Trees associated with digital signatures are well known (binary hash trees, n-ary hash trees, or Merkle trees), they generally have base nodes, or leaf nodes, which are used to build next (intermediate) level nodes by digitally signing a concatenation of the digital signatures associated with the leaf nodes according to a certain grouping of the leaf nodes. In case of a binary tree, the digital signatures associated with the first intermediate level nodes are respectively calculated by digitally signing (e.g. with a one-way hash function H, or a one-way elliptic curve function . . . ) a concatenation of the digital signatures associated with two consecutive leaf nodes. In case of a n-ary tree, the values of the first intermediate level nodes are obtained by concatenation of the values of n consecutive leaf nodes. A tree may as well have a more complex structure (mixed-trees) as the concatenation of the leaf nodes may be performed by pairs of consecutive nodes for certain leaf nodes, by triplet of nodes for other consecutive leaf nodes etc.

For reasons of simplicity, a mere binary tree with eight leaf nodes is shown on FIG. 7: the respective values of the eight leaf nodes $a(1,1), \ldots, a(1,8)$ of the tree, respectively corresponds to the element digital signatures $x_1=H(D_1), \ldots, x_8=H(D_8)$. The value of the first index, i.e. "1", for all the leaf nodes indicates the first level (or base level) of the tree, and the second index running from 1 to eight indicates the (leaf) nodes ordering of the tree. The values of the next level (non-leaf) nodes, i.e. the four nodes of level two $a(2,1), a(2,2), a(2,3)$ and $a(2,4)$, are obtained by digitally signing a concatenation (symbolically represented by an operator "+"), here by means of a hash function, of the values of pairs of leaf nodes, i.e. pairs of their child nodes in the tree. This grouping of child nodes for obtaining the values of the nodes of the next level defines the tree concatenation ordering. For simplifying the notations, we use the node symbol $a(i,j)$ to also represent its associated value (i.e. its associated digital signature). Here, the tree has only two intermediate levels above the leaf nodes level, and the root node on top level. The root node level is in fact the last non-leaf node level of the tree. Thus, the values of the four non-leaf nodes of the next intermediate level are:

$a(2,1)=H(a(1,1)+a(1,2))$, i.e. $a(2,1)=H(H(D_1)+H(H(D_2))$, (as $a(1,1)$ and $a(1,2)$ are the child nodes of node $a(2,1)$)

$a(2,2)=H(a(1,3)+a(1,4))$ $a(2,3)=H(a(1,5)+a(1,6))$ $a(2,4)=H(a(1,7)+a(1,8))$ and, for the next, penultimate, node level (here, level three) there are two node values:

$a(3,1)=H(a(2,1)+a(2,2))$ $a(3,2)=H(a(2,3)+a(2,4))$.

We remark that it is possible to choose a different tree concatenation ordering for each non-leaf node: for example, instead of having $a(2,4)=H(a(1,7)+a(1,8))$ we could define $a(2,4)=H(a(1,8)+a(1,7))$, which gives a different node value.

Finally, the value of the root node R of the tree, or reference root digital signature or also called the aggregated digital signature ADS previously discussed, is obtained as: $R=H(a(3,1)+a(3,2))$.

Due to the cascade of concatenations involved in a tree, it is practically impossible to retrieve a root value if any bit of digital data is changed in a node (particularly, in a leaf node). Moreover, if some specific elements are included in the batch (of which digital data are only known to the system having produced the digital signatures of the leaf nodes of the tree, i.e. are only known to the controller C), a counterfeiter will not be capable to retrieve the root digital signature even if knowing the digital data of all the elements of the batch.

According to the invention, the reference root digital signature R, i.e. the aggregated digital signature ADS, of the batch of elements is made immutable, and thus forgery-proof, by being published in a (public) media accessible to a user having to check the authenticity of an element, i.e. an authorization data AD, i.e. of a mission order, (or its associated data), or stored in a searchable root database accessible to the controller, or, in a preferred mode, stored in a blockchain or preferably in a database secured by a blockchain accessible to the controller. The controller may then store the reference value R acquired from these available sources.

For each element $A_i$ of the batch, a corresponding element verification key $VK_i$ (or verification path) of the associated tree is then computed as a sequence of the respective digital signatures, from the leaf nodes level to the penultimate nodes level, of every other leaf node having the same parent node in the tree that the leaf-node corresponding to the element digital signature, and successively at each next level in the tree, of every non-leaf node having the same parent node in the tree that the previous same parent node considered at the preceding level.

According to an embodiment, at least one of the element $A_i$ comprises a mission order, i.e. an authorization data AD, said authorization data AD indicates that the controller A of the device DA is authorized by the controller C to perform an operation Op with a controller of which device receives said digital message M, for example the controller B.

Preferably, the associated digital data D of at least one of the element $A_i$ comprises an authorization data AD indicating that the controller A of the device DA is authorized by the controller C to perform an operation Op with a controller of which device receives said digital message M, for example the controller B.

As it will be described, the present invention allows the controller C to issue a digital message M in the form of a forgery proof file comprising:

said authorization data $AD_i$, i.e. an element $A_i$;

a verification key $VK_i$ related to the authorization data $AD_i$, i.e. the element $A_i$ Advantageously, said verification key $VK_i$ together with the authorization data $AD_i$ allow to retrieve the aggregated digital signature ADS, that can be stored in the memory of the processing unit CPU of the device DB of the controller B for example.

According to an embodiment, each element $A_i$ of the batch of element $A_i$ can correspond to an authorization data $AD_i$. Indeed, the controller C, issuing several digital messages $M_i$ regarding different controllers and therefore different mission orders, can create this tree using several authorization data $AD_i$, optionally the controller C can use any kind of data as far as at least one of the elements relates to an authorization data $AD_i$.

In the example of FIG. 7, there are eight verification keys $VK_1, \ldots, VK_8$ respectively corresponding to the eight elements $A_1, \ldots, A_8$ of the batch and their corresponding eight leaf nodes $a(1,1), \ldots, a(1,8)$:

1) for leaf node $a(1,1)=x_1=H(D_1)$ corresponding to element $A_1$, the verification key is $VK_1=\{a(1,2),a(2,2),a(3,2)\}$, from which the root digital signature value R can be retrieved via the following steps (executed according to the nodes ordering in the tree and the tree concatenation ordering):

a) from leaf node $a(1,1)=x_1$ and leaf node $a(1,2)=x_2$ in $VK_1$ ($a(1,2)$ is the other leaf node having the same parent node, i.e. node $a(2,1)$, that the leaf node corresponding to the element digital signature $x_1$, i.e.

node a(1,1)), the parent node value a(2,1) is obtained by a(2,1)=H(a(1,1)+a(1,2)) (i.e. a(2,1)=H($x_1+x_2$)), b) from the obtained a(2,1) and the next node value in $VK_1$, i.e. a(2,2) of next non-leaf nodes level, which is a non-leaf node having the same parent node in the tree, i.e. node a(3,1), that the previous same parent node considered at the preceding level, i.e. node a(2,1), the parent node value a(3,1) is obtained by a(3,1)=H(a(2,1)+a(2,2)), c) from the obtained a(3,1) and the next node value in $VK_1$, i.e. a(3,2) of the penultimate nodes level, which is a non-leaf node having the same parent node in the tree, i.e. the root node, that the previous same parent node considered at the preceding level, i.e. node a(3,1), the root node value R is obtained by R=H(a(3,1)+a(3,2)).

In this example we have three steps a), b) and c), because the tree has three levels below the root node level and thus, the verification key contains three node values. Thus, the value of the root node of the tree can be obtained as: R=H(H(H(a(1,1)+a(1,2))+a(2,2))+a(3,2)).

2) for leaf node a(1,2)=$x_2$=H($D_2$) corresponding to element A2, the verification key is $VK_2$={a(1,1),a(2,2),a(3,2)}, from which the root value R can be retrieved via the following steps (executed according to the nodes ordering in the tree and the tree concatenation ordering):

a) from a(1,2)=$x_2$ and a(1,1)=$x_1$ in $VK_1$ (a(1,1) is the other leaf node having the same parent node, i.e. node a(2,1), that the leaf node corresponding to the element digital signature $x_2$, i.e. node a(1,2)), the parent node value a(2,1) is obtained by a(2,1)=H(a(1,1)+a(1,2)), b) from the obtained a(2,1) and the next node value in $VK_2$, i.e. a(2,2) of next non-leaf nodes level, which is a non-leaf node having the same parent node in the tree, i.e. node a(3,1), that the previous same parent node considered at the preceding level, i.e. node a(2,1), the parent node value a(3,1) is obtained by a(3,1)=H(a(2,1)+a(2,2)), c) from the obtained a(3,1) and the next node value in $VK_2$, i.e. a(3,2) of the penultimate nodes level, which is a non-leaf node having the same parent node in the tree, i.e. the root node, that the previous same parent node considered at the preceding level, i.e. node a(3,1), the root node value R is obtained by R=H(a(3,1)+a(3,2)).

Thus, the value of the root node of the tree can be obtained as: R=H(H(H(a(1,1)+a(1,2))+a(2,2))+a(3,2)).

3) for leaf node a(1,3)=$x_3$=H($D_3$) corresponding to element $A_3$, the verification key is $VK_3$={a(1,4),a(2,1),a(3,2)}, from which the root value R can be retrieved via the following steps (executed according to the nodes ordering in the tree and the tree concatenation ordering):

a) from a(1,3)=$x_3$ and a(1,4)=$x_4$ in $VK_3$ (a(1,4) is the other leaf node having the same parent node, i.e. node a(2,2), that the leaf node corresponding to the element digital signature $x_3$, i.e. node a(1,3)), the parent node value a(2,2) is obtained by a(2,2)=H(a(1,3)+a(1,4)), b) from the obtained a(2,2) and the next node value in $VK_3$, i.e. a(2,1) of next non-leaf nodes level, which is a non-leaf node having the same parent node in the tree, i.e. node a(3,1), that the previous same parent node considered at the preceding level, i.e. node a(2,2), the parent node value a(3,1) is obtained by a(3,1)=H(a(2,1)+a(2,2)), c) from the obtained a(3,1) and the next node value in $VK_3$, i.e. a(3,2) of the penultimate nodes level, which is a non-leaf node having the same parent node in the tree, i.e. the root node, that the previous same parent node considered at the preceding level, i.e. node a(3,1), the root node value R is obtained by R=H(a(3,1)+a(3,2)).

Thus, the value of the root node of the tree can be obtained as: R=H(H(a(2,1)+H(a(1,3)+a(1,4)))+a(3,2)).

4) for leaf node a(1,4)=$x_4$=H($D_4$) corresponding to element A4, the verification key is $VK_4$={a(1,3),a(2,1),a(3,2)}, from which the root value R can be retrieved via the following steps (executed according to the nodes ordering in the tree and the tree concatenation ordering):

a) from a(1,4)=$x_4$ and a(1,3)=$x_3$ in $VK_4$, the parent node value a(2,2) is obtained by a(2,2)=H(a(1,3)+a(1,4)), b) from the obtained a(2,2) and the next node value in $VK_4$, i.e. a(2,1) of next non-leaf nodes level, the parent node value a(3,1) is obtained by a(3,1)=H(a(2,1)+a(2,2)), c) from the obtained a(3,1) and the next node value in $VK_4$, i.e. a(3,2) of the penultimate nodes level, the root node value R is obtained by R=H(a(3,1)+a(3,2)).

Thus, the value of the root node of the tree can be obtained as: R=H(H(a(2,1)+H(a(1,3)+a(1,4)))+a(3,2)).

5) for node a(1,5)=$x_5$=H($D_5$) corresponding to element $A_5$, the verification key is $VK_5$={a(1,6),a(2,4),a(3,1)}, from which the root value R can be retrieved via the following steps (executed according to the nodes ordering in the tree and the tree concatenation ordering):

a) from a(1,5)=$x_5$ and a(1,6)=$x_6$ in $VK_5$, the parent node value a(2,3) is obtained by a(2,3)=H(a(1,5)+a(1,6)), b) from the obtained a(2,3) and the next node value in $VK_5$, i.e. a(2,4) of next non-leaf nodes level, the parent node value a(3,2) is obtained by a(3,2)=H(a(2,3)+a(2,4)), c) from the obtained a(3,2) and the next node value in $VK_5$, i.e. a(3,1) of the penultimate nodes level, the root node value R is obtained by R=H(a(3,1)+a(3,2)).

Thus, the value of the root node of the tree can be obtained as: R=H(a(3,1)+H(H(a(1,5)+a(1,6))+a(2,4))).

6) for node a(1,6)=$x_6$=H($D_6$) corresponding to element $A_6$, the verification key is k6={a(1,5),a(2,4),a(3,1)}, from which the root value R can be retrieved via the following steps (executed according to the nodes ordering in the tree and the tree concatenation ordering):

a) from a(1,6)=$x_6$ and a(1,5)=$x_5$ in $VK_6$, the parent node value a(2,3) is obtained by a(2,3)=H(a(1,5)+a(1,6)), b) from the obtained a(2,3) and the next node value in $VK_6$, i.e. a(2,4) of next non-leaf nodes level, the parent node value a(3,2) is obtained by a(3,2)=H(a(2,3)+a(2,4)), c) from the obtained a(3,2) and the next node value in $VK_6$, i.e. a(3,1) of the penultimate nodes level, the root node value R is obtained by R=H(a(3,1)+a(3,2)).

Thus, the value of the root node of the tree can be obtained as: R=H(a(3,1)+H(H(a(1,5)+a(1,6))+a(2,4))).

7) for node $a(1,7)=x_7=H(D_7)$ corresponding to element $A_7$, the verification key is $k7=\{a(1,8),a(2,3),a(3,1)\}$, from which the root value R can be retrieved via the following steps (executed according to the nodes ordering in the tree and the tree concatenation ordering):
   a) from $a(1,7)=x_7$ and $a(1,8)=x_8$ in $VK_7$, the parent node value $a(2,4)$ is obtained by $a(2,4)=H(a(1,7)+a(1,8))$,
   b) from the obtained $a(2,4)$ and the next node value in $VK_7$, i.e. $a(2,3)$ of next non-leaf nodes level, the parent node value $a(3,2)$ is obtained by $a(3,2)=H(a(2,3)+a(2,4))$,
   c) from the obtained $a(3,2)$ and the next node value in $VK_7$, i.e. $a(3,1)$ of the penultimate nodes level, the root node value R is obtained by $R=H(a(3,1)+a(3,2))$.

Thus, the value of the root node of the tree can be obtained as: $R=H(a(3,1)+H(a(2,3)+H(a(1,7)+a(1,8))))$.

8) for node $a(1,8)=x_8=H(D_8)$ corresponding to element $A_8$, the verification key is $k8=\{a(1,7),a(2,3),a(3,1)\}$, from which the root value R can be retrieved via the following steps (executed according to the nodes ordering in the tree and the tree concatenation ordering):
   a) from $a(1,8)=x_8$ and $a(1,7)=x_7$ in $VK_8$, the parent node value $a(2,4)$ is obtained by $a(2,4)=H(a(1,7)+a(1,8))$,
   b) from the obtained $a(2,4)$ and the next node value in $VK_8$, i.e. $a(2,3)$ of next non-leaf nodes level, the parent node value $a(3,2)$ is obtained by $a(3,2)=H(a(2,3)+a(2,4))$,
   c) from the obtained $a(3,2)$ and the next node value in $VK_8$, i.e. $a(3,1)$ of the penultimate nodes level, the root node value R is obtained by $R=H(a(3,1)+a(3,2))$.

Thus, the value of the root node of the tree can be obtained as: $R=H(a(3,1)+H(a(2,3)+H(a(1,7)+a(1,8))))$.

Generally, for retrieving a (candidate) root node value, i.e. a candidate aggregated digital signature cADS, by starting from a given leaf node value and the node values specified in the verification key associated with said given leaf node, the following steps are performed:
   extracting from the sequence of node values in the verification key VK, a node value (i.e. a digital signature value) of every other leaf node of the tree having the same parent node than that of the given leaf node and calculating a digital signature of a concatenation of the given node value and, respectively according to the ordering of nodes in the tree and the tree concatenation ordering, the extracted node value of said every other leaf node, thus obtaining a digital signature of said same parent node of the given leaf node;
   successively at each next level in the tree and up to the penultimate nodes level:
      extracting from the sequence of node values in the verification key VK, a node value of every other non-leaf node of the tree having the same parent node than that of the previous same parent node considered at the preceding step, and
      calculating a digital signature of a concatenation of the node value of said respective every other non-leaf node and the obtained digital signature of said previous same parent node, according to the ordering of nodes in the tree and the tree concatenation ordering, thus obtaining a node value of said same parent node of said previous same parent node; and
   calculating a digital signature of a concatenation of the obtained node values of the non-leaf nodes corresponding to the penultimate nodes level of the tree according to the ordering of nodes in the tree and the tree concatenation ordering, thus obtaining a root digital signature of the root node of the tree.

As it is clear from the above example, the root node value R, also called the aggregated digital signature ADS, can finally be retrieved from any given leaf node value by a digital signature of a concatenation of this leaf node value with only the node values specified in the corresponding verification key. Thus, the volume of data in the verification information $V_i$ that is necessary for retrieving the root node value R is clearly much lower than the volume of data necessary for calculating the reference root node value R (i.e. based only on the leaf node values, by calculating all the non-leaf node values of the intermediate levels of the tree): this is an advantage of the invention in view of the constraint of limited size available on a security marking (like a two-dimensional barcode). According to an embodiment, this verification information $V_i$ comprises the digital data $D_i$, i.e. authorization data AD, i.e. the data of the mission order, and the corresponding verification key $VK_i$, $V_i=(D_i,VK_i)$.

According to the invention, the digital message M corresponding to a given element $A_i$ of a batch of elements includes the verification information $V_i$ that allows both online and offline checking operations of authenticity of the digital message M, of conformity of its associated data with respect to that of the authorization data AD comprised by said given element $A_i$, by providing a unique, immutable and forgery-proof link between the element data $D_i$ and belonging of element $A_i$ to a given batch of genuine elements, while keeping a bit size of a digital representation of this verification information $V_i$ at a level compatible with a data content of a two-dimensional machine-readable barcode that can be easily read by a conventional reader, such as by the optical reader module OR.

The checking operations includes retrieving the batch value, or reference root digital signature R of the tree associated with the batch, i.e. the aggregated digital signature ADS, by first reading the element digital data $D_i$, i.e. authorization data AD, and the corresponding verification key $VK_i$ on a machine-readable form, such as the QR code QRC(A) for example, then calculating a candidate digital signature $cx_i$ by means of a one-way function of the read element digital data $D_i$ as $cx_i=H(D_i)$, and calculating a candidate root digital signature cR, also called a candidate aggregated digital signature cADS, as explained above from a digital signature of a concatenation of $x_i$ and node values of the tree according to the sequence of node values indicated in the verification key $VK_i$. This securing scheme, which has the advantage of not necessitating data encryption and thus, management of encryption/decryption keys (particularly, no cryptographic key is included in the security marking), is much more robust with respect to codebreaking attack compared to conventional encryption of data by means of public encryption key-private decryption key (like RSA "Rivest-Shamir-Adleman" system, for example).

As a result, the size of digital data to be represented in the security marking according to the invention is compact and allows to use conventional 2D barcodes (e.g. a QR code), and thus conventional barcode readers (or even a mere programmed smartphone having a camera), while providing a very high level of robustness against codebreaking attacks. Moreover, this machine-readable form is compatible with both online (via a server communicating with a code reader) and offline (via a programmed code reader) check of authenticity of the digital message M and conformity of its data with respect to that of the authorization data AD. Also, according to the invention, the representation of digital data $D_i$ and that of key data $VK_i$ may differ, the data concatenation scheme and/or the one-way function may depend on node level in the tree, which provide additional levels of robustness with respect to codebreaking attacks.

Preferably, in order to further reduce the size of digital data (i.e. verification information V) to be included in a machine-readable form, if the element digital data $D_i$ of the respective original element $A_i$ of the batch are spread between given fields that are common to all the elements of the batch, digital data relating to these fields are not included in each element digital data $D_i$ but are clustered in a separate fields data block FDB associated with the batch of elements, and:
- the digital signature xi of an element $A_i$ of the batch is then calculated with the one-way function H of a concatenation of the corresponding digital data $D_i$ and the digital data of the fields data block FDB, i.e. xi=H($D_{i+}$ FDB); and
- the reference root digital signature R, i.e. the aggregated digital signature ADS, is made available to the controller together with the associated fields data block FDB (which makes the fields data block also immutable).

In a variant of the invention, the fields data block FDB is made accessible to the controller independently of the reference root digital signature, i.e. the aggregated digital signature ADS.

There are many known methods for encoding information in a way that it can be printed on a document, applied to physical surfaces or displayed by a display module DD for example. Any such method may be used in implementations of any embodiment of this invention. One common form of an optical machine-readable form is a well-known QR code as previously discussed.

As is well known, for a given area, the more data a QR code is able to encode, the higher the module density (roughly, density of black/white "squares") it has and the greater resolution it requires to print and read. In addition to its density (in number of modules squared), QR codes are also generally classified depending on what level of error correction they include. At present, the four different standard "levels", L, M, Q, and H, each representing the degree of "damage", that is, data loss, the QR code image can sustain and recover from. The levels L, M, Q, and H can sustain roughly 7%, 15%, 25% and 30% damage, respectively.

The following table shows at least approximate values for different QR code versions:

| Version | Size (in modules) | Number of encodable bits | |
|---|---|---|---|
| | | ECC level L | ECC level H |
| 110 | 557 × 57 | 22192 | 9976 |
| 225 | 1117 × 117 | 110208 | 44304 |
| 440 | 1177 × 177 | 223648 | 110208 |

Not all of the bits may be used to encode a data "load", however, since some modules are used for scan targets, a mask pattern, and the error-correction modules. There is thus a trade-off between the amount of information that a QR code can encode, and how much information is included in a verification information $V_i$ and must be encoded.

For a chosen type of optical machine-readable form, such as a QR code, with a limited encoding capacity, a suitable one-way function H should therefore also be chosen: a function of which output is too large in terms of required bits may be impossible to use at all, and a function of which range is too small may not be secure enough. Moreover, in many applications, scalability may be an issue. For example, some data security schemes involve signatures that grow as the number of members of a batch increases, and that could impermissibly limit the size of a batch from the perspective of how many bits the optical machine-readable form can encode. This is why, according to a preferred embodiment of the invention, the type of function chosen is the one-way hash function of the SHA-2 family.

A computation module is preferably comprised and controlled by the controller C to execute the code provided for performing the computations for digitally signing the digital data D of the elements of a batch, for determining the verification keys for the different elements, and for calculating the reference root digital signature of the corresponding tree.

According to an embodiment, the processing unit of a device controlled by a controller is configured to execute the code provided for performing the computations for digitally signing the element digital data of the elements of a batch, for determining the verification keys for the different elements, and for calculating the reference root digital signature of the corresponding tree.

The controller C may also comprise and control suitable modules for inputting (pre-programmed) values corresponding to the digital data $D_s$ of the specific element(s) $A_s$. For example, the batch of elements can comprise one element comprising authorization data AD, and several specific elements in order to allow the processing unit of the device of the controller C to perform the present invention and to issue said digital message based on said tree.

It would be possible to perform the element-related hashing computations externally (e.g. on a connected distant server), for example, wherever the elements are created, so as to avoid having to transmit raw element data $D_i$ over a network from that site (or sites) to the controller C, if that is a concern.

For each element $A_i$, such as mission orders, i.e. authorization data $AD_i$, for example, corresponding verification information $V_i$ is compiled and is encoded (represented) for example in some form of optical machine-readable form that is then printed or applied physically or digitally displayed to or otherwise associated with the respective digital message M or a document or even a digital document. For example, the digital message M, comprising at least the verification information $V_i$, could be encoded on an optically or magnetically readable label, RFID tag, etc., that is attached to the mission order or official digital document or is printed directly on a document.

For any specific element $A_s$, its corresponding verification information $V_s=(D_s,k_s)$ may be associated internally with it by the controller C. The verification information generally at least includes, for any element $A_i$ of a batch of elements, the corresponding digital data $D_i$ and the corresponding verification key $VK_i$: i.e. $V_i=(D_i,VK_i)$. As previously mentioned, the digital data $D_i$ can comprise the details of a mission order.

Additional element data may further be associated with an element and may include, for example, the batch value, i.e. reference root digital signature R, or any other information the controller C chooses to include, such as the public key PuK of a given controller, a time slot for executing an operation Op, an item serial number, a batch ID, date/time information, product name, a URL that points to other, online information associated with either a given controller (such as an image of the controller, or of its labelling, etc.), or the batch, or the supplier/manufacturer, a telephone number one may call for verification, etc. The additional element data may be stored in a searchable information database accessible to a controller (via an information database interface).

Once the verification key $VK_i$ of an element $A_i$ has been calculated and included (i.e. via encoding or any chosen data representation) together with the corresponding element digital data $D_i$, in the optical machine-readable form corresponding to the digital message M, the resulting digital message M and its associated data are in fact secured against forgery and tampering.

A controller, recipient of the digital message M related to an element $A_1$ and in the form of a QR Code, may then scan (or otherwise read) with the optical reader module OR of its device the optical machine-readable form of the digital message M and extract the element digital data $D_1$ and the verification key $VK_1$, (and any other information that may have been encoded into the optical machine-readable form as previously discussed). For the sake of verification of the digital message M, and therefore of the element $A_i$, the controller must first retrieve the verification information $V_1=(D_1,VK_1)$ from said QR code and thus, calculate the digital signature $x_1$ from the extracted element digital data $D_1$: to do that the controller, or at least its device, must know the one-way function to be used for calculating an element digital signature, here the one-way function H( ) (e.g. a SHA-256 hash), and then perform the operation $x_1=H(D_1)$ to obtain the full data $(x_1,VK_1)$ necessary to calculate a corresponding candidate root digital signature cR, i.e. a corresponding candidate aggregated digital signature cADS. The controller may for example receive the one-way function securely (for example, using a public/private key pair) or by requesting this from the element provider or whichever entity having created the signatures and keys, or having it already programmed in a controller's processing unit CPU of its device, for example the device DB previously discussed.

Next, in order to calculate such candidate root digital signature cR, the controller may need to further know the type of data concatenation scheme (for concatenating node values via H(a(i,j)+a(i,k)) to be used for that: the controller may receive this information in any known manner, either securely (for example, using a public/private key pair) or simply by requesting this from the element provider or whichever entity created the verification data, i.e. controller C, or having it already programmed in the controller's processing unit CPU. However, the concatenation scheme may in fact correspond to a mere conventional joining end-to-end of the two digital data blocks respectively corresponding to the two node values: in this case, no specific scheme must be transmitted to the controller. In some variants, the concatenation scheme may further insert a concatenation block, which may contain data specific to the rank or level of the concatenated digital data blocks in the tree, with the result of making even more difficult a code-breaking attack.

Knowing the data concatenation scheme, the controller can then compute (e.g. via the suitably programmed device) the candidate root digital signature cR, i.e. the candidate aggregated digital signature cADS, as explained above by step by step digitally signing a concatenation of the element digital signature $x_1$ and node values according to the sequence of nodes specified in the verification key $VK_1$, see above item 1) relating to node a(1,1), executed according to the nodes ordering in the tree and the tree concatenation ordering for example. Here, the candidate root digital signature cR is obtained as (the nodes ordering in the tree being given by the respective indexes (i,j) of the level and rank in the level): cR=H(H(H(a(1,1)+a(1,2))+a(2,2))+a(3,2)).

This calculated candidate root digital signature cR should then be equal to the available (or published) reference R value: this value may have been previously acquired by the controller and/or already stored in the memory of the processing unit CPU of the device of said controller, it could also be a value that the controller requests and receives from the controller C in any known manner. If the candidate cR, i.e. cADS, and the available reference root digital signatures R, i.e. ADS, match, this computation then verifies the information in the digital message M and confirms that the mission order $A_1$ has been issued by the controller C.

A link to access the reference root digital signature R for the batch corresponding to the element $A_1$ could be included in the digital mark DM (for example, a web address, if R can be retrieved on a corresponding web site).

In some implementations, recipients of a digital message M may be capable of "visually" extracting the verification information $V_i$ directly from the digital message M. For example, the verification information $V_i$ might be textual, such as a serial number, or text in a descriptive writing, or some alphanumerical encoding elsewhere on the element and human readable from the elements themselves or something attached to or included in them.

Recipients of a digital message M could also be provided with appropriate software, such as an optical reader module in its device such as a smartphone that either inputs data, or reads data optically via the smartphone camera, and which then computes $x_i=H(D_i)$. For example, with an optical machine-readable form comprised by the digital message M relating to the authorization data $AD_1$ and being a standard QR code, a controller could easily obtain by scanning the QR code with its optical reader module OR, using a standard QR code reader application running on its device, the digital data $D_1$ and $VK_1$, a verification application in the controller's device could then compute $x_1$ and cR, and compare this value with the available reference batch value R, as explained above.

Preferably, the reference root digital signature R, i.e. the ADS, is stored in a searchable root database that can be accessed (via a communication link) by the controller by means of its device equipped with the communication module CM. The controller having to verify the digital message M can just send a root request with its smartphone to the address of the database, via an access interface of the database, the request containing the verification information $V_1$ read on the optical machine readable form of the digital message M (or the calculated digital signature $x_1=H(D_1)$) allowing to retrieve the corresponding reference batch value R, and the access interface will return the reference root digital signature R to the smartphone. The database may be secured by a blockchain in order to strengthen the immutability of the stored root digital signatures.

According to an embodiment, the content of the digital message M is secured using a method of securing against forgery or tampering a given element comprising said content of said digital message M, said given element belonging to a batch of a plurality of elements, each element having its own associated element data and corresponding element digital data, characterized by comprising the steps of:

for each element of the batch, calculating by means of a one-way function an associated element digital signature of its corresponding element digital data;

forming a tree based on the plurality of calculated element digital signatures for the original elements of the batch and comprising nodes arranged according to a given nodes ordering in the tree, said tree comprising node levels from the leaf nodes, corresponding to the plurality of element digital signatures respectively associated to the plurality of original elements in the batch, to the root node of the tree, every non-leaf node of the tree corresponding to a digital signature by means of the one-way function of a concatenation of the respective digital signatures of its child nodes according to a tree concatenation ordering, the root node corresponding to a reference root digital signature, i.e. a digital signature by means of the one-way function of a concatenation of the digital signatures of the nodes of a penultimate nodes level in the tree according to said tree concatenation ordering;

associating with the given element a corresponding verification key being a sequence of the respective digital signatures, from the leaf nodes level to the penultimate nodes level, of every other leaf node having the same parent node in the tree that the leaf-node corresponding to the element digital signature of the given element, and successively at each next level in the tree, of every non-leaf node having the same parent node in the tree that the previous same parent node considered at the preceding level;

making available to a controller the reference root digital signature of the tree; and preferably, in case where the digital message M is printed, applying on a given document an optical machine-readable form encoding said digital message M and thus including a representation of said digital data and its corresponding verification key, thereby, preferably, obtaining a marked document with said printed digital message M of which content is secured against forgery or tampering.

According to an embodiment, the reference root digital signature of the root node of the tree is either published in a media accessible to the controller, or stored in a searchable root database accessible to the controller, or stored in a blockchain, or preferably in a database secured by a blockchain, accessible to the controller.

According to an embodiment, the digital message M can further comprise root node access data printed or encoded thereto and containing information sufficient to allow the controller to access to the reference root digital signature of the root node of the tree corresponding to the batch of elements, said information being a link to an access interface operable to receive from the controller a root request containing digital data, or a digital signature of digital data, obtained from the digital message M or from another printed optical machine-readable form, and send back a reference root digital signature of corresponding tree, the access interface allowing access to, respectively, one of the following:

the media wherein the reference root digital signature is published;

the searchable root database wherein the reference root digital signature is stored; and the blockchain, or respectively the database secured by a blockchain, wherein the time stamped reference root digital signature is stored.

According to an embodiment, additional digital data corresponding to the digital data associated with the digital message M are stored in a searchable information database accessible to the controller via an information database interface operable to receive from the controller an information request containing digital data, or a digital signature of digital data, obtained from the digital message M or from another printed optical machine-readable form, and send back corresponding additional digital data.

The present invention allows therefore a recipient to validate a given digital content with a high certainty.

What is claimed:

1. A method of validation of a digital content of a digital message M received by a device DB controlled by a controller B through a communication network CN, wherein:

a device DA controlled by a controller A comprises a processing unit CPU(A) with a memory storing the digital message M, and a communication module CM(A) adapted to send and receive data via the communication network CN;

the device DB comprises a processing unit CPU(B) with a memory storing an aggregated digital signature ADS, and a communication module CM(B) adapted to send and receive data via the communication network CN, said aggregated digital signature ADS being calculated by applying a one-way accumulator to a plurality of digital signatures, said plurality of digital signatures including a digital signature $x(A)$ of an authorization data $AD(A)$ calculated via a one way-function;

the digital message M contains the authorization data $AD(A)$ indicating that the controller A of the device DA is authorized by a controller C to perform an operation Op with a controller of which device receives said digital message M;

the digital message M also contains a verification key $VK(A)$ attributed by the controller C, wherein said verification key $VK(A)$ together with the authorization data $AD(A)$ are used to calculate a candidate aggregated digital signature cADS, the processing unit CPU (B) being configured to compare said candidate aggregated digital signature cADS with the aggregated digital signature ADS stored in the memory of the processing unit CPU(B) of the device DB;

the method comprising the following steps:

the communication module CM(B) of the device DB receives the digital message M;

the processing unit CPU(B) of the device DB extracts the authorization data $AD(A)$ contained in the digital message M;

the communication module CM(B) of the device DB receives from the communication module CM(A) of the device DA an accreditation SA;

the processing unit CPU(B) of the device DB verifies the accreditation SA;

the processing unit CPU(B) of the device DB:

extracts the verification key $VK(A)$ contained in the digital message M, calculates, via the one-way function programmed in the processing unit CPU(B), a candidate digital signature $cx(A)$ of the authorization data $AD(A)$, and calculates the candidate aggregated digital signature cADS from the verification key $VK(A)$ and the calculated candidate digital signature $cx(A)$ of the authorization data $AD(A)$; and the processing unit CPU(B) of the device DB checks whether the candidate aggregated digital signature cADS matches with the aggregated digital signature ADS stored in its memory, and only in case of positive verification of the accreditation SA data and positive matching of the candidate aggregated digital signature cADS with the aggregated digital signature ADS, the processing unit CPU(B) of the device DB transmits via the communication module CM(B) to the controller B an indication that the controller A is indeed authorized by the controller C to perform the operation Op.

2. The method according to claim 1, wherein:
the memory of the processing unit CPU(A) of the device DA stores a private key PrK (A), the processing unit CPU(A) being adapted to sign data with the private key PrK (A); and
the processing unit CPU(B) of the device DB is adapted to verify signed data with a corresponding public key by the communication module CM(B); and
the digital message M further comprises a public key PuK(A), corresponding to the private key PrK(A), and being accredited by the controller C as owned by the controller A; and
the accreditation SA are accreditation data signed with the private key PrK(A);
and wherein:
before the step of verifying said accreditation SA by the processing unit CPU(B) of the device DB, the processing unit CPU(B) of the device DB extracts the public key PuK(A) from the digital message M;
and wherein:
the step of verifying said accreditation SA comprises the verification of the accreditation SA by the processing unit CPU(B) of the device DB using said public key PuK(A).

3. The method according to claim 1, wherein the communication network CN comprises a near field communication network NFCN, and wherein the communication module CM(A) is adapted to send and receive data via the near field communication network NFCN, the communication module CM(B) is adapted to send and receive data via the near field communication network NFCN, this near field communication network NFCN enables a communication between the communication module CM(A) and the communication module CM(B) when the distance between the communication module CM(A) and the communication module CM(B) is lower than 50 cm.

4. The method according to claim 1, wherein the device DA comprises a display module DD(A) and an optical reader module OR(A), the device DB comprises a display module DD(B) and an optical reader module OR(B), and wherein the step of receiving the digital message M by the communication module CM(B) of the device DB comprises a step of reading by the optical reader module OR(B) an optical readable representation of a graphical data block GDB displayed by the display module DD(A), said graphical data block GDB comprising a digital mark DM, and wherein said digital mark DM comprises an encoded version EAD(A) of said authorization data AD(A) and an encoded version EVK(A) of said verification key VK(A), and wherein the extraction of the authorization data AD(A) comprises decoding said encoded authorization data EAD (A), and wherein the extraction of the verification key VK(A) comprises decoding said encoded verification key EVK(A).

5. The method according to claim 4, wherein said optical readable representation of the graphical data block GDB comprises a digital representation of graphical symbols from a given finite set of graphical symbols, said digital representation of graphical symbol being configured to encode said digital mark MD and a machine-readable error correction data block.

6. The method according to claim 1, wherein the memory of the device DB stores a private key PrK(B) and a corresponding public key PuK(B) accredited by a controller C as owned by the controller B, the processing unit CPU(B) of the device DB being adapted to sign data with said private key PrK(B), and wherein the processing unit CPU(A) of the device DA is adapted to verify signed data using a corresponding public key by the communication module CM(A).

7. The method according to claim 1, comprising, before the step of receiving by the communication module CM(B) from the communication module CM(A) the accreditation SA, a step of sending from the communication module CM(B) to the communication module CM(A) a secret generated by the device DB, said secret being configured to generate said accreditation SA.

8. The method according to claim 7, wherein:
the memory of the processing unit CPU(A) of the device DA stores a private key PrK(A), the processing unit CPU(A) being adapted to sign data with the private key PrK(A); and
the processing unit CPU(B) of the device DB is adapted to verify signed data with a corresponding public key by the communication module CM(B); and
the digital message M further comprises a public key PuK(A), corresponding to the private key PrK(A), and being accredited by the controller C as owned by the controller A; and
the accreditation SA are accreditation data signed with the private key PrK(A);
and wherein:
before the step of verifying said accreditation SA by the processing unit CPU(B) of the device DB, the processing unit CPU(B) of the device DB extracts the public key PuK(A) from the digital message M;
and wherein:
the step of verifying said accreditation SA comprises the verification of the accreditation SA by the processing unit CPU(B) of the device DB using said public key PuK(A), and
wherein said secret is configured to be signed with the private key PrK(A) by the processing unit CPU(A) to generate said accreditation SA.

9. The method according to claim 7, wherein the device DA comprises a display module DD(A) and an optical reader module OR(A), the device DB comprises a display module DD(B) and an optical reader module OR(B), and wherein the step of receiving the digital message M by the communication module CM(B) of the device DB comprises a step of reading by the optical reader module OR(B) an optical readable representation of a graphical data block GDB displayed by the display module DD(A), said graphical data block GDB comprising a digital mark DM, and wherein said digital mark DM comprises an encoded version EAD(A) of said authorization data AD(A) and an encoded version EVK(A) of said verification key VK(A), and wherein the extraction of the authorization data AD(A) comprises decoding said encoded authorization data EAD (A), and wherein the extraction of the verification key VK(A) comprises decoding said encoded verification key EVK(A), and
wherein said step of sending said secret comprises a step of displaying by the display module DD(B) an optical readable representation of a graphical element encoding said secret and being configured to be read by the optical reader module OR(A).

10. The method according to claim 1, wherein:
the memory of the processing unit CPU(A) of the device DA stores a private key PrK(A), the processing unit CPU(A) being adapted to sign data with the private key PrK(A); and the processing unit CPU(B) of the device DB is adapted to verify signed data with a corresponding public key by the communication module CM(B); and the digital message M further comprises a public key PuK(A), corresponding to the private key PrK(A), and being accredited by the controller C as owned by the controller A; and the accreditation SA are accreditation data signed with the private key PrK(A);

and wherein:

before the step of verifying said accreditation SA by the processing unit CPU(B) of the device DB, the processing unit CPU(B) of the device DB extracts the public key PuK(A) from the digital message M;

and wherein:

the step of verifying said accreditation SA comprises the verification of the accreditation SA by the processing unit CPU(B) of the device DB using said public key PuK(A), and wherein, before or after receiving the digital message M, the controller B receives a digital document and wherein the accreditation SA comprises a signature of a content of said digital document, said signature being generated by the processing unit CPU(A) by signing with the private key PrK(A) said content.

11. The method according to claim 1, wherein the digital message M is certified by the controller C, and wherein the method comprises, before the step of extracting by processing unit CPU(B) of the device DB the authorization data AD(A) contained in the digital message M, a step of verifying by the processing unit CPU(B) that the digital message M is certified by the controller C, and only in case of positive verification that the digital message M is certified by the controller C, the processing unit CPU(B) of the device DB extracts the authorization data AD(A) contained in the digital message M.

12. A system of validation of a digital content of a digital message M received by a device DB controlled by a controller B through a communication network CN, the system comprising:

a device DA controlled by a controller A comprising a processing unit CPU(A) with a memory storing the digital message M, and a communication module CM(A) adapted to send and receive data via the communication network CN;

the device DB comprises a processing unit CPU(B) with a memory storing an aggregated digital signature ADS, and a communication module CM(B) adapted to send and receive data via the communication network CN, said aggregated digital signature ADS being calculated by applying a one-way accumulator to a plurality of digital signatures, said plurality of digital signatures including a digital signature x(A) of an authorization data AD(A) calculated via a one way-function;

the digital message M contains the authorization data AD(A) indicating that the controller A of the device DA is authorized by a controller C to perform an operation Op with a controller of which device receives said digital message M;

the digital message M also contains a verification key VK(A) attributed by the controller C, wherein said verification key VK(A) together with the authorization data AD(A) are used to calculate a candidate aggregated digital signature cADS, the processing unit CPU(B) being configured to compare said candidate aggregated digital signature cADS with the aggregated digital signature ADS stored in the memory of the processing unit CPU(B) of the device DB;

and wherein:

the communication module CM(B) of the device DB is configured to receive (100b, 200) the digital message M;

the processing unit CPU(B) of the device DB is configured to extract (201) the authorization data AD(A) contained in the digital message M;

the communication module CM(B) of the device DB is configured to receive (400) from the communication module CM(A) of the device DA an accreditation SA;

the processing unit CPU(B) of the device DB is configured to verify (400b) the accreditation SA;

the processing unit CPU(B) of the device DB is configured to:

extract the verification key VK(A) contained in the digital message M, calculate, via the one-way function programmed in the processing unit CPU(B), a candidate digital signature cx(A) of the authorization data AD(A), and calculate the candidate aggregated digital signature cADS from the verification key VK(A) and the calculated candidate digital signature cx(A) of the authorization data AD(A); and the processing unit CPU(B) of the device DB is configured to check whether the candidate aggregated digital signature cADS matches with the aggregated digital signature ADS stored in its memory, and only in case of positive verification of the accreditation SA data and positive matching of the candidate aggregated digital signature cADS with the aggregated digital signature ADS, the processing unit CPU(B) of the device DB is configured to transmit via the communication module CM(B) to the controller B an indication that the controller A is indeed authorized by the controller C to perform the operation Op.

13. The system according to claim 12, wherein:

the memory of the processing unit CPU(A) of the device DA is configured to store a private key PrK(A), the processing unit CPU(A) being configured to sign data with the private key PrK(A); and the processing unit CPU(B) of the device DB is configured to verify signed data with a corresponding public key by the communication module CM(B); and the digital message M further comprises a public key PuK(A), corresponding to the private key PrK(A), and being accredited by the controller C as owned by the controller A; and the accreditation SA are accreditation data signed with the private key PrK(A);

and wherein:

the processing unit CPU(B) of the device DB is configured to extract (202) the public key PuK(A) from the digital message M;

and wherein:

the processing unit CPU(B) of the device DB is configured to verify (400b) said accreditation SA using said public key PuK(A).

14. The system according to claim 12, wherein the device DA comprises a display module DD(A) and an optical reader module OR(A), the device DB comprises a display module DD(B) and an optical reader module OR(B), and wherein the display module DD(A) of the device DA is configured to display an optical readable representation of a graphical data block GDB, and wherein the optical reader module OR(B) of the device DB is configured to read said optical readable representation of a graphical data block GDB, said graphical data block GDB comprising a digital mark DM, and wherein said digital mark DM comprises an encoded version EAD(A) of said authorization data AD(A) and an encoded version EVK(A) of said verification key VK(A), and wherein the processing unit CPU(B) of the device DB is configured to extract the authorization data AD(A) by decoding said encoded authorization data EAD (A), and wherein the processing unit CPU(B) of the device DB is configured to extract the verification key VK(A) by decoding said encoded verification key EVK(A).

15. Use of the system of validation of a digital content of a digital message M according to claim 12 for validating, by a device DB, an execution of an operation Op, said operation Op being executed by a device DA, and wherein:

the device DB is comprised and controlled by a vault B, the device DA is comprised and controlled by a robot A and the operation Op relates to the robot A fetching a specific good located inside the vault B; or the device DB is comprised and controlled by a computer B, the device DA is comprised and controlled by smartphone A and the operation Op relates to the smartphone A sending a set of data SeD(A) to the computer B; or the device DB is comprised and controlled by a medical device B, the device DA is comprised and controlled by a nurse A and the operation Op relates to the nurse A injecting a specific drug to a specific patient using said medical device B; or the device DB is comprised and controlled by a citizen B, the device DA is comprised and controlled by a police officer A and the operation Op relates to the police officer A penetrating in the house of the citizen B to search for evidences; or the device DB is comprised and controlled by a citizen B, the device DA is comprised and controlled by a civil servant A and the operation Op relates to the civil servant A issuing and signing an official digital document.

* * * * *